United States Patent
Zhang et al.

(10) Patent No.: US 11,575,428 B2
(45) Date of Patent: Feb. 7, 2023

(54) RANGE EXTENSION IN WIRELESS LOCAL AREA NETWORKS

(71) Applicant: InterDigital Patent Holdings, Inc., Wilmington, DE (US)

(72) Inventors: Guodong Zhang, Woodbury, NY (US); Xiaofei Wang, Cedar Grove, NJ (US); Hanging Lou, Syosset, NY (US); Sudheer A. Grandhi, Pleasanton, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 146 days.

(21) Appl. No.: 16/934,320

(22) Filed: Jul. 21, 2020

(65) Prior Publication Data
US 2020/0350979 A1 Nov. 5, 2020

Related U.S. Application Data

(63) Continuation of application No. 16/356,651, filed on Mar. 18, 2019, now Pat. No. 10,720,984, which is a continuation of application No. 15/784,992, filed on Oct. 16, 2017, now Pat. No. 10,236,967, which is a continuation of application No. 14/760,103, filed as application No. PCT/US2014/011031 on Jan. 10, 2014, now Pat. No. 9,793,975.

(Continued)

(51) Int. Cl.
*H04B 7/155* (2006.01)
*H04W 84/04* (2009.01)
(Continued)

(52) U.S. Cl.
CPC ...... *H04B 7/15507* (2013.01); *H04W 40/244* (2013.01); *H04W 52/0216* (2013.01);
(Continued)

(58) Field of Classification Search
CPC ............ H04B 7/15507; H04W 40/244; H04W 52/0216; H04W 52/0229; H04W 84/047; H04W 36/08; H04W 84/12; Y02D 30/70
See application file for complete search history.

(56) References Cited

U.S. PATENT DOCUMENTS 8,428,263 B2 4/2013 Inada
8,543,054 B2 9/2013 Ostergaard
(Continued)

FOREIGN PATENT DOCUMENTS

CN 101291527 10/2008
CN 101291527 A 10/2008

OTHER PUBLICATIONS

Abraham, et al., "Relays for 802.11ah," IEEE 802.11-12/1323r0 (Nov. 2012).
(Continued)

*Primary Examiner* — Hashim S Bhatti
(74) *Attorney, Agent, or Firm* — Flaster Greenberg, P.C.

(57) ABSTRACT

A method performed by STA may comprise receiving, from a first AP, a first beacon frame comprising a first relay information element including a first field that indicates whether a root AP BSSID field is included in the first relay information element, determining that a first root AP BSSID field is included in the first relay information element and determining that the first AP is a relay AP of a root AP identified by the first root AP BSSID field. The method may further comprise receiving, from a second AP, a second beacon frame comprising a second relay information element including a second field that indicates whether a root AP BSSID is included in the second relay information element and determining that a root AP BSSID field is not included in the second information element and determining that the second AP is a root AP.

20 Claims, 28 Drawing Sheets

Related U.S. Application Data

(60) Provisional application No. 61/832,102, filed on Jun. 6, 2013, provisional application No. 61/774,310, filed on Mar. 7, 2013, provisional application No. 61/751,646, filed on Jan. 11, 2013.

(51) Int. Cl.
  H04W 52/02 (2009.01)
  H04W 40/24 (2009.01)
  H04W 36/08 (2009.01)
  H04W 84/12 (2009.01)

(52) U.S. Cl.
  CPC ..... H04W 52/0229 (2013.01); H04W 84/047 (2013.01); H04W 36/08 (2013.01); H04W 84/12 (2013.01); Y02D 30/70 (2020.08)

(56) References Cited

U.S. PATENT DOCUMENTS

| | | | |
|---|---|---|---|
| 8,724,472 | B2 | 5/2014 | Huang et al. |
| 9,161,362 | B1 | 10/2015 | Banerjea |
| 9,426,837 | B2 | 8/2016 | Abraham et al. |
| 9,774,380 | B2 | 9/2017 | Zhu et al. |
| 2003/0227893 | A1 | 12/2003 | Bajic |
| 2005/0232200 | A1 | 10/2005 | Jeong et al. |
| 2006/0048034 | A1 | 3/2006 | Cho |
| 2006/0187873 | A1 | 8/2006 | Friday et al. |
| 2007/0060128 | A1 | 3/2007 | Kil |
| 2007/0178880 | A1 | 8/2007 | Saito |
| 2007/0189256 | A1 | 8/2007 | Oh |
| 2008/0002610 | A1 | 1/2008 | Zheng et al. |
| 2008/0090585 | A1 | 4/2008 | Hart |
| 2009/0279474 | A1 | 11/2009 | Chou |
| 2010/0150173 | A1 | 6/2010 | Yu |
| 2010/0157826 | A1 | 6/2010 | Yu et al. |
| 2010/0322213 | A1 | 12/2010 | Liu et al. |
| 2011/0110303 | A1 | 5/2011 | Bahr |
| 2012/0087300 | A1 | 4/2012 | Seok |
| 2012/0250603 | A1 | 10/2012 | Huang |
| 2013/0003689 | A1 | 1/2013 | Kwon et al. |
| 2013/0016649 | A1 | 1/2013 | Damnjanovic et al. |
| 2014/0153469 | A1 | 6/2014 | Park et al. |
| 2015/0244448 | A1* | 8/2015 | Seok ............... H04W 48/12 370/315 |
| 2015/0327265 | A1* | 11/2015 | Lee ............... H04B 7/15507 370/315 |
| 2015/0381676 | A1* | 12/2015 | Seok ............... H04L 61/6022 370/315 |

OTHER PUBLICATIONS

IEEE P802.11ac/D4.0 Draft Standard for Information Technology—Telecommunications and information exchange between systems—Local and metropolitan area networks—Specific requirements Part 11: Wireless LAN Medium Access Control (MAC) and Physical Layer (PHY) specifications Amendment 4: Enhancements for Very High Throughput for Operation in Bands below 6 GHz, IEEE P802.11ac/D4.0 (Oct. 2012).

IEEE P802.11ah/D0.1 Draft Standard for Information technology—Telecommunications and information exchange between systems Local and metropolitan area networks—Specific requirements, IEEE P802.11ah/D0.1 (May 2013).

IEEE P802.11ah/D1.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D1.0 (Oct. 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput, IEEE Std. 802.11n-2009 (Sep. 11, 2009).

IEEE Standard for Information technology—Telecommunications and information exchange between systems—Local and metropolitan area networks—Specific requirements, Part 15.4: Wireless Medium Access Control (MAC) and Physical Layer (PHY) Specifications for Low-Rate Wireless Personal Area Networks (WPANs), IEEE Std 802.15.4™—2006 (Sep. 2006).

IEEE Standard for Information technology—Telecommunications and information exchange between systems—Local and metropolitan area networks-Specific requirements—Part 11: Wireless LAN Medium Access Control (MAC) and Physical Layer (PHY) Specifications—Amendment 4: Enhancements for Very High Throughput for Operation in Bands below 6 GHz, IEEE Std 802.11ac (Dec. 2013).

IEEE Standard for Local and metropolitan area networks—Part 15.4: Low-Rate Wireless Personal Area Networks (LR-WPANs), Amendment 3: Physical Layer (PHY) Specifications for Low-Data-Rate, Wireless, Smart Metering Utility Networks, IEEE Std 802.15.4g-2012 (Apr. 2012).

Kwon, et al., "Implicit ACK for Relay," IEEE 802.11-13/0075r0 (Jan. 2013).

Liu, et al., "Early Ack Indication," IEEE 802.11-12/0119r0 (Jan. 2012).

Park, "Proposed Specification Framework for TGah," IEEE 802.11-11/1137r12 (Nov. 2012).

Wong, et al., "Proposed TGah Draft Amendment," IEEE 802.11-13/0500r1 (May 2013).

Wong, et al., "Two-Hop Relay Function," IEEE 11-12/1330r0, (Nov. 2012).

* cited by examiner

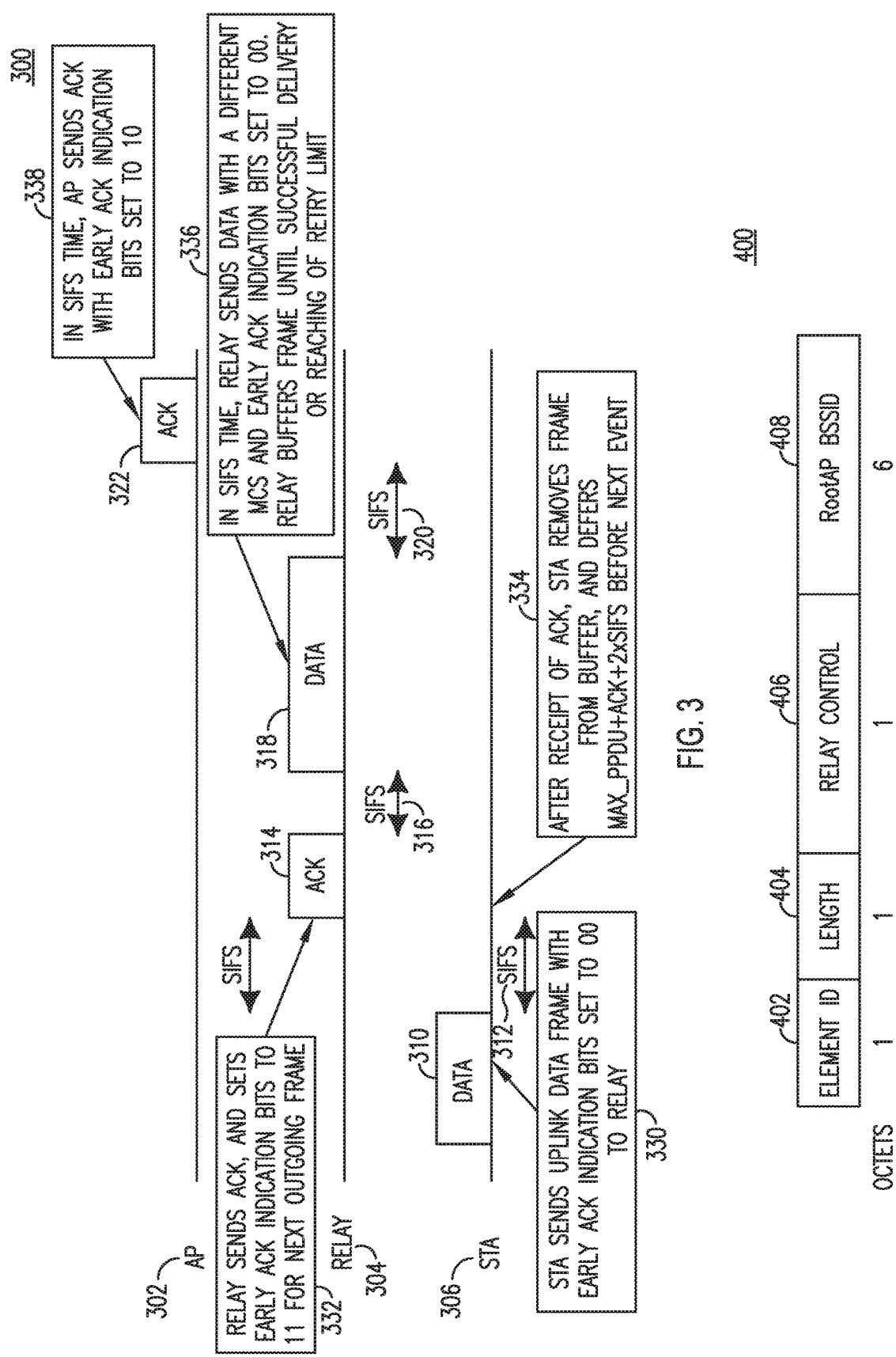

| 2802 | 2804 | 2806 | 2808 | 2810 | 2812 | 2814 | 2816 | 2818 | 2820 |
|---|---|---|---|---|---|---|---|---|---|
| ELEMENT ID | LENGTH | NUMBER OF RELAYS | NUMBER OF CURRENT RELAYS | RELAY CAPABILITIES | NUMBER OF END-STAs | END-STA TYPES | END-STA CAPABILITIES | END-STA TRAFFIC SPEC | RELAY GAINS |

RANGE EXTENSION IN WIRELESS LOCAL AREA NETWORKS

CROSS REFERENCE TO RELATED APPLICATIONS

This application is a continuation of U.S. patent application Ser. No. 16/356,651 filed on Mar. 18, 2019, which is a continuation of U.S. patent application Ser. No. 15/784,992 filed on Oct. 16, 2017 which is a continuation of U.S. patent application Ser. No. 14/760,103 filed on Jul. 9, 2015 which issued as U.S. Pat. No. 9,793,975 on Oct. 17, 2017 which is a national stage application of PCT/US2014/011031 filed on Jan. 10, 2014 which claims the benefit of U.S. Provisional Patent Application No. 61/751,646, filed Jan. 11, 2013, U.S. Provisional Patent Application No. 61/774,310, filed Mar. 7, 2013, and U.S. Provisional Patent Application No. 61/832,102, filed Jun. 6, 2013, all of which are incorporated by reference as if fully set forth herein.

BACKGROUND

A wireless local area network (WLAN) in Infrastructure basic service set (BSS) mode has an Access Point (AP) for the BSS and one or more stations (STAs) associated with the AP. The AP typically has access or interface to a distribution system (DS) or another type of wired/wireless network that carries traffic into and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA. Such traffic between STAs within a BSS is really peer-to-peer traffic. Such peer-to-peer traffic may also be sent directly between the source and destination STAs with a direct link setup (DLS) using an 802.11e DLS or an 802.11z tunneled DLS (TDLS). A WLAN in Independent BSS mode has no AP and STAs communicate directly with each other.

New spectrum is being allocated in various countries around the world for wireless communication systems such as WLANs. Such spectrum is often limited in the size and bandwidth of the channels they comprise. In addition, the spectrum may be fragmented in that available channels may not be adjacent and may not be combined for larger bandwidth transmissions. Such is the case, for example, in spectrum allocated below 1 GHz in various countries. WLAN systems, for example built on the 802.11 standard, may be designed to operate in such spectrum. Given these limitations, the WLAN systems will only be able to support smaller bandwidths and lower data rates compared to high throughput (HT)/very high throughput (VHT) WLAN systems, for example, based on the 802.11n/802.11ac standards.

The IEEE 802.11ah Task Group (TG) has been established to develop solutions to support WLAN systems in the sub-1 GHz band and to achieve the following requirements: orthogonal frequency division multiplexing (OFDM) physical (PHY) layer operating below 1 GHz in license-exempt bands excluding television white space (TVWS); enhancements to the medium access control (MAC) layer to support the PHY and coexistence with other systems; and optimization of rate versus range performance (range up to 1 km (outdoor) and data rates greater than 100 Kbit/s).

The following use cases have been adopted: sensors and meters; backhaul sensor and meter data; and extended range WiFi for cellular offloading. The spectrum allocation in some countries is limited. Therefore, there is a need to support a 1 MHz only option in addition to support for a 2 MHz option with a 1 MHz mode. The 802.11ah PHY is required to support 1, 2, 4, 8, and 16 MHz bandwidths.

The 802.11ah PHY operates below 1 GHz and is based on the 802.11ac PHY. To accommodate the narrow bandwidths required by 802.11ah, the 802.11ac PHY is down-clocked by a factor of 10. While support for 2, 4, 8, and 16 MHz bandwidths may be achieved by the $\frac{1}{10}$ down-clocking support for the 1 MHz bandwidth requires a new PHY definition with a Fast Fourier Transform (FFT) size of 32.

In the sensors and meters use case, up to 6000 STAs are supported within one BSS. The devices such as smart meters and sensors have different requirements pertaining to the supported uplink and downlink traffic. For example, sensors and meters may be configured to periodically upload their data to a server which will most likely to be uplink traffic only. Sensors and meters may also be queried or configured by the server. When the server queries or configures a sensor or meter, it will expect that the queried data should arrive within a setup interval. Similarly, the server/application will expect a confirmation for any configuration performed within a certain interval. These types of traffic patterns are different than the traditional traffic patterns assumed for WLAN systems.

In the signal (SIG) field of the physical layer convergence procedure (PLOP) preamble of a packet, two bits are used to indicate the type of acknowledgment (ACK) expected as a response (i.e., early ACK indication) to the packet: ACK ("00" value), block ACK (BA) ("01" value), no ACK ("10" value), and that a packet will be transmitted in the following frame ("11" value).

High Efficiency WLAN (HEW) is directed to enhancing the Quality of Experience (QoE) for a broad spectrum of wireless users in many usage scenarios, including high-density scenarios in the 2.4 GHz and 5 GHz bands. New use cases which support dense deployments of APs and STAs, and associated Radio Resource Management (RRM) technologies are being considered. Potential applications for HEW include usage scenarios such as: data delivery for stadium events, high user density scenarios such as train stations or enterprise/retail environments, an increased dependence on video delivery, and wireless services for medical applications.

SUMMARY

A method for associating a new end-station (end-STA) with a relay access point (R-AP) in a relay transmission. An assignment of a new identifier is transmitted to the new end-STA, wherein traffic indication map indications for the new end-STA in a beacon from the R-AP follows the transmission of the new identifier assignment. A message is sent to a root access point (AP), the message including an indication of a number of information fields in the message and at least one information field, each of the at least one information fields including an identifier of one end-STA associated with the R-AP. An acknowledgement is received from the root AP on a condition that the root AP correctly receives the message and associates an identifier of the end-STA with an identifier of the R-AP.

A relay access point (R-AP) includes a processor, a transmitter, and a receiver. The processor is configured to assign a new identifier to a new end-station (end-STA) associated with the R-AP. The transmitter configured to transmit the new identifier to the new end-STA, wherein traffic indication map indications for the new end-STA in a beacon from the R-AP follows the transmission of the new identifier assignment; and send a message to a root access point (AP), the message including an indication of a number of information fields in the message and at least one information field, each of the at least one information fields including an identifier of one end-STA associated with the R-AP. The receiver is configured to receive an acknowledgement from the root AP on a condition that the root AP correctly receives the message and associates an identifier of the end-STA with an identifier of the R-AP.

An information element (IE) for use in a relay transmission includes an indication of a number of information fields in the IE and each information field including an identifier of one end-station (end-STA).

A method for use in a relay access point (R-AP) is described. The R-AP communicates with a plurality of end-stations (end-STAs), each end-STA having a medium access control (MAC) address. A determination is made that a new end-STA has associated with the R-AP. A message is generated for transmission to a root access point (AP), the message including a MAC address of each of the plurality of end-STAs and a MAC address of the new end-STA, and the message is transmitted to the root AP.

A method and apparatus for use in an IEEE 802.11 root access point (AP) are provided. The method may comprise transmitting, from the root AP to the R-AP, an indication of a number of end-STAs which the R-AP is allowed to associate with. A first message may be received, from the R-AP that enables the root AP to associate the end-STA with the R-AP, the first message including: an indication of a number of information fields in the first message and a number of information fields identified by the indication of the number of information fields. Each information field may include a unique identifier associated with a respective indicated end-STA associated with the R-AP. A second message may be transmitted for the end-STA, from the root AP to the R-AP, and the second message may include the unique identifier.

A method for receiving data, by an end-STA from a root AP, may comprise receiving, from a relay AP, a first beacon frame comprising a relay information element. The relay information element may include a field which indicates whether a root AP basic service set identification (BSSID) field indicating a BSSID of the root AP is included in the beacon frame. The end-STA may transmit an association request to the relay AP and may receive an association response from the relay AP if the relay AP is allowed by the root AP to associate with the end-STA. The end-STA may receive, from the relay AP, traffic indication map (TIM) indications, of which at least one of the TIM indications may be for the end-STA. The one of the TIM indications may indicate that the data is available for the end-STA. The end-STA may then receive the data from the relay AP.

A method performed by STA may comprise receiving, from a first AP, a first beacon frame comprising a first relay information element including a first field that indicates whether a root AP BSSID field is included in the first relay information element, determining that a first root AP BSSID field is included in the first relay information element and determining that the first AP is a relay AP of a root AP identified by the first root AP BSSID field. The method may further comprise receiving, from a second AP, a second beacon frame comprising a second relay information element including a second field that indicates whether a root AP BSSID is included in the second relay information element and determining that a root AP BSSID field is not included in the second information element and determining that the second AP is a root AP. The first root AP BSSID field may be included in the first beacon frame identifies the second AP.

BRIEF DESCRIPTION OF THE DRAWINGS

A more detailed understanding may be had from the following description, given by way of example in conjunction with the accompanying drawings, wherein:

FIG. 3 is a signal diagram of an uplink relay with an explicit ACK;

FIG. 4 is a diagram of a Relay Element format;

FIG. 28 is a diagram of a Relay Control IE format.

DETAILED DESCRIPTION OF THE PREFERRED EMBODIMENTS

Figure 1A:
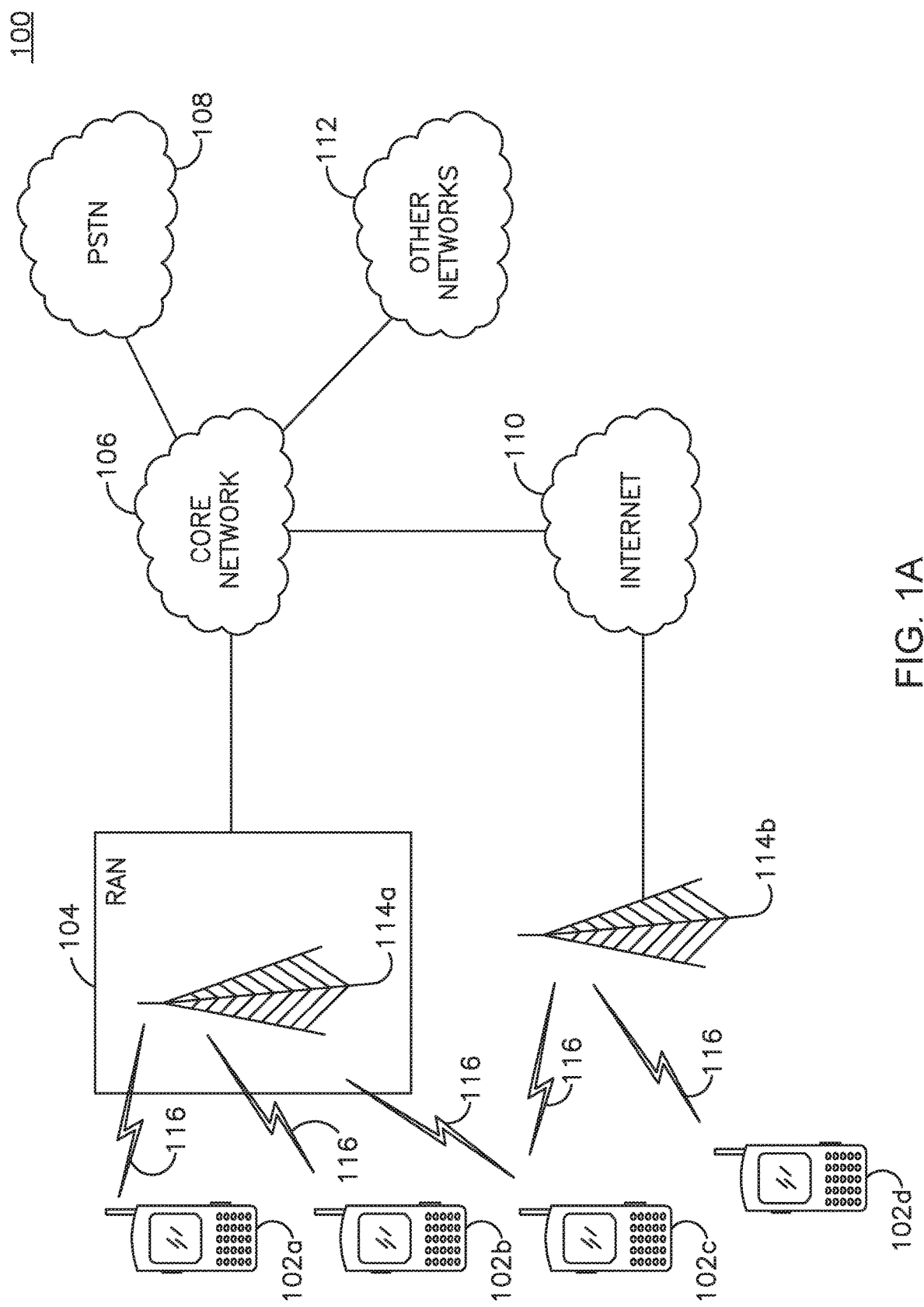
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal frequency division multiplexing, orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDM, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.11 (WLAN), 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
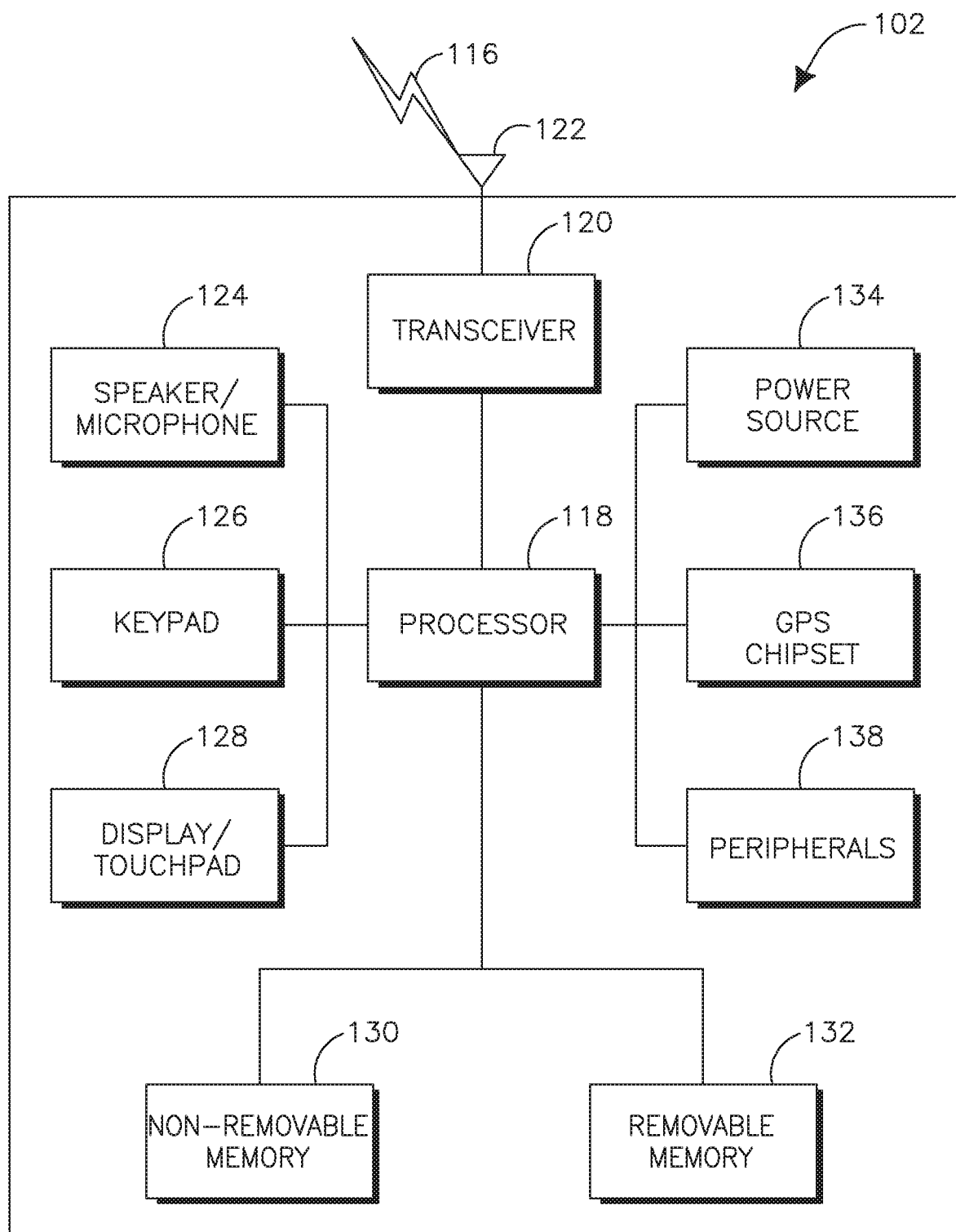
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
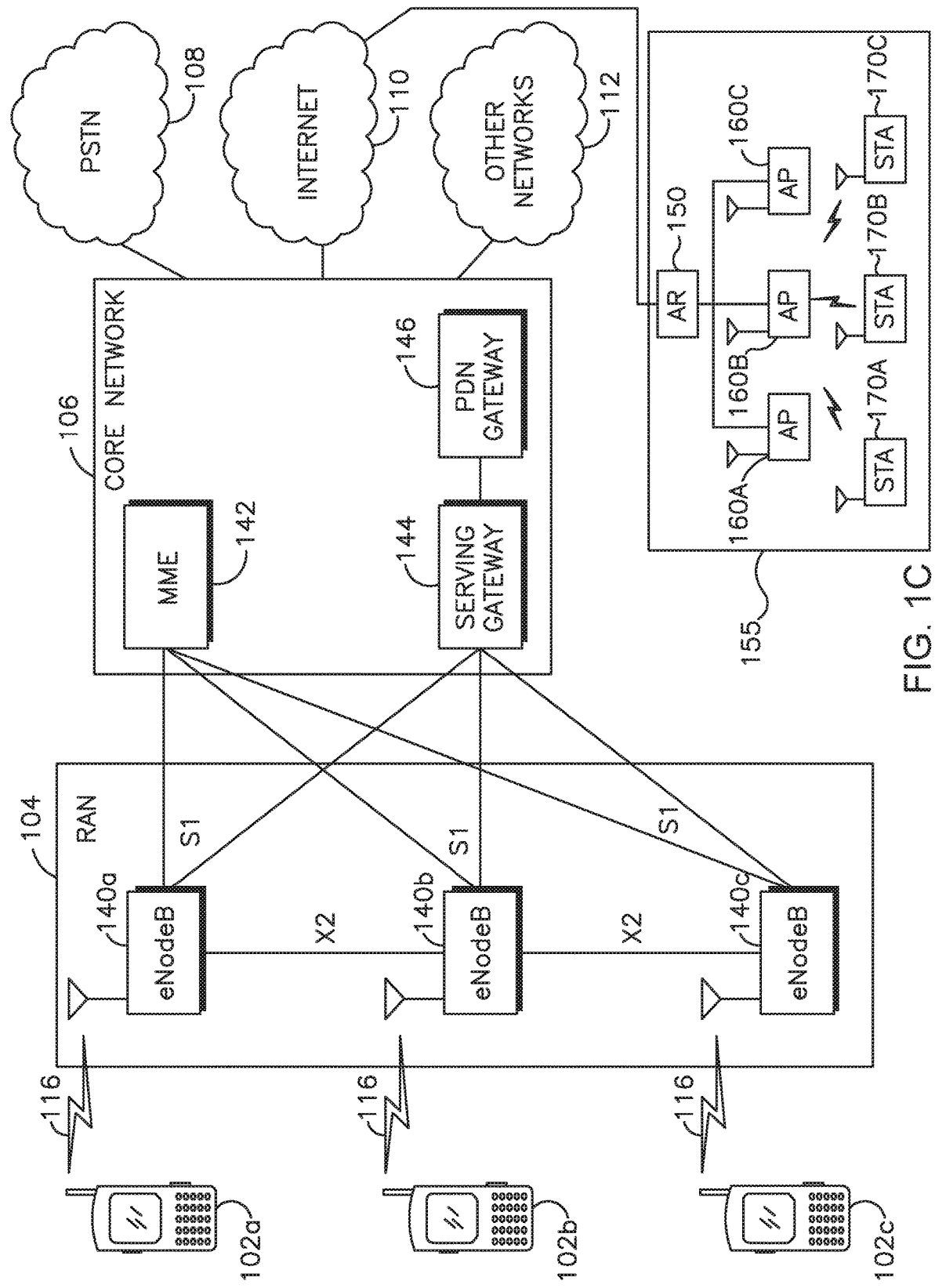
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

To serve STAs with poor wireless link conditions more efficiently with respect to the power budget, relay functionality was introduced. A relay node allows range extension and supports packet/frame forwarding between source and destination nodes. A relay node is a device that may include two logical entities: a relay STA (R-STA) and a relay AP (R-AP). The R-STA associates with a parent node or AP. The R-AP allows STAs to associate and obtain connectivity to the parent node/AP via the R-STA.

A simple bidirectional two-hop relay function has been proposed using one relay node. Two-hop relaying uses a bidirectional relay function, reduces power consumption on the STA with battery constraints, has a limited modulation and coding set (MCS) range, shares one transmit opportunity (TXOP) to reduce the number of contentions for channel access, uses address buffer overflow at the relay node with a flow control mechanism, uses a probe request for relay node discovery, and includes information on the AP-STA link budget (if available) to reduce the number of responses.

Figure 2:
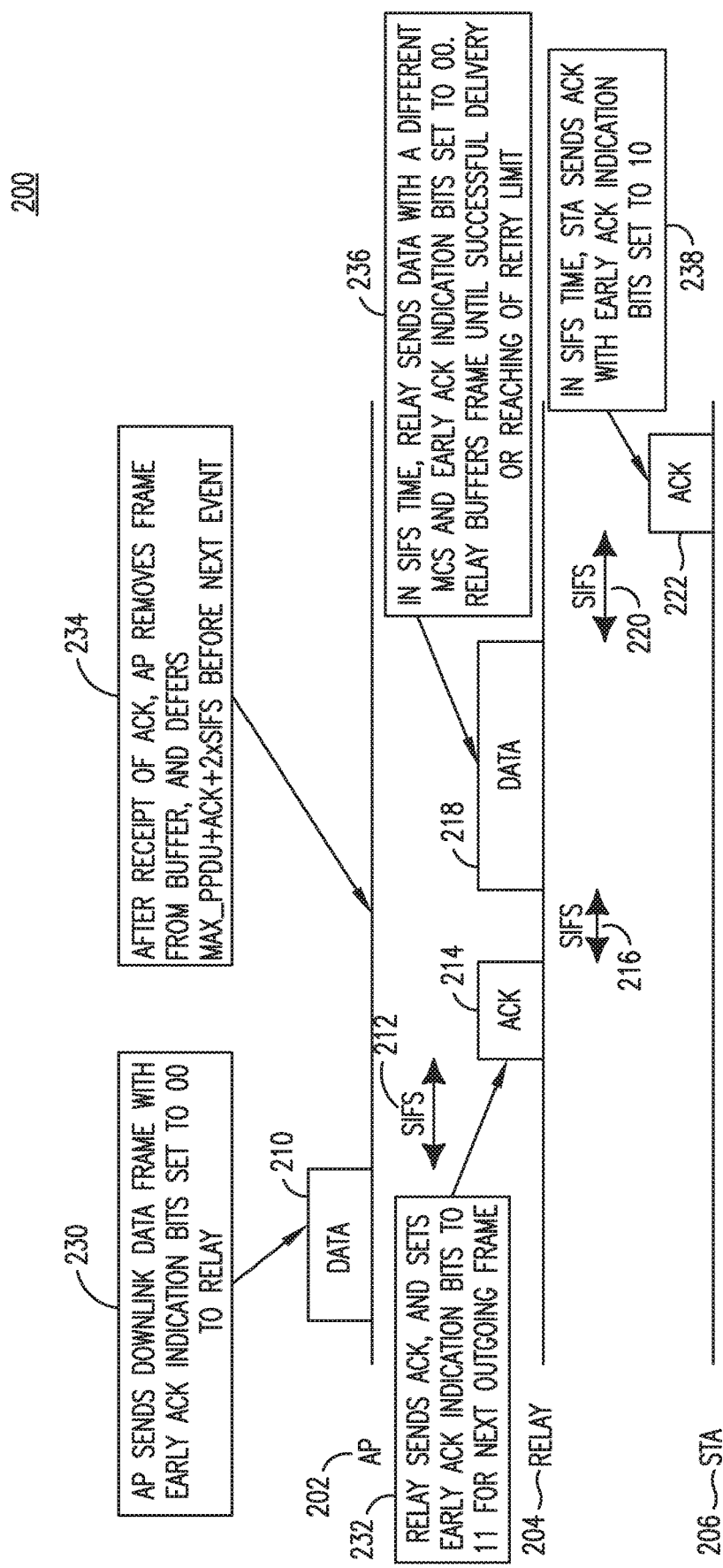
FIG. 2 is a signal diagram of a downlink relay with an explicit ACK.

FIG. 2 is a signal diagram of a downlink relay procedure 200 from an AP (source) to a STA (destination) through a relay node. The procedure 200 is performed between an AP 202, a relay node 204, and a STA 206. The AP 202 sends a downlink data frame 210 with the early ACK indication bits set to "00" to the relay node 204 (step 230). After a short interframe space (SIFS) interval 212, the relay node 204 sends an ACK 214 to the AP 202 and sets the early ACK indication bits for the next outgoing frame to "11" (step 232). After receiving the ACK 214, the AP 202 removes the data frame 210 from its transmission buffer and defers for a period of time equal to: MAX_PPDU+ACK+(2×SIFS) before the next event (step 234).

After a second SIFS interval 216, the relay node 204 sends a data frame 218 to the STA 206 (step 236). The relay node 204 sends the data frame 218 with a different MCS than was used for the data frame 210 and sets the early ACK indication bits to "00." The relay node 204 buffers the data frame 218 until successful delivery to the STA 206 or until a retry limit is reached. If the STA 206 successfully receives the data frame 218, after a third SIFS interval 220, the STA 206 sends an ACK 222 to the relay node 204, with the early ACK indication bits set to "10" (step 238).

FIG. 3 is a signal diagram of an uplink relay method 300 from a STA (source) to an AP (destination) through a relay node. The method 300 is performed between an AP 302, a relay node 304, and a STA 306. The STA 306 sends an uplink data frame 310 with the early ACK indication bits set to "00" to the relay node 304 (step 330). After a SIFS interval 312, the relay node 304 sends an ACK 314 to the STA 306 and sets the early ACK indication bits for the next outgoing frame to "11" (step 332). After receiving the ACK 314, the STA 306 removes the data frame 310 from its transmission buffer and defers for a period of time equal to: MAX_PPDU+ACK+(2×SIFS) before the next event (step 334).

After a second SIFS interval 316, the relay node 304 sends a data frame 318 to the AP 302 (step 336). The relay node 304 sends the data frame 318 with a different MCS than was used for the data frame 310 and sets the early ACK indication bits to "00." The relay node 304 buffers the data frame 318 until successful delivery to the AP 302 or until a retry limit is reached. If the AP 302 successfully receives the data frame 318, after a third SIFS interval 320, the AP 302 sends an ACK 322 to the relay node 304, with the early ACK indication bits set to "10" (step 338).

A Relay Element is defined for using in connection with the relay operation and may be used with any of the embodiments described herein. A STA with dot11RelaySTACapable set to true includes the Relay Element in an association request or a probe request, for example. The Relay Element contains parameters to support the relay operation. FIG. 4 shows a Relay Element format 400, including an element ID field 402, a length field 404, a Relay Control field 406, and a root AP BSSID field 408.

The element ID field 402 includes an identified for the Relay Element 400. The length field 404 includes a length of the Relay Element 400. The Relay Control field 406 indicates whether the AP is a root AP or whether it relays an SSID, as specified in Table 1.

TABLE 1

| Relay Control | Meaning |
| --- | --- |
| 0 | Root AP |
| 1 | Relayed SSID |
| 2-255 | Reserved |

The rootAP BSSID field 408 indicates the BSSID of the root AP.

A STA paged via a traffic indication map (TIM) is implicitly assigned a restricted access window (RAW) slot. The AP allocates an equal-length time slot for the STA to send a PS-Poll frame and to retrieve the downlink (DL) data.

$$\text{RAW slot index} f(x)=(x+N_{offset}) \mod N_{RAW} \quad \text{Equation (1)}$$

$N_{RAW}=T_{RAW}/T_S$, where $T_{RAW}$ is the entire RAW duration, $T_S$ is the duration of one RAW slot, and x is the position index of a paged STA or association identifier (AID).

With relay being used, the end-STA (the destination STA in a relay procedure) takes more time to send the PS-Poll and retrieve the DL data, causing time slot misalignment for all STAs (relay or non-relay), and the current implicit time slot allocation method does not work. For a system that uses relay functions, there are two issues: the assigned RAW slot of a regular STA may collide with the beacon/TIM transmitted by a R-AP, and the assigned RAW slot of the end-STA may collide with the RAW slot of other STAs because when the end-STA receives the RAW slot information it is delayed by the relay.

Therefore, methods to resolve the collision of the RAW slot are required to ensure proper DL data retrieval, and a procedure for the end-STA using relay to retrieve DL data via TIM that can keep the current procedures for non-relay STA intact is desired.

Figure 5:
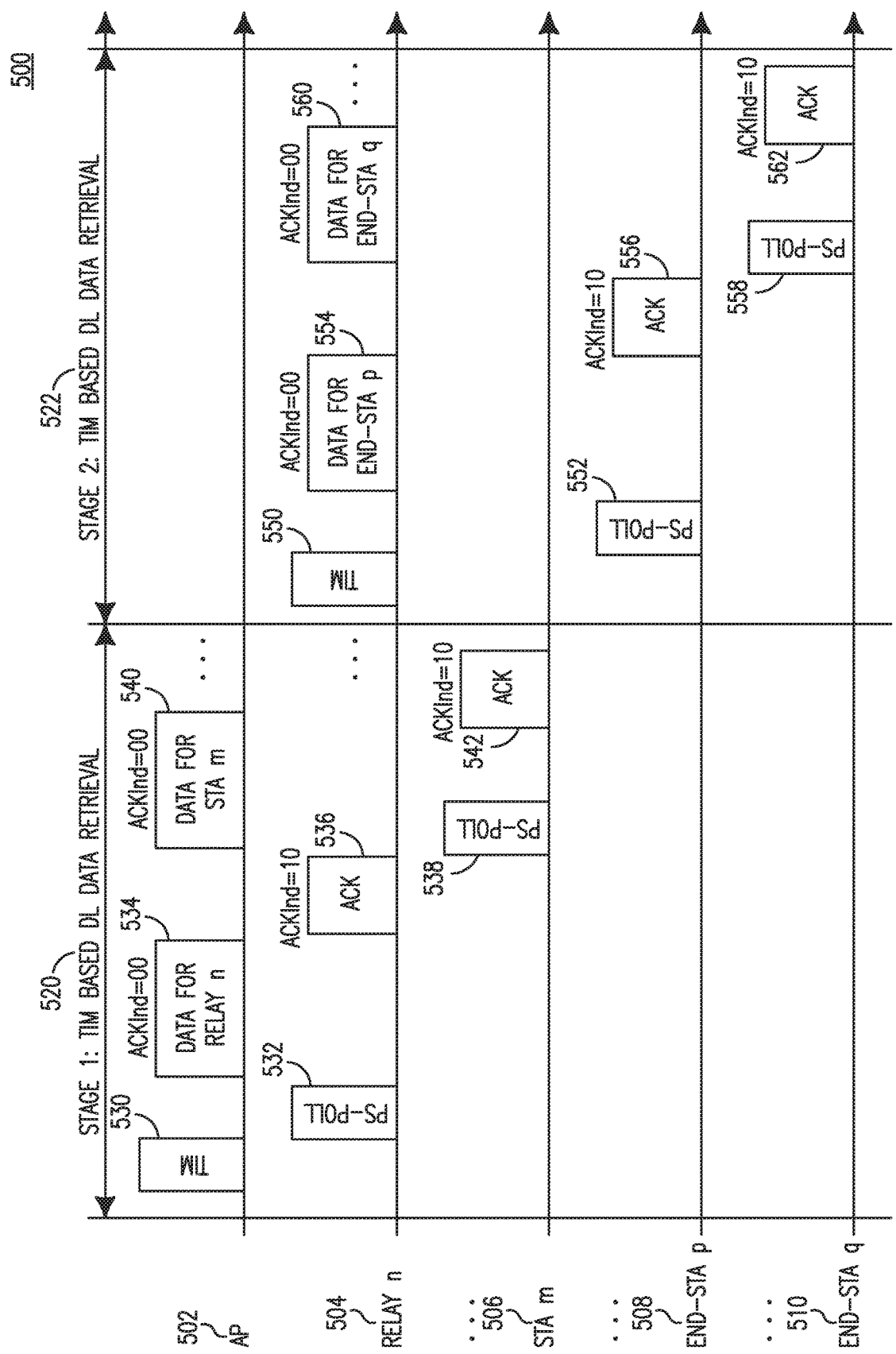
FIG. 5 is a signal diagram of downlink data retrieval for relay using a traffic indication map (TIM)-based retrieval.

FIG. 5 is a signal diagram of downlink data retrieval method 500 for relay using a two-step traffic indication map (TIM)-based DL data retrieval. The method 500 is performed between an AP 502, a relay node n 504, a STA m 506, a first end-STA p 508, and a second end-STA q 510. The method 500 includes two stages: stage 1 520 is a TIM-based DL data retrieval between the root AP and STAs (including relay nodes) associated to the root AP, and stage 2 522 is a TIM-based DL data retrieval between the relay node and end-STAs associated to the relay node.

In stage 1 520, the relay node retrieves the DL data from the AP on behalf of the end-STA using the TIM. The AP 502 broadcasts a TIM 530 with a positive indication of DL data buffered at the AP for STAs 506, 508, 510. The positive indication in the TIM 530 may be set using one of the following approaches. A positive indication in the TIM 530 is reflected on the AID of each end-STA 508, 510 that is associated through the relay node 504. Alternately, a positive indication in the TIM 530 is reflected on the AID of the relay node 504 if at least one end-STA that is associated through the relay node 504 has DL data buffered at the AP 502, then the AP 502 sets a positive indication for the relay node 504 in the TIM 530. Alternately, a positive indication in the TIM 530 is indicated by using a broadcast side channel from the AP 502, which may be specific to a group of STAs associated through the relay node 504.

Upon receiving a positive indication in the TIM 530 for its own AID, or at least one positive indication for the AID of end-STAs associated with it, the relay node 504 (the R-STA entity within it) sends a PS-Poll frame 532, or similar management frame, in the UL to retrieve the DL data from the AP 502 on behalf of the end-STA(s). In the case where the relay node 504 receives more than one positive indication for the AID of end-STAs associated with it, the relay node 504 may choose to implement one or more of the following procedures.

The relay node 504 sends a PS-Poll frame 532 for each end-STA associated with the relay node with a positive indication in a one-by-one manner. The AID/Duration field in the PS-Poll frame 532 is set to the AID of the end-STA, which is different than the transmitter address (TA) in the PS-Poll frame.

Alternately, the relay node 504 sends a PS-Poll frame 532 for all end-STAs associated with the relay node with a positive indication. The AID/Duration field in the PS-Poll frame 532 is set to a special value which represents "all end-STAs."

Alternately, the relay node 504 sends a PS-Poll frame 532 for each subset of all end-STAs associated with the relay node with a positive indication in a subset-by-subset manner. The AID/Duration field in the PS-Poll frame 532 may be reused to signal the subset of associated end-STAs.

Upon receiving the PS-Poll frame 532 from the relay node 504 retrieving DL data for one or several end-STAs, the AP 502 sends the DL data 534 as a medium access control (MAC) protocol data unit (MPDU) for one end-STA or as an aggregate MPDU (A-MPDU) for several end-STAs to the relay node 504.

If the relay node 504 receives the DL data 534 for the end-STA from the AP correctly, it sends an ACK 536 and sets the ACK indication bits. As an example, the relay node 504 may set the ACK indication bits to "10" for the next outgoing frame. This may be interpreted by the AP 502 that the relay node 504 will not forward the DL data 536 to the corresponding end-STA immediately because it may be in a sleep/doze mode.

If the TIM 530 contains a positive indication for the STA m 506, the STA m 506 sends a PS-Poll frame 538 to the AP 502. Upon receiving the PS-Poll frame 538, the AP 502 sends a data frame 540 to the STA m 506, with the ACK indication bits set to "00." Upon receiving the data frame 540, the STA m 506 sends an ACK 542 and sets the ACK indication bits to "10." Any non-relay STA associated to the root AP retrieves its DL data as presently known.

In stage 2 522, the end-STA retrieves the DL data from the relay node using the TIM. The relay node n 504 broadcasts a TIM 550, with only positive indications of end-STAs that are associated with the relay node n 504. Upon receiving a positive indication in the TIM 550, the end-STA p 508 sends a PS-Poll frame 552 in the UL to retrieve the DL data from the relay node n 504. Upon receiving the PS-Poll frame 552 from the end-STA p 508, the relay node n 504 sends the DL data 554 using a three-address format to the end-STA p 508 with the ACK indication bits set to "00." If the end-STA p 508 receives the DL data 554 correctly from the relay node n 504, it sends an ACK 556 and sets the ACK indication bits to "10" for the next outgoing frame.

Similarly, upon receiving a positive indication in the TIM 550, the end-STA q 510 sends a PS-Poll frame 558 in the UL to retrieve the DL data from the relay node n 504. Upon receiving the PS-Poll frame 558 from the end-STA q 510, the relay node n 504 sends the DL data 560 using a three-address format to the end-STA q 510 with the ACK indication bits set to "00." If the end-STA q 510 receives the DL data 560 correctly from the relay node n 504, it sends an ACK 562 and sets the ACK indication bits to "10" for the next outgoing frame.

In this way, there is no impact on non-relay STAs, and they do not need to be aware of one or more relay nodes being used, because the time slot allocated to the relay node is the same as the time slot for the non-relay STA.

Figure 6:
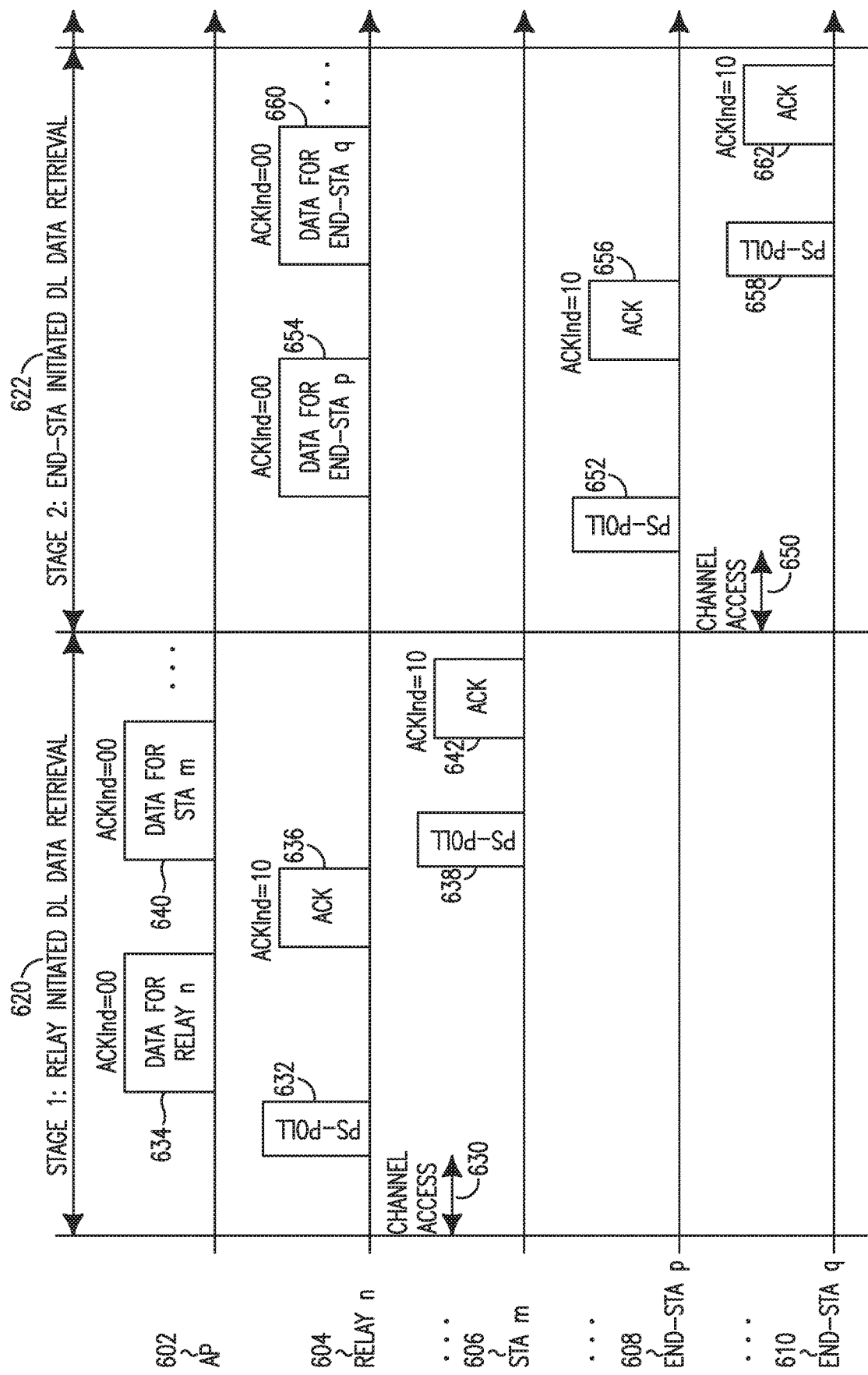
FIG. 6 is a signal diagram of downlink data retrieval for relay using a relay-initiated retrieval.

FIG. 6 is a signal diagram of downlink data retrieval method 600 for relay using a relay node-initiated retrieval. The method 600 is performed between an AP 602, a relay node n 604, a STA m 606, a first end-STA p 608, and a second end-STA q 610. The method 600 includes two stages: stage 1 620 is a relay node-initiated DL data retrieval, and stage 2 622 is an end-STA initiated DL data retrieval.

In stage 1 620, during a channel access period 630 (a time period during which a device is allowed to access the channel), the relay node n 604 sends a PS-Poll frame 632 in the UL to the AP 602 at any time on behalf of a set of particular end-STAs associated with the relay node n 604 (in this capacity, the relay node n 604 functions as a R-AP). The set of the particular end-STAs may be a specific set of end-STAs associated with the R-AP entity within the relay node n 604. The AID/Duration field in the PS-Poll frame 632 is set to the AID of the end-STA, which is different than the TA address in the PS-Poll frame. Alternately, the set of the particular end-STAs may be all end-STAs associated with the R-AP entity within the relay node n 604. The AID/Duration field in the PS-Poll frame 632 is set to a special value which represents "all end-STAs." Alternately, the set of the particular end-STAs may be a subset of all end-STAs associated with the R-AP entity within the relay node n 604. The AID/Duration field in the PS-Poll frame 632 may be reused to signal the subset of associated end-STAs.

Upon receiving the PS-Poll frame 632 from the relay node n 604, the AP 602 sends the DL data 634 (as a MPDU for one end-STA or as an A-MPDU for several end-STAs) to the relay node n 604. Alternatively, the AP 602 may reply to the PS-Poll frame 632 with an ACK frame that contains a one-bit field with a "1" indicating that traffic is buffered (as indicated in the TIM) and that the end-STA should stay awake (i.e., a service period starts) or a "0" indicating that no traffic is buffered, so the end-STA should go back to sleep. The AP starts transmitting the DL data 634 to the relay node n 604 after an interframe space (IFS) time (for example, a SIFS following the ACK frame.

If the relay node n 604 receives the DL data 634 for the end-STA from the AP 602 correctly, it sends an ACK frame 636 and sets the ACK indication bits to "10" for the next outgoing frame, which means that the relay node n 604 will not forward the DL data 634 to the corresponding end-STA immediately, because it may be in a sleep/doze mode. The ACK frame 636 may be designed specifically for this purpose; for example, a short ACK frame may be used.

Alternately, the STA m 606 sends a PS-Poll frame 638 to the AP 602. Upon receiving the PS-Poll frame 638, the AP 602 sends a data frame 640 to the STA m 606, with the ACK indication bits set to "00." Upon receiving the data frame 640, the STA m 606 sends an ACK frame 642 and sets the ACK indication bits to "10." The ACK frame 642 may be designed specifically for this purpose; for example, a short ACK frame may be used. Any non-relay STA associated to the root AP retrieves its DL data as presently known.

In stage 2 622, the end-STA wakes up at any time to send a PS-Poll frame in the UL to its associated relay node (i.e., the R-AP entity within the relay node) to retrieve the DL data from the relay node. During a channel access period 650, the end-STA p 608 sends a PS-Poll frame 652 to the relay node n 604. Upon receiving the PS-Poll frame 652, the relay node n 604 sends the DL data 654 using the three-address format to the end-STA p 608 with the ACK indication bits set to "00." Alternatively, the relay node n 604 may reply to the PS-Poll frame 652 with an ACK frame that contains a one-bit field, with a "1" indicating that traffic is buffered (as indicated in the TIM) and the end-STA should stay awake (i.e., a service period starts), and a "0" indicating that no traffic is buffered and the end-STA should go back to sleep. The relay node n 604 starts transmitting the DL data 654 to the end-STA p 608 after an IFS time (for example, a SIFS) following the ACK frame. If the end-STA p 608 receives the DL data 654 correctly from the relay node n 604, it sends an ACK frame 656 and sets the ACK indication bits to "10" for the next outgoing frame.

Similarly, during the channel access period 650, the end-STA q 610 sends a PS-Poll frame 658 to the relay node n 604. Upon receiving the PS-Poll frame 658, the relay node n 604 sends the DL data 660 using the three-address format to the end-STA q 610 with the ACK indication bits set to "00." Alternatively, the relay node n 604 may reply to the PS-Poll frame 658 with an ACK frame that contains a one-bit field, with a "1" indicating that traffic is buffered (as indicated in the TIM) and the end-STA should stay awake (i.e., a service period starts), and a "0" indicating that no traffic is buffered and the end-STA should go back to sleep. The relay node n 604 starts transmitting the DL data 660 to the end-STA q 610 after an IFS time (for example, a SIFS) following the ACK frame. If the end-STA q 610 receives the DL data 660 correctly from the relay node n 604, it sends an ACK frame 662 and sets the ACK indication bits to "10" for the next outgoing frame.

A third method for DL data retrieval may be used (not shown in the Figures), which is a hybrid method using stage 1 520 of the method 500 (the relay node retrieves the DL data from the AP on behalf of the end-STA using the TIM) and stage 2 622 of the method 600 (the end-STA initiates DL data retrieval from the relay node).

A fourth method for DL data retrieval may be used (not shown in the Figures), which is a hybrid method using stage 1 620 of the method 600 (relay initiated DL data retrieval from the AP) and stage 2 522 of the method 500 (the end-STA retrieves the DL data from the relay node using the TIM).

Relay functionality may be used to serve STAs with poor link budgets. When a R-AP receives the UL data from an end-STA, it replies with an ACK. When the AP receives the relayed UL data from the R-STA, it replies with an ACK to the R-STA. However, the path through the relay node may not always be reliable and may have temporary outages or flow/buffer management issues, where some data/frames will be thrown out. To accommodate this, there is a need to introduce a properly designed ACK and efficient flow control for receiving and transmitting frames at the relay node. In addition, the network allocation vector (NAV) setting along the relay path needs to be carried out efficiently.

STAs that are at the edge of a BSS coverage area typically suffer poor link quality. In addition, such STAs may also suffer from hidden node issues and overlapping BSS (OBSS) interference. These STAs may be served efficiently with respect to power budget by using a relay.

A relay node is typically capable of supporting a four-address frame (i.e., transmitter, receiver, source address, and destination address) and forwarding the frame from a source node to the destination node. Typically, the relay node is aware that a frame from the source node is to be forwarded to a destination node by the destination node address included in the frame when it is transmitted by the source node to the relay node.

The channel conditions from the relay node to the destination node may sometimes deteriorate. The source node is not aware of this channel condition and may therefore keep sending frames to the relay node, which may cause congestion and buffer overflow at the relay node, leading to packet or frame loss. An efficient flow control mechanism is required where the relay node needs to stop accepting new frames when its frame/packet buffer is full and try to transmit the currently buffered frames before accepting new frames. To do this, the relay node should be able to signal to the source node to stop sending frames. This may be achieved by signaling using the "10" value for the early ACK indication bits in the SIG field of the PHY preamble/header and using the associated protocol and procedures described below.

When a relay node sends an ACK, BA, or any other frame to the source node (AP/STA) with a "10" value for the early ACK indication bits in response to a frame from the source node to be forwarded to the destination node, the source node may follow one or more of the following relay flow control procedures.

(1) The source node stops sending more frames to the relay node or does not attempt to send more frames to the relay node.

(2) The source node does not attempt to send more data until after a specified time.

(3) The source node does not attempt to send more data until the relay node explicitly signals that it may do so.

(4) The source node attempts to resend the current data frame.

(5) The source node attempts to resend the current data frame after a specified time.

(6) The source node attempts to resend the current data frame only after the relay node explicitly signals that it may do so.

(7) The source node may truncate the TXOP if needed, for example, with a CF-End frame.

In relay flow control in the DL (AP to STA) for a typical data/ACK sequence, the source node (AP) sends frames (e.g., data frames) to the relay node to be forwarded to the destination node. In normal relay operation, the relay node sets a "11" value for the early ACK indication as long as the relay node can or will forward data frames to the destination node. So the relay node will set the early ACK indication to "11" regardless of whether the data frame has the "more data" field set to "1" (indicating that the source node has more data frames to send after the current data frame) or the data frame has the "more data" field set to "0" (indicating that the source node has no more data frames to send after the current data frame).

If the relay node cannot receive more frames or equivalently cannot forward more frames, it sends a response frame, e.g., an ACK frame with a "10" value for the early ACK indication. Upon receiving an ACK frame from the relay node with a "10" value for the early ACK indication, in response to a frame from the source node that should be forwarded to the destination node, the source node (AP) may stop sending frames to the relay node for forwarding and follow the relay flow control procedures.

Figure 7:
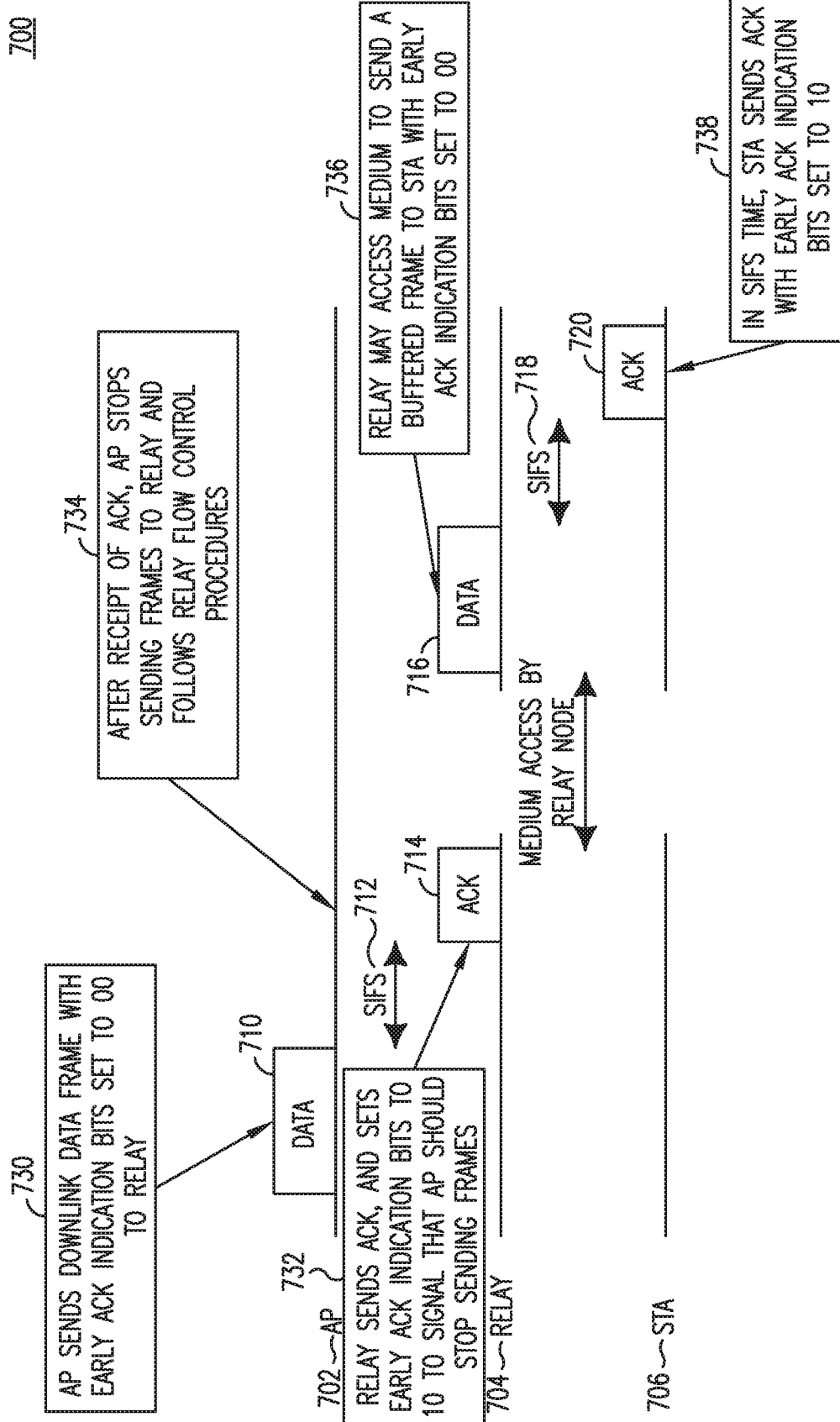
FIG. 7 is a signal diagram of relay flow control in the downlink for a data/ACK frame sequence.

FIG. 7 is a signal diagram of relay flow control method 700 in the DL (AP to STA) for a data/ACK frame sequence. The method 700 is performed between an AP 702, a relay node 704, and a STA 706. The AP 702 sends a DL data frame 710 to the relay node 704 with the early ACK indication bits set to "00" (step 730). Upon successful receipt of the DL data frame 710 and after a SIFS interval 712, the relay node 704 sends an ACK frame 714 to the AP 702. The relay node 704 sets the early ACK indication bits in the ACK frame 714 to "10" to signal that the AP 702 should stop sending frames (step 732). After receiving the ACK frame 714, the AP 702 stops sending frames to the relay node 704 and follows the relay flow control procedures (step 734).

The relay node 704 may access the medium to send a buffered data frame 716 to the STA 706 with the early ACK indication bits set to "00" (step 736). Upon successful receipt of the data frame 716 and after a SIFS interval 718, the STA 706 sends an ACK frame 720 to the relay node 704 with the early ACK indication bits set to "10" (step 738).

In one embodiment of the method 700, a short ACK may be used in place of the ACK.

In relay flow control in the UL (STA to AP) for a typical data/ACK sequence, the source node (STA) sends frames (e.g., data frames) to the relay node to be forwarded to the destination node. Similar to normal relay operation for the DL, in normal relay operation in the UL, the relay node sets a "11" value for the early ACK indication as long as the relay node can or will forward data frames to the destination node. So the relay node will set the early ACK indication to "11" regardless of whether the data frame has the "more data" field set to "1" (indicating that the source node has more data frames to send after the current data frame) or the data frame has the "more data" field set to "0" (indicating that the source node has no more data frames to send after the current data frame).

If the relay node cannot receive more frames or equivalently cannot forward more frames, it sends a response frame, e.g., an ACK frame with a "10" value for the early ACK indication. Upon receiving an ACK frame from the relay node with a "10" value for the early ACK indication, in response to a frame from the source node that should be forwarded to the destination node, the source node (STA) may stop sending frames to the relay node for forwarding and follow the relay flow control procedures.

Figure 8:
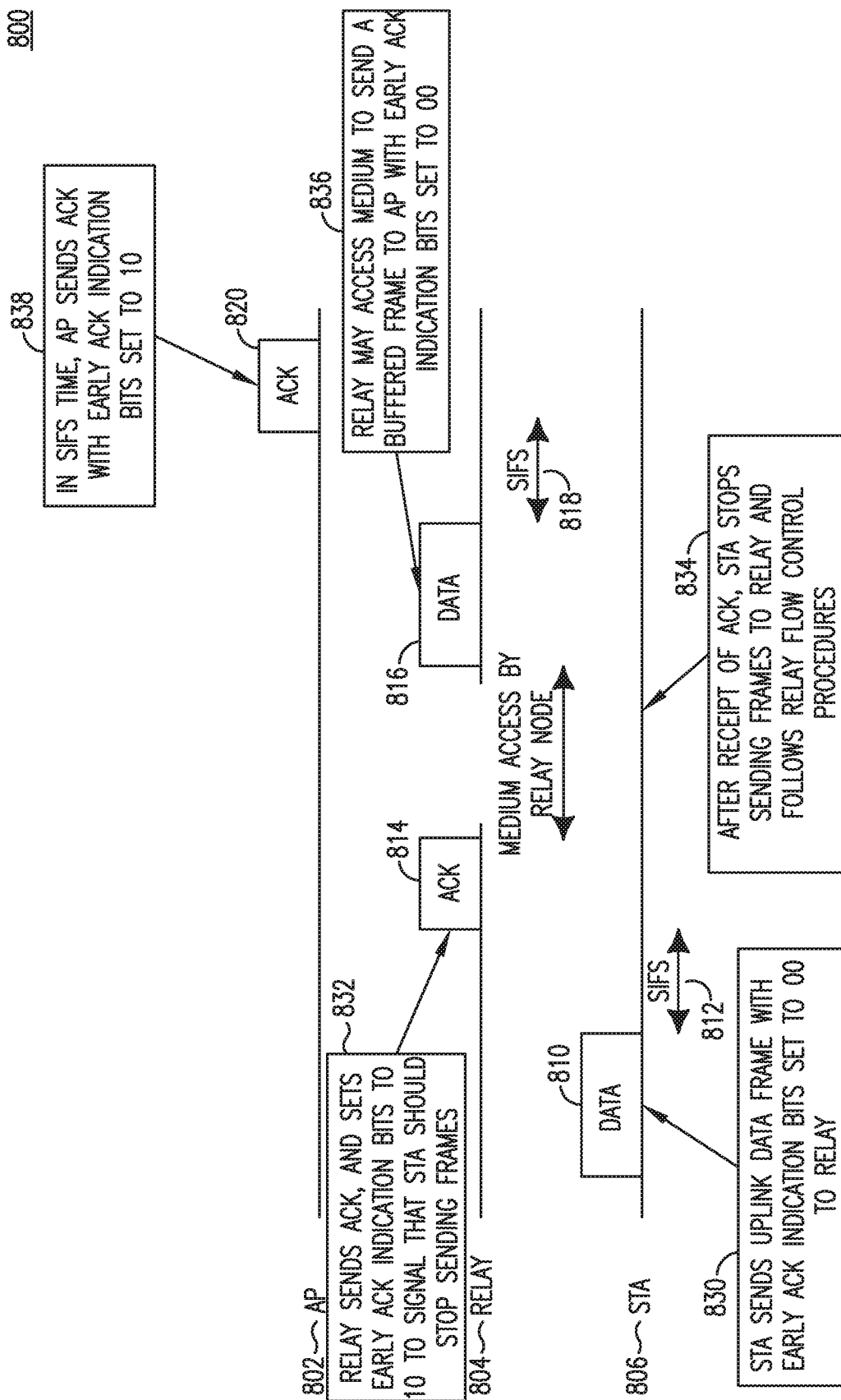
FIG. 8 is a signal diagram of relay flow control in the uplink for a data/ACK frame sequence.

FIG. 8 is a signal diagram of relay flow control method 800 in the UL (STA to AP) for a data/ACK frame sequence. The method 800 is performed between an AP 802, a relay node 804, and a STA 806. The STA 806 sends an UL data frame 810 to the relay node 804 with the early ACK indication bits set to "00" (step 830). Upon successful receipt of the data frame 810 and after a SIFS interval 812, the relay node 804 sends an ACK frame 814 to the STA 806. The relay node 804 sets the early ACK indication bits in the ACK frame 814 to "10" to signal that the STA 806 should stop sending frames (step 832). After receiving the ACK frame 814, the STA 806 stops sending frames to the relay node 804 and follows the relay flow control procedures (step 834).

The relay node 804 may access the medium to send a buffered data frame 816 to the AP 802 with the early ACK indication bits set to "00" (step 836). Upon successful receipt of the data frame 816 and after a SIFS interval 818, the AP 802 sends an ACK frame 820 to the relay node 804 with the early ACK indication bits set to "10" (step 838).

In one embodiment of the method 800, a short ACK may be used in place of the ACK.

When A-MPDUs are forwarded on a relay path, it may improve the efficiency of frame transmission on the relay path because the A-MPDU carries aggregated MPDUs. So the relay path is now accessed for the aggregated transmission of MPDUs rather than individually for each MPDU/frame transmission. For this case, in the methods 700 and 800, the data frame is replaced by an A-MPDU and the ACK frame is replaced by a BA frame. The A-MPDU from the source node carries a "01" value in the early ACK indication field to signal a BA response. In the relay flow control for the A-MPDU/BA sequence, the BA from the relay node carries a "10" value for the early ACK indication field to signal to the source node to stop sending frames and to follow the relay flow control procedures.

In relay flow control for the DL (AP to STA) for a typical A-MPDU/BA sequence, if the relay node cannot receive more frames or equivalently cannot forward more frames, it sends a response frame (e.g., a BA frame) with a "10" value for the early ACK indication. Upon receiving a BA frame from the relay node with a "10" value for the early ACK indication, in response to a frame from the source node that should be forwarded to the destination node, the source node (AP) may stop sending frames to the relay node for forwarding and follow the relay flow control procedures.

Figure 9:
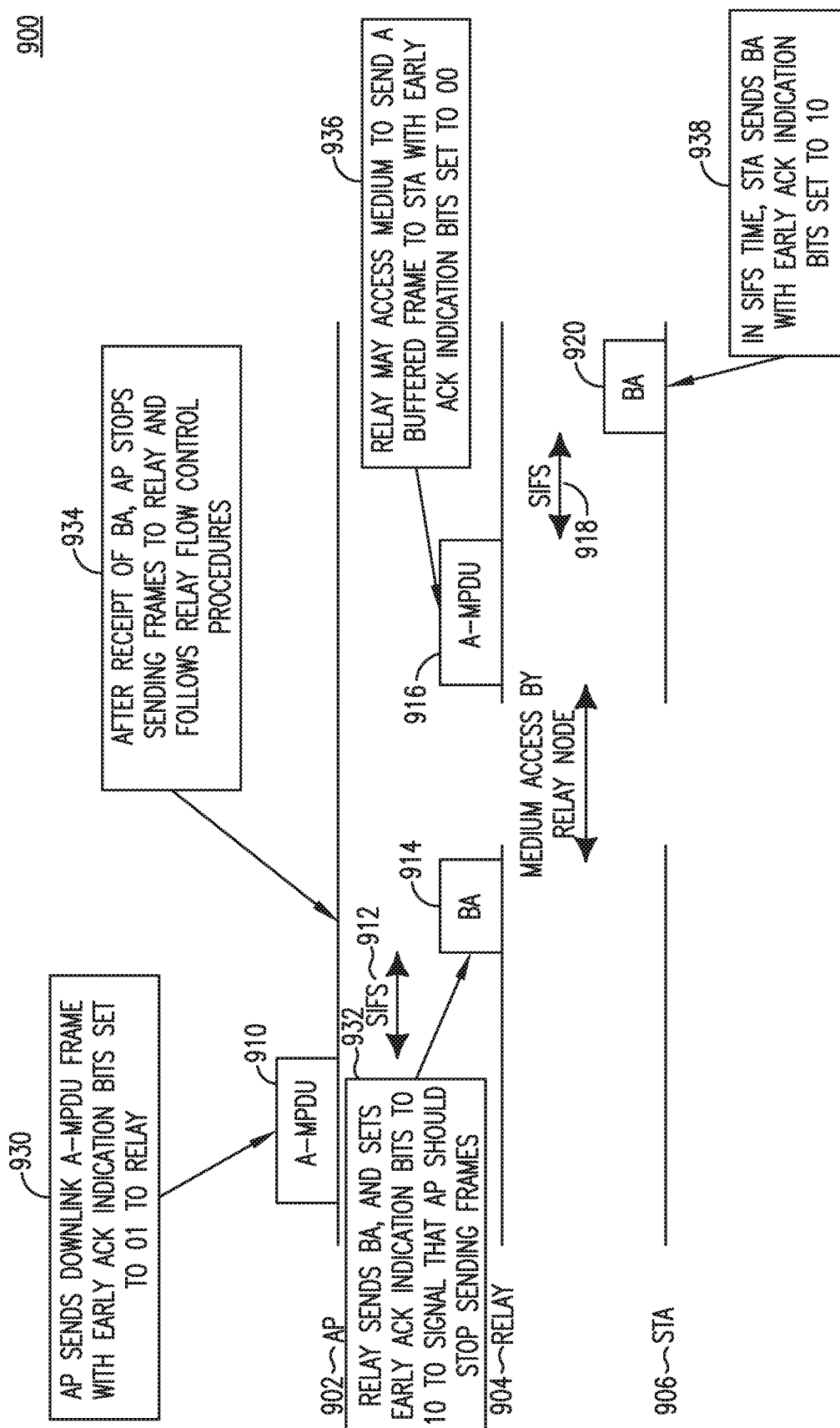
FIG. 9 is a signal diagram of relay flow control in the downlink for an aggregated medium access control protocol data unit (A-MPDU)/BA frame sequence.

FIG. 9 is a signal diagram of relay flow control method 900 in the DL for an A-MPDU/BA frame sequence. The method 900 is performed between an AP 902, a relay node 904, and a STA 906. The AP 902 sends a DL A-MPDU frame 910 to the relay node 904 with the early ACK indication bits set to "01" (step 930). Upon successful receipt of the A-MPDU frame 910 and after a SIFS interval 912, the relay node 904 sends a BA frame 914 to the AP 902. The relay node 904 sets the early ACK indication bits in the BA frame 914 to "10" to signal that the AP 902 should stop sending frames (step 932). After receiving the BA frame 914, the AP 902 stops sending frames to the relay node 904 and follows the relay flow control procedures (step 934).

The relay node 904 may access the medium to send a buffered A-MPDU frame 916 to the STA 906 with the early ACK indication bits set to "01" (step 936). Upon successful receipt of the A-MPDU frame 916 and after a SIFS interval 918, the STA 906 sends a BA frame 920 to the relay node 904 with the early ACK indication bits set to "10" (step 938).

In one embodiment of the method 900, a short BA may be used in place of the BA.

In relay flow control for the UL (STA to AP) for a typical A-MPDU/BA sequence, if the relay node cannot receive more frames or equivalently cannot forward more frames, it sends a response frame (e.g., a BA frame) with a "10" value for the early ACK indication. Upon receiving a BA frame from the relay node with a "10" value for the early ACK indication, in response to a frame from the source node that should be forwarded to the destination node, the source node (STA) may stop sending frames to the relay node for forwarding and follow the relay flow control procedures.

Figure 10:
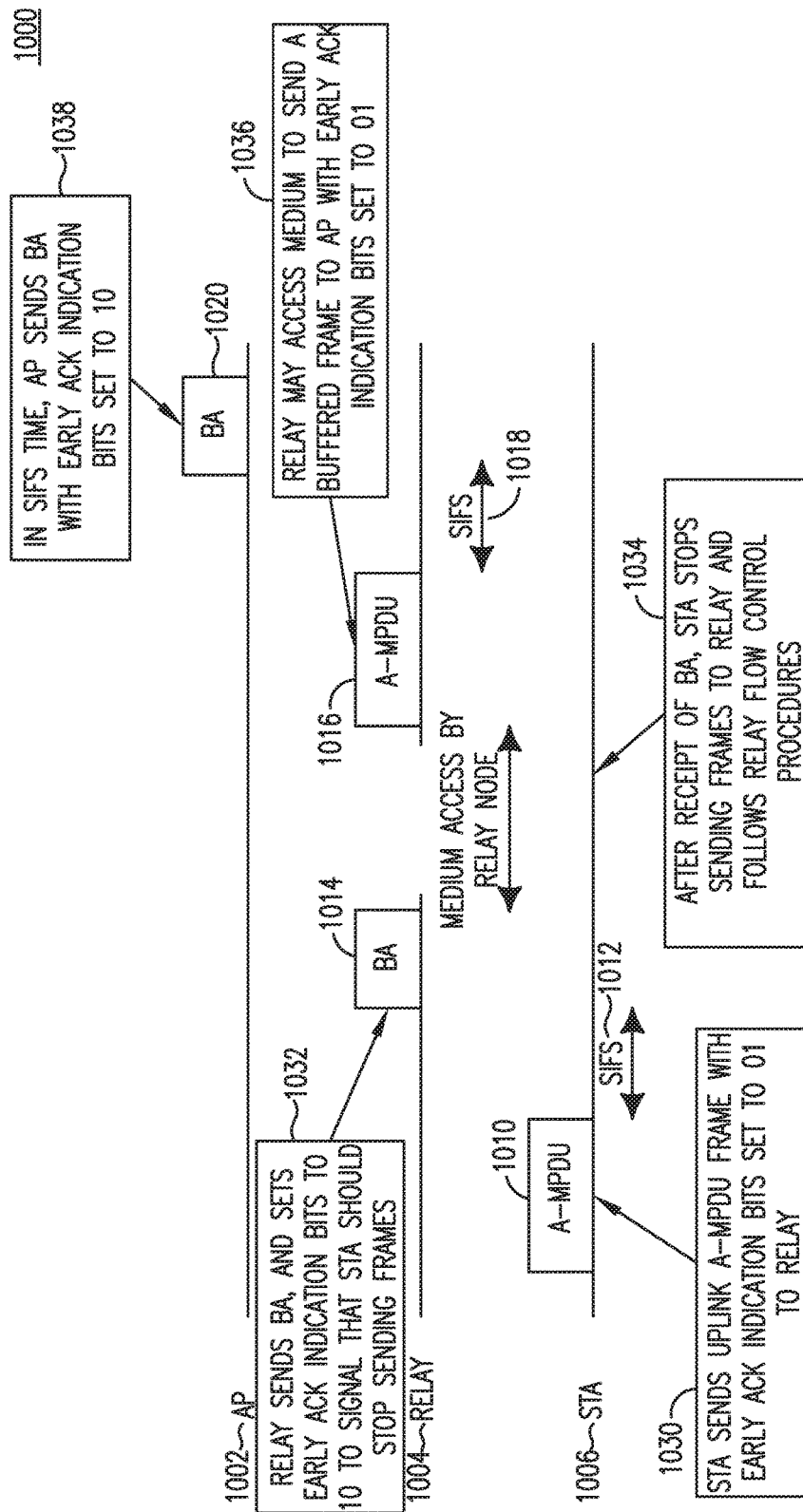
FIG. 10 is a signal diagram of relay flow control in the uplink for an A-MPDU/BA frame sequence.

FIG. 10 is a signal diagram of relay flow control method 1000 in the UL for an A-MPDU/BA frame sequence. The method 1000 is performed between an AP 1002, a relay node 1004, and a STA 1006. The STA 1006 sends an UL A-MPDU frame 1010 to the relay node 1004 with the early ACK indication bits set to "01" (step 1030). Upon successful receipt of the A-MPDU frame 1010 and after a SIFS interval 1012, the relay node 1004 sends a BA frame 1014 to the STA 1006. The relay node 1004 sets the early ACK indication bits in the BA frame 1014 to "10" to signal that the STA 1006 should stop sending frames (step 1032). After receiving the BA frame 1014, the STA 1006 stops sending frames to the relay node 1004 and follows the relay flow control procedures (step 1034).

The relay node 1004 may access the medium to send a buffered A-MPDU frame 1016 to the AP 1002 with the early ACK indication bits set to "01" (step 1036). Upon successful receipt of the A-MPDU frame 1016 and after a SIFS interval 1018, the AP 1002 sends a BA frame 1020 to the relay node 1004 with the early ACK indication bits set to "10" (step 1038).

In one embodiment of the method 1000, a short BA may be used in place of the BA.

In one embodiment, which may be used with any other embodiment described herein, a new short/null data packet (NDP) frame may be defined specifically for a relay node to send to the source node to signal to the source node to stop sending frames. Such a short/NDP frame is referred to herein as a short/NDP relay stop frame. A short/NDP relay stop frame, sent from the relay node to the source node, may have one or more of the following characteristics.

(1) The short/NDP relay stop frame may be sent by itself (i.e., not as a response frame) to prevent the source node from sending frames for forwarding.

(2) The short/NDP relay stop frame may be sent as a response to any frame sent from the source node for forwarding to the relay node. In this scenario, the source node behaves as described previously for the case when it receives a frame from the relay node with a "10" value for the early ACK indication, in response to a frame from the source node that should be forwarded to the destination node.

(3) The short/NDP relay stop frame may indicate that the last frame sent by the source node earlier was not forwarded and has to be resent.

(4) The short/NDP relay stop frame may include information indicating that one or more frames sent by the source node earlier were not forwarded and have to be resent.

(5) The short/NDP relay stop frame may include information on a specific time duration after which the source node may attempt to send frames for forwarding (i.e., a time out duration).

(6) The short/NDP relay stop frame may include any or all the above information in the SIG field of the PHY preamble of the frame.

Figure 11:
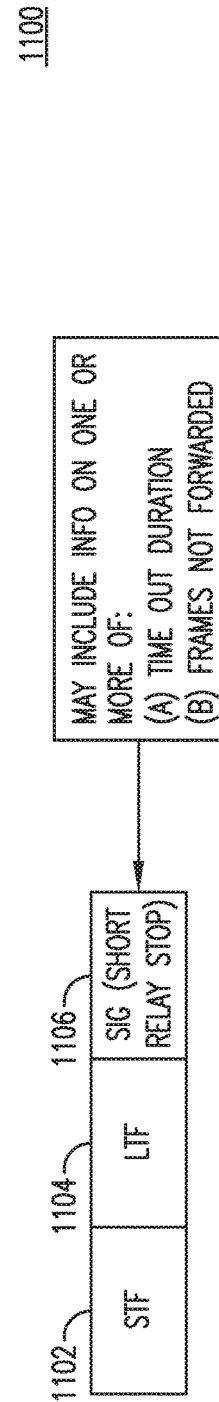
FIG. 11 is a diagram of a short/null data packet (NDP) relay stop frame format.

FIG. 11 is a diagram of a format of a short/NDP relay stop frame 1100. The short/NDP relay stop frame 1100 includes a short training field (STF) 1102, a long training field (LTF) 1104, and a signal (SIG) field 1106. The SIG field 1106 contains short/NDP relay stop information, including any one or more of: a time out duration for the source node or identifiers for any frames that were not forwarded to the destination node.

In another embodiment, a new frame that is a regular frame and not a short/NDP frame may be used in place of the short/NDP relay stop frame with the same functionality and characteristics of the short/NDP relay stop frame.

In one embodiment, which may be used with any other embodiment described herein, a new short/NDP frame may be defined specifically for a relay node to signal to the source node that it may attempt to start sending frames to the relay node or that it is able to receive more frames from the source node. Such a short/NDP frame is referred to herein as a short/NDP relay start frame. A short/NDP relay start frame, sent from the relay node to the source node, may have one or more of the following characteristics.

(1) The short/NDP relay start frame may be sent by itself (i.e., not as a response frame) to signal to the source node to attempt to send frames for forwarding.

(2) The short/NDP relay start frame may be sent as a response to a frame sent from the source node requesting the frame forwarding or relay service from the relay node.

(3) The short/NDP relay start frame may indicate that the last frame sent by the source node earlier was not forwarded and has to be resent.

(4) The short/NDP relay start frame may include information indicating that one or more frames sent by the source node earlier were not forwarded and have to be resent.

(5) The short/NDP relay start frame may include information on a specific time duration after which the source node may attempt to send frames for forwarding (i.e., a time out duration).

(6) The short/NDP relay start frame may include one or more of the following: the remaining buffer size at the relay node, a number of frames that may be sent by the source node, or a size of the frames that may be sent by the source node.

(7) The short/NDP relay start frame may include any or all the above information in the SIG field of the PHY preamble of the frame.

Figure 12:
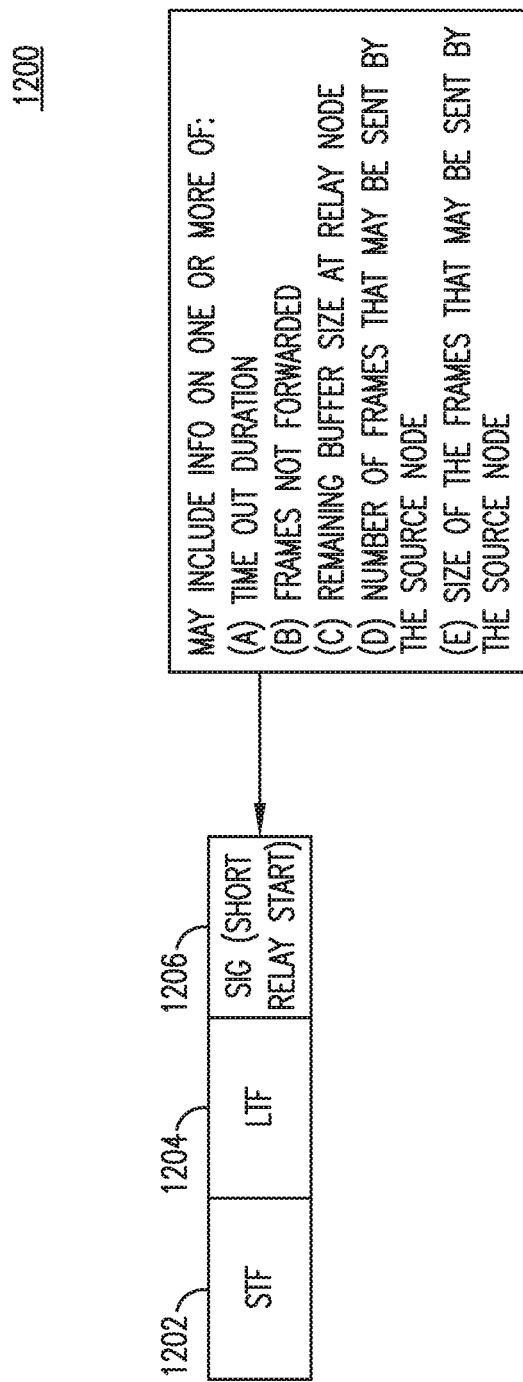
FIG. 12 is a diagram of a short/NDP relay start frame format.

FIG. 12 is a diagram of a format of a short/NDP relay start frame 1200. The short/NDP relay start frame 1200 includes a STF 1202, a LTF 1204, and a SIG field 1206. The SIG field 1206 contains short/NDP relay start information, including any one or more of: a time out duration for the source node, identifiers for any frames that were not forwarded to the destination node, the remaining buffer size at the relay node, a number of frames that may be sent by the source node, or a size of the frames that may be sent by the source node.

In another embodiment, a new frame that is a regular frame and not a short/NDP frame may be used in place of the short/NDP relay start frame with the same functionality and characteristics of the short/NDP relay start frame.

One transmit opportunity (TXOP) is shared with the relay node to reduce channel access contention, but this creates the following issues. If a TXOP is reserved from the source node to the relay node and from the relay node to the destination node and includes a SIFS and an ACK time, but the relay link is bad, then one part of the entire TXOP will be wasted. The current mechanism to reserve the TXOP is primarily one-hop, and may not be directly applicable to a two-hop relay. Therefore, a mechanism to reserve the TXOP from the source node to the relay node and from the relay node to the destination node is needed, and a method to truncate the relay-shared TXOP when the relay link goes bad is desired.

To facilitate the ready to send (RTS)/clear to send (CTS) based TXOP reservation for a two-hop based relay, a frame format for a relay-RTS (R-RTS) frame is described. The R-RTS frame may reuse the frame format of the existing RTS frame including the modifications described herein.

R-RTS format 1: The R-RTS frame includes a PLOP header and a MAC header which contains Frame Control, Duration, TA, receiver address (RA), and frame check sequence (FCS) fields. A one-bit field in the SIG field of the PLOP header is reused to indicate whether the R-RTS frame is used to reserve the TXOP for relay or the time duration by which if the PHY_RXSTART.indication primitive is not received, then a STA that used information from an RTS/R-RTS frame as the most recent basis to update its NAV is permitted to reset its NAV to be larger than the normal RTS/CTS case.

R-RTS format 2: The R-RTS frame includes a PLOP header and a MAC header which contains Frame Control, Duration, TA, RA, and FCS fields. Additionally, the MAC header contains a new one-bit indication which signals whether the R-RTS frame is used to reserve the TXOP for relay or the time duration by which if the PHY-RXSTART.indication primitive is not detected, then a STA that used information from an RTS/R-RTS frame as the most recent basis to update its NAV setting is permitted to reset its NAV is larger than the normal RTS/CTS case.

In both formats 1 and 2, if the one-bit indication (in the SIG field or in the MAC header) is set to "1", it implies the same information. A STA that used information from an RTS/R-RTS frame as the most recent basis to update its NAV setting is permitted to reset its NAV if no PHY-RXSTART.indication primitive is detected from the PHY during a period with a duration of:

$$(4 \times aSIFSTime)+(2 \times CTS\_Time)+(R\text{-}RTS\_Time)+ aPHY\text{-}RX\text{-}START\text{-}Delay+(4 \times aSlotTime) \quad \text{Equation (2)}$$

This period starts at the PHY-RXEND.indication primitive corresponding to the detection of the RTS/R-RTS frame if the relay node transmits a R-RTS frame in the two-hop relay TXOP reservation procedure (described below) is implemented. Alternatively, if the relay node transmits a CTS frame in the two-hop relay TXOP reservation procedure (described below) is implemented, the effective period is:

$$(5 \times aSIFSTime)+(3 \times CTS\_Time)+(R\text{-}RTS\_Time)+ aPHY\text{-}RX\text{-}START\text{-}Delay+(5 \times aSlotTime) \quad \text{Equation (3)}$$

If the one-bit indication is set to "0," it implies that a STA that used information from an RTS/R-RTS frame as the most recent basis to update its NAV setting is permitted to reset its NAV if no PHY-RXSTART.indication primitive is detected from the PHY during a period with a duration of:

$$(2 \times aSIFSTime)+(CTS\_Time)+aPHY\text{-}RX\text{-}START\text{-}Delay+(2 \times aSlotTime) \quad \text{Equation (4)}$$

This period starts at the PHY-RXEND.indication primitive corresponding to the detection of the RTS/R-RTS frame.

Figure 13:
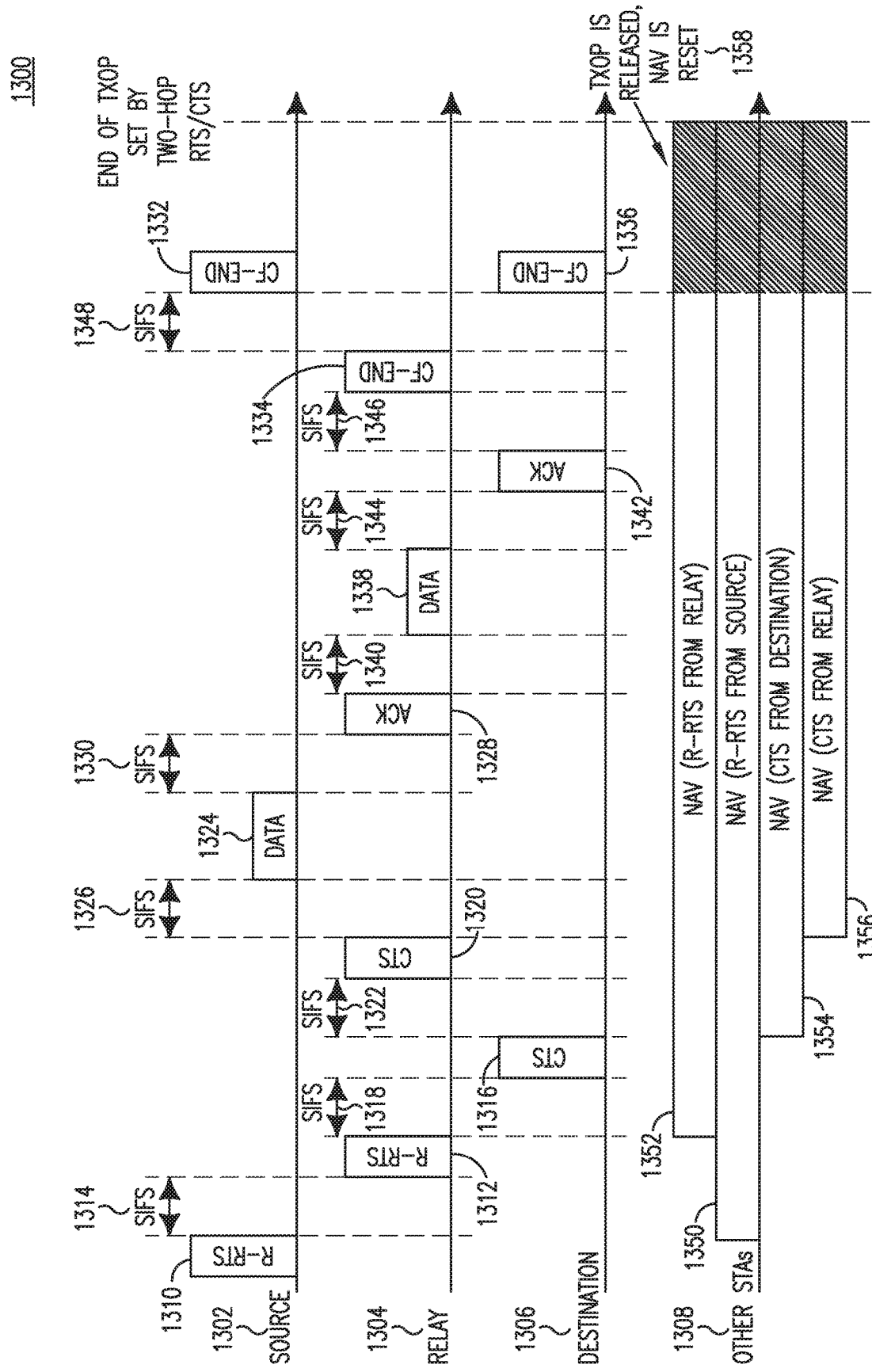
FIG. 13 is a signal diagram of network allocation vector (NAV) setting for relay in a case of a successful data transmission.

FIG. 13 is a signal diagram of a network allocation vector (NAV) setting method 1300 for relay in a case of a successful data transmission. The method 1300 is performed between a source node 1302, a relay node 1304, a destination node 1306, and other STAs 1308.

The source node 1302 initiates the TXOP reservation procedures for the entire duration of the relay frame exchanges, and the duration to transmit the data frame from the relay node to the destination node is assumed to be the worst case or calculated conservatively.

The source node 1302 sends a R-RTS frame 1310 with the one-bit indication set to "1" to the relay node 1304. The duration field in the R-RTS frame 1310 depends on the detailed signaling procedures.

If the relay node 1304 sends a R-RTS frame (described below), the duration is:

7×aSIFS time+2×CTS_Time+R-RTS_Time+2×ACK_time+Data_Time(source node to relay node)+Data_Time(relay node to destination node)   Equation (5)

If the relay node 1304 sends a CTS frame (described below), the duration is:

8×aSIFS time+3×CTS_Time+R-RTS_Time+2×ACK_time+Data_Time(source node to relay node)+Data_Time(relay node to destination node)   Equation (6)

The Data_Time value (source node to relay node) in Equations (5) and (6) is calculated using the length of the data frame and data rate used for the transmission. The Data_Time value (relay node to destination node) in Equations (5) and (6) is calculated using the length of the data frame and the assumption that the lowest data rate is used for the transmission between the relay node and the destination node. If the source node has knowledge of link between the relay node and the destination node through channel feedback or other means, it calculates the Data_Time value (relay node to destination node) conservatively using the length of the data frame and a lower bound of the data rate to be used for the transmission between the relay node and the destination node.

Any of the other STAs 1308 that receive the R-RTS frame 1310 set their NAV based on the duration field value of the R-RTS frame 1310 (step 1350).

There are two possible procedures for a relay node 1304 that receives the R-RTS frame 1310. In one procedure, the relay node 1304 transmits a R-RTS frame 1312 with the one-bit indication set to "0" to the destination node 1306 after a SIFS interval 1314 if the NAV at the relay node 1304 indicates that the medium is idle. The duration field of the R-RTS frame 1312 is the value obtained from the duration field of the R-RTS frame 1310 received from the source node 1302, minus the time in microseconds required to transmit the R-RTS frame 1310 and the SIFS interval 1314. The RA field is set as the MAC address of the destination node 1306, and the TA field is set as the MAC address of the relay node 1304. The R-RTS frame 1312 may also serve as an implicit CTS to the R-RTS frame 1310 from the source node 1302. Upon receiving/detecting the R-RTS frame 1312 from the relay node 1304, the source node 1302 may determine whether its R-RTS frame 1310 transmission succeeds or not by one of the following.

(1) The source node 1302 checks whether the TA field of the R-RTS frame 1312 matches the RA field of the R-RTS frame 1310 transmitted by the source node 1302.

(2) If the source node 1302 knows the MAC address of the destination node 1306, it checks whether the RA field of the R-RTS frame 1312 matches the MAC address of the destination node 1306.

(3) If the source node 1302 knows the MAC address of the destination node 1306, it checks whether the TA field of the R-RTS frame 1312 matches the RA field of the R-RTS frame 1310 transmitted by the source node 1302 and whether the RA field of the R-RTS frame 1312 matches the MAC address of the destination node 1306.

The same rule of CTS reception within the CTSTimeout interval for the source node (as described in connection with the second procedure below) applies to the implicit CTS (i.e., the R-RTS from the relay node 1304) as well.

In a second procedure (not shown in FIG. 13), the relay node 1304 that is addressed by the R-RTS frame 1310 transmits an explicit CTS frame to the source node 1302 after the SIFS interval 1314 if the NAV at the relay node 1304 indicates that the medium is idle. The RA field of the CTS frame is copied from the TA field of the R-RTS frame 1310. The duration field of the CTS field is the value obtained from the duration field of the R-RTS frame 1310, minus the time in microseconds required to transmit the CTS frame and the SIFS interval 1314.

If the source node 1302 does not receive such an explicit CTS frame from the relay node 1304 within a CTSTimeout interval, with a value of aSIFSTime+aSlotTime+aPHY-RX-START-Delay, starting at the PHY-TXEND.confirm primitive, then the source node 1302 concludes that the transmission of the R-RTS frame 1310 has failed and invokes its backoff procedure upon expiration of the CTSTimeout interval. If such an explicit CTS frame from the relay node 1304 is received during the CTSTimeout interval, the source node 1302 concludes that the transmission of the R-RTS frame 1310 succeeded, but holds its data transmission.

Then, the relay node 1304 sends the R-RTS frame 1312 with the one-bit indication set to "0" to the destination node 1306 after a SIFS interval after sending the CTS. The duration field of the R-RTS frame 1312 is the value obtained from the duration field of the CTS frame from the relay node 1304 to the source node 1302, minus the time in microseconds required to transmit the R-RTS frame 1310 and its SIFS interval 1314. The RA field is set as the MAC address of the destination node 1306, and the TA field is set as the MAC address of the relay node 1304.

Any of the other STAs 1308 that receive the R-RTS frame 1312 set their NAV based on the duration field value of the R-RTS frame 1312 (step 1352).

The destination node 1306 that is addressed by the R-RTS frame 1312 from the relay node 1304 transmits a CTS frame 1316 to the relay node 1304 after a SIFS interval 1318 if the NAV at the destination node 1306 indicates that the medium is idle. The field setting of the CTS frame 1316 in reference to the R-RTS frame 1312 and the rule of handling the CTSTimeout is the same as currently implemented.

Any of the other STAs 1308 that receive the CTS frame 1316 set their NAV based on the duration field value of the CTS frame 1316 (step 1354).

Upon receiving the CTS frame 1316 from the destination node 1306 within the CTSTimeout interval, the relay node 1304 transmits a CTS frame 1320 addressed to the source node 1302 to indicate whether the TXOP reservation for the two-hop relay succeeds. Different than conventional CTS transmission, at this step the relay node 1304 does need to check if the NAV at the relay node indicates that the medium is idle, because the previous steps have guaranteed that the medium is idle. The RA field of the CTS frame 1320 is set to the MAC address of the source node 1302. The duration field of the CTS frame 1320 is the value obtained from the duration field of the CTS frame 1316, minus the time in microseconds required to transmit the CTS frame 1316 and its SIFS interval 1322.

Any of the other STAs 1308 that receive the CTS frame 1320 set their NAV based on the duration field value of the CTS frame 1320 (step 1356).

Upon receiving the CTS frame 1320 from the relay node 1304, the source node 1302 knows that the TXOP reservation for the two-hop relay succeeds. The source node 1302 starts transmitting a data frame 1324 after a SIFS interval 1326 following the CTS frame 1320 received from the relay node 1304.

The relay node 1304 processes the received data frame 1324. If the received data frame 1324 is decoded correctly, the relay node 1304 sends an ACK frame 1328 after a SIFS interval 1330 without changing the duration of reserved TXOP.

If the received data frame 1324 is not decoded correctly, the source node 1302 will not receive an ACK by the time aSIFS time+ACK_Time after sending the data frame 1324. The source node 1302 will release the TXOP by sending a CF-End frame 1332. The relay node 1304 sends a CF-End frame 1334 and the destination node 1306 sends a CF-End frame 1336 upon receipt of the CF-End frame 1332.

If the relay node 1304 successfully receives the data frame 1324, the relay node 1304 transmits the data frame as data frame 1338 to the destination node 1306 after a SIFS interval 1340. The destination node 1306 processes the received data frame 1338 from the relay node 1304. If received data frame 1338 is decoded correctly, the destination node 1306 sends an ACK frame 1342 after a SIFS interval 1344. The destination node 1306 may use a method at this step to release the TXOP and reset the NAV for the other STAs 1308 near the destination node 1306. For example, the destination node 1306 may set the ACK indication to be "10" in the outgoing frame.

Upon receiving the ACK frame 1342 from the destination node 1306 and if the current TXOP has not yet expired, the relay node 1304 sends the CF-End frame 1334 after a SIFS interval 1346 to truncate/release the TXOP. If the relay node 1304 does not receive the ACK frame 1342 within aSIFS time+ACK_Time after sending the data frame 1338 and the remaining TXOP allows it to retransmit the data frame 1338, it may retransmit the data frame 1338 to the destination node 1306.

Upon receiving the CF-End frame 1334 from the relay node 1304 before the current TXOP expires, the source node 1302 sends the CF-End frame 1332 after a SIFS interval 1348.

Upon receiving the CF-End frame 1334 from the relay node 1304 before the current TXOP expires, the destination node 1306 sends the CF-End frame 1336. This step is only necessary if the method to release TXOP and reset the NAV has not been previously applied. There is no need to implement both steps.

When the TXOP is released, the NAV at the other STAs 1308 is reset (step 1358).

Figure 14:
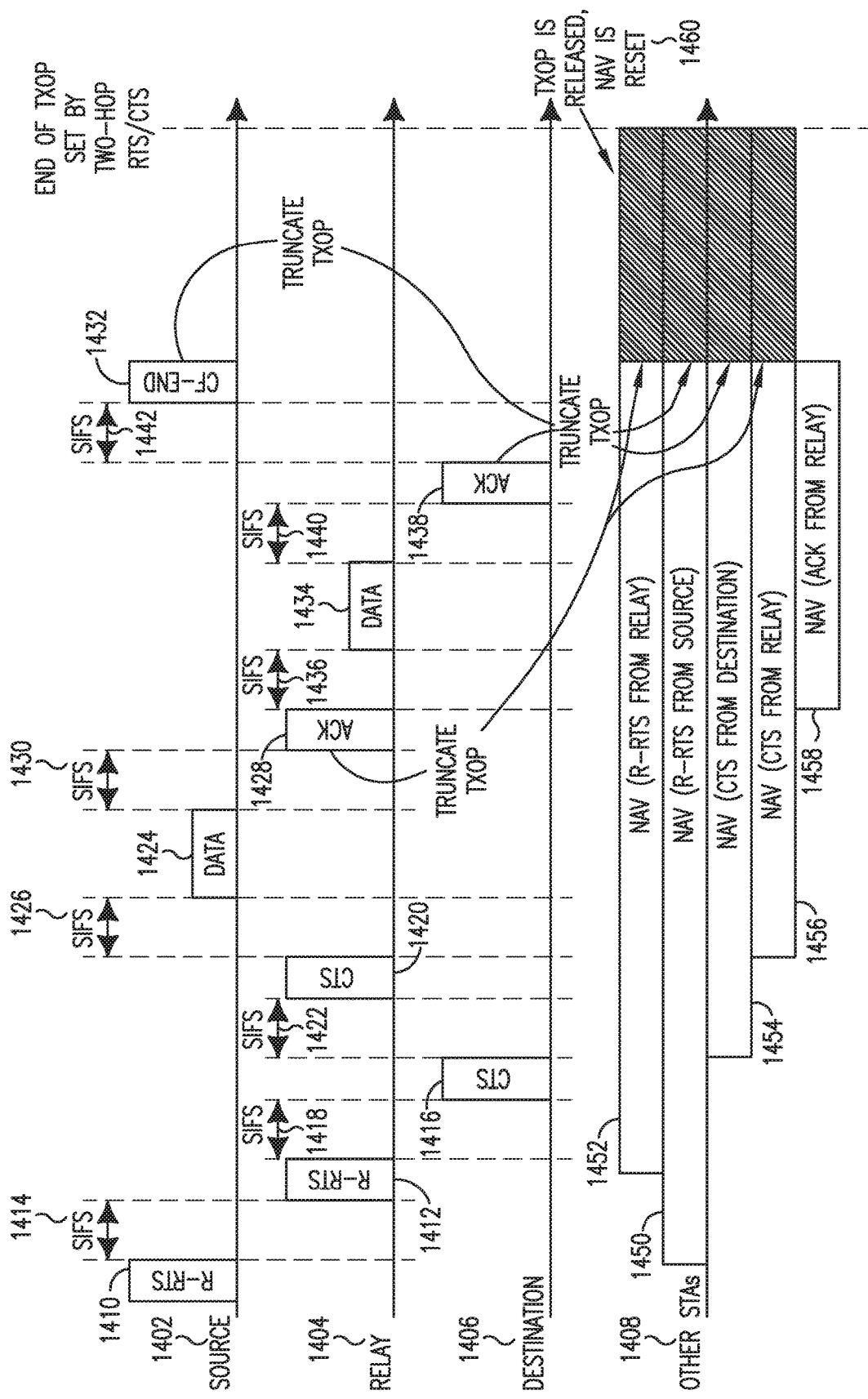
FIG. 14 is a signal diagram of a second NAV setting for relay in a case of a successful data transmission.

FIG. 14 is a signal diagram of a second NAV setting method 1400 for relay in a case of a successful data transmission. The method 1400 is performed between a source node 1402, a relay node 1404, a destination node 1406, and other STAs 1408.

The source node 1402 initiates the TXOP reservation procedures for the entire duration of the relay frame exchanges, and the duration to transmit the data frame from the relay node to the destination node is assumed to be the worst case or calculated conservatively.

The source node 1402 sends a R-RTS frame 1410 with the one-bit indication set to "1" to the relay node 1404. The duration field in the R-RTS frame 1410 depends on the detailed signaling procedures.

If the relay node 1404 sends a R-RTS frame (described below), the duration is:

$$7 \times aSIFS\ time + 2 \times CTS\_Time + R\text{-}RTS\_Time + 2 \times ACK\_time + Data\_Time(\text{source node to relay node}) + Data\_Time(\text{relay node to destination node}) \quad \text{Equation (7)}$$

If the relay node 1404 sends a CTS frame (described below), the duration is:

$$8 \times aSIFS\ time + 3 \times CTS\_Time + R\text{-}RTS\_Time + 2 \times ACK\_time + Data\_Time(\text{source node to relay node}) + Data\_Time(\text{relay node to destination node}) \quad \text{Equation (8)}$$

The Data_Time value (source node to relay node) in Equations (7) and (8) is calculated using the length of the data frame and data rate used for the transmission. The Data_Time value (relay node to destination node) in Equations (7) and (8) is calculated using the length of the data frame and the assumption that the lowest data rate is used for the transmission between the relay node and the destination node. If the source node has knowledge of link between the relay node and the destination node through channel feedback or other means, it calculates the Data_Time value (relay node to destination node) conservatively using the length of the data frame and a lower bound of the data rate to be used for the transmission between the relay node and the destination node.

Any of the other STAs 1408 that receive the R-RTS frame 1410 set their NAV based on the duration field value of the R-RTS frame 1410 (step 1450).

There are two possible procedures for a relay node 1404 that receives the R-RTS frame 1410. In one procedure, the relay node 1404 transmits a R-RTS frame 1412 with the one-bit indication set to "0" to the destination node 1406 after a SIFS interval 1414 if the NAV at the relay node 1404 indicates that the medium is idle. The duration field of the R-RTS frame 1412 is the value obtained from the duration field of the R-RTS frame 1410 received from the source node 1402, minus the time in microseconds required to transmit the R-RTS frame 1410 and the SIFS interval 1414. The RA field is set as the MAC address of the destination node 1406, and the TA field is set as the MAC address of the relay node 1404. The R-RTS frame 1412 may also serve as an implicit CTS to the R-RTS frame 1410 from the source node 1402. Upon receiving/detecting the R-RTS frame 1412 from the relay node 1404, the source node 1402 may determine whether its R-RTS frame 1410 transmission succeeds or not by one of the following.

(1) The source node 1402 checks whether the TA field of the R-RTS frame 1412 matches the RA field of the R-RTS frame 1410 transmitted by the source node 1402.

(2) If the source node 1402 knows the MAC address of the destination node 1406, it checks whether the RA field of the R-RTS frame 1412 matches the MAC address of the destination node 1406.

(3) If the source node 1402 knows the MAC address of the destination node 1406, it checks whether the TA field of the R-RTS frame 1412 matches the RA field of the R-RTS frame 1410 transmitted by the source node 1402 and whether the RA field of the R-RTS frame 1412 matches the MAC address of the destination node 1406.

The same rule of CTS reception within the CTSTimeout interval for the source node (as described in connection with the second procedure below) applies to the implicit CTS (i.e., the R-RTS from the relay node 1404) as well.

In a second procedure (not shown in FIG. 14), the relay node 1404 that is addressed by the R-RTS frame 1410 transmits an explicit CTS frame to the source node 1402 after the SIFS interval 1414 if the NAV at the relay node 1404 indicates that the medium is idle. The RA field of the CTS frame is copied from the TA field of the R-RTS frame 1410. The duration field of the CTS field is the value obtained from the duration field of the R-RTS frame 1410, minus the time in microseconds required to transmit the CTS frame and the SIFS interval 1414.

If the source node 1402 does not receive such an explicit CTS frame from the relay node 1404 within a CTSTimeout interval, with a value of aSIFSTime+aSlotTime+aPHY-RX-START-Delay, starting at the PHY-TXEND.confirm primitive, then the source node 1402 concludes that the transmission of the R-RTS frame 1410 has failed and invokes its backoff procedure upon expiration of the CTSTimeout interval. If such an explicit CTS frame from the relay node 1404 is received during the CTSTimeout interval, the source node 1402 concludes that the transmission of the R-RTS frame 1410 succeeded, but holds its data transmission.

Then, the relay node 1404 sends the R-RTS frame 1412 with the one-bit indication set to "0" to the destination node 1406 after a SIFS interval after sending the CTS. The duration field of the R-RTS frame 1412 is the value obtained from the duration field of the CTS frame from the relay node 1404 to the source node 1402, minus the time in microseconds required to transmit the R-RTS frame 1410 and its SIFS interval 1414. The RA field is set as the MAC address of the destination node 1406, and the TA field is set as the MAC address of the relay node 1404.

Any of the other STAs 1408 that receive the R-RTS frame 1412 set their NAV based on the duration field value of the R-RTS frame 1412 (step 1452).

The destination node 1406 that is addressed by the R-RTS frame 1412 from the relay node 1404 transmits a CTS frame 1416 to the relay node 1404 after a SIFS interval 1418 if the NAV at the destination node 1406 indicates that the medium is idle. The field setting of the CTS frame 1416 in reference to the R-RTS frame 1412 and the rule of handling the CTSTimeout is the same as currently implemented.

Any of the other STAs 1408 that receive the CTS frame 1416 set their NAV based on the duration field value of the CTS frame 1416 (step 1454).

Upon receiving the CTS frame 1416 from the destination node 1406 within the CTSTimeout interval, the relay node 1404 transmits a CTS frame 1420 addressed to the source node 1402 to indicate whether the TXOP reservation for the two-hop relay succeeds. Different than conventional CTS transmission, at this step the relay node 1404 does need to check if the NAV at the relay node indicates that the medium is idle, because the previous steps have guaranteed that the medium is idle. The RA field of the CTS frame 1420 is set to the MAC address of the source node 1402. The duration field of the CTS frame 1420 is the value obtained from the duration field of the CTS frame 1416, minus the time in microseconds required to transmit the CTS frame 1416 and its SIFS interval 1422.

Any of the other STAs 1408 that receive the CTS frame 1420 set their NAV based on the duration field value of the CTS frame 1420 (step 1456).

Upon receiving the CTS frame 1420 from the relay node 1404, the source node 1402 knows that the TXOP reservation for the two-hop relay succeeds. The source node 1402 starts transmitting a data frame 1424 after a SIFS interval 1426 following the CTS frame 1420 received from the relay node 1404.

The relay node 1404 processes the received data frame 1424. If the received data frame 1424 is decoded correctly, the relay node 1404 sends an ACK frame 1428 after a SIFS interval 1430, with the ACK indication bits set to "11." At this point, the relay node 1404 has a good knowledge of the duration to transmit the data frame to the destination node 1406. The duration of the remaining TXOP is set to be:

$$2\times\text{aSIFS time}+\text{Data\_Time(relay node to destination node)}+\text{ACK\_time} \quad \text{Equation (9)}$$

The Data_Time value (relay node to destination node) is calculated using the length of the data frame and the data rate used for the transmission from the relay node 1404 to the destination node 1406.

Any of the other STAs 1408 that receive the ACK frame 1428 set their NAV based on the duration field value of the ACK frame 1428 (step 1458).

If the received data frame 1424 is not decoded correctly, the source node 1402 will not receive an ACK by the time aSIFS time+ACK_Time after sending the data frame 1424. The source node 1402 releases the TXOP by sending a CF-End frame 1432 or retransmits the data frame 1424 to the relay node 1404. If the source node 1402 releases the TXOP, then the relay node 1404 sends a CF-End frame (not shown in FIG. 14) and the destination node 1406 sends a CF-End frame (not shown in FIG. 14) upon receipt of the CF-End frame 1432.

If the relay node 1404 successfully receives the data frame 1424, the relay node 1404 transmit the data frame as data frame 1434 to the destination node 1406 after a SIFS interval 1436. The destination node 1406 processes the received data frame 1434 from the relay node 1404. If the received data frame 1434 is decoded correctly, the destination node 1406 sends an ACK frame 1438 after a SIFS interval 1440. The destination node 1406 may use a method at this step to release the TXOP and reset the NAV for the other STAs 1408 near the destination node 1406. For example, the destination node 1406 may set the ACK indication bits to "10" in the outgoing frame.

After a SIFS interval 1442 by the end of TXOP set by the ACK frame 1428 from the relay node 1404, the source node 1402 sends the CF-End frame 1432. When the TXOP is released, the NAV at the other STAs 1408 is reset (step 1460).

Alternatively, a "Data+CF-ACK" frame may be used to carry both the data frame from the relay node to the destination node and the ACK for the data transmitted from the source node to the relay node. Such a frame may be a new defined frame or a reused existing Data+CF-ACK frame. The implicit ACK method may be considered a special case of using only one frame to carry both the data frame from the relay node to the destination node and the ACK for the data frame transmitted from the source node to the relay node. When one frame transmitted by the relay node carries both the data frame from the relay node to the destination node and the ACK for the data transmitted from the source node to the relay node, the timing of the procedures in both methods 1300 and 1400 are reduced by the ACK_Time and a SIFS time, as shown in connection with a method 1500 shown in FIG. 15 and described below. For example, the duration of the R-RTS frame from the source node to the relay node includes:

$$6\times\text{aSIFS time}+2\times\text{CTS\_Time}+\text{R-RTS\_Time}+\text{ACK\_time}+\text{Data\_Time(source node to relay node)}+\text{Data\_Time(relay node to destination node)} \quad \text{Equation (10)}$$

Figure 15:
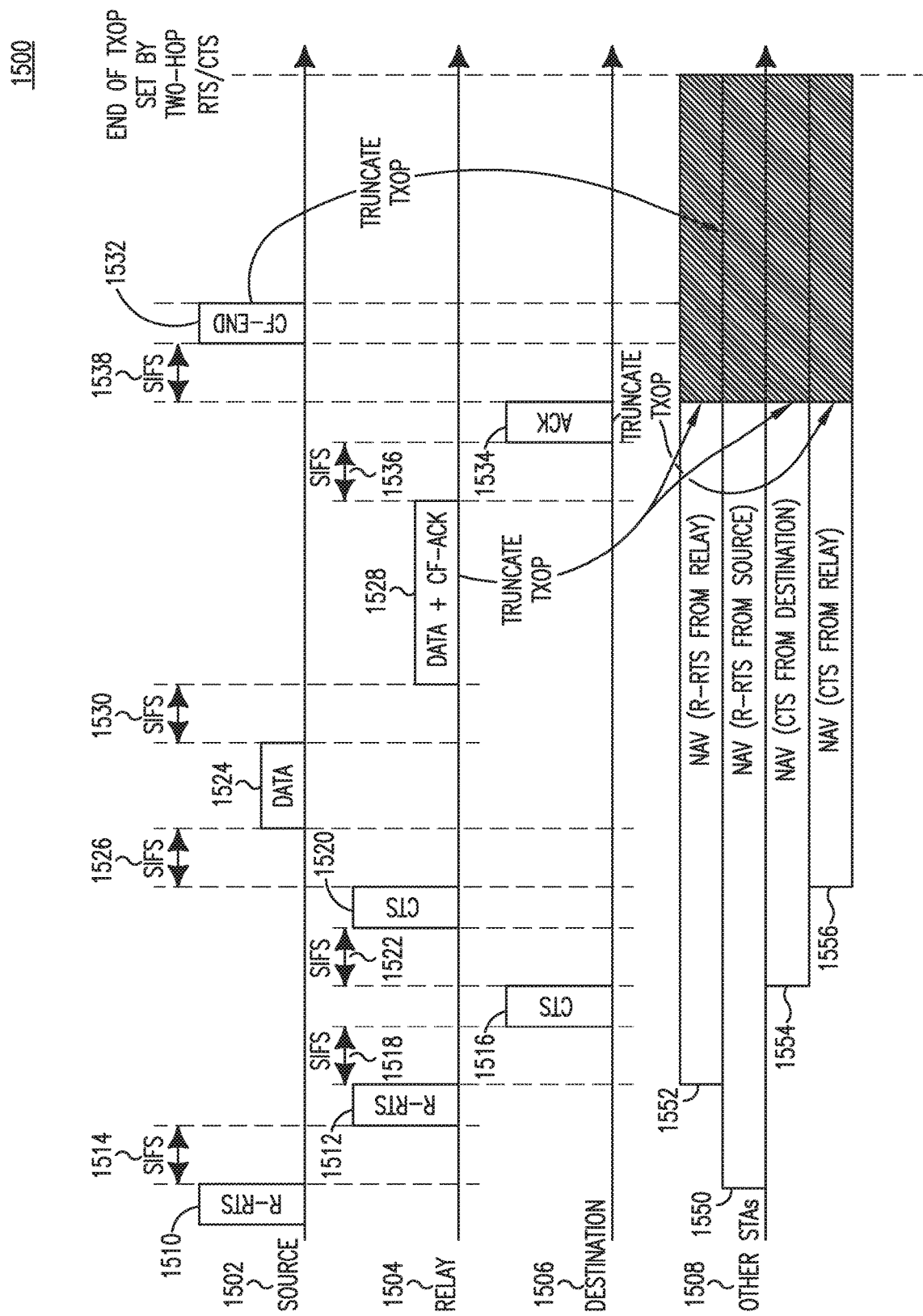
FIG. 15 is a signal diagram of a third NAV setting for relay in a case of a successful data transmission.

FIG. 15 is a signal diagram of a third NAV setting method 1500 for relay in a case of a successful data transmission. The method 1500 is performed between a source node 1502, a relay node 1504, a destination node 1506, and other STAs 1508.

The source node 1502 initiates the TXOP reservation procedures for the entire duration of the relay frame exchanges, and the duration to transmit the data frame from the relay node to the destination node is assumed to be the worst case or calculated conservatively.

The source node 1502 sends a R-RTS frame 1510 with the one-bit indication set to "1" to the relay node 1504. The duration field in the R-RTS frame 1510 depends on the detailed signaling procedures.

If the relay node 1504 sends a R-RTS frame (described below), the duration is:

$$7 \times \text{aSIFS time} + 2 \times \text{CTS\_Time} + \text{R-RTS\_Time} + 2 \times \text{ACK\_time} + \text{Data\_Time(source node to relay node)} + \text{Data\_Time(relay node to destination node)} \quad \text{Equation (11)}$$

If the relay node 1504 sends a CTS frame (described below), the duration is:

$$8 \times \text{aSIFS time} + 3 \times \text{CTS\_Time} + \text{R-RTS\_Time} + 2 \times \text{ACK\_time} + \text{Data\_Time(source node to relay node)} + \text{Data\_Time(relay node to destination node)} \quad \text{Equation (12)}$$

The Data_Time value (source node to relay node) in Equations (11) and (12) is calculated using the length of the data frame and data rate used for the transmission. The Data_Time value (relay node to destination node) in Equations (11) and (12) is calculated using the length of the data frame and the assumption that the lowest data rate is used for the transmission between the relay node and the destination node. If the source node has knowledge of link between the relay node and the destination node through channel feedback or other means, it calculates the Data_Time value (relay node to destination node) conservatively using the length of the data frame and a lower bound of the data rate to be used for the transmission between the relay node and the destination node.

Any of the other STAs 1508 that receive the R-RTS frame 1510 set their NAV based on the duration field value of the R-RTS frame 1510 (step 1550).

There are two possible procedures for a relay node 1504 that receives the R-RTS frame 1510. In one procedure, the relay node 1504 transmits a R-RTS frame 1512 with the one-bit indication set to "0" to the destination node 1506 after a SIFS interval 1514 if the NAV at the relay node 1504 indicates that the medium is idle. The duration field of the R-RTS frame 1512 is the value obtained from the duration field of the R-RTS frame 1510 received from the source node 1502, minus the time in microseconds required to transmit the R-RTS frame 1510 and the SIFS interval 1514. The RA field is set as the MAC address of the destination node 1506, and the TA field is set as the MAC address of the relay node 1504. The R-RTS frame 1512 may also serve as an implicit CTS to the R-RTS frame 1510 from the source node 1502. Upon receiving/detecting the R-RTS frame 1512 from the relay node 1504, the source node 1502 may determine whether its R-RTS frame 1510 transmission succeeds or not by one of the following.

(1) The source node 1502 checks whether the TA field of the R-RTS frame 1512 matches the RA field of the R-RTS frame 1510 transmitted by the source node 1502.

(2) If the source node 1502 knows the MAC address of the destination node 1506, it checks whether the RA field of the R-RTS frame 1512 matches the MAC address of the destination node 1506.

(3) If the source node 1502 knows the MAC address of the destination node 1506, it checks whether the TA field of the R-RTS frame 1512 matches the RA field of the R-RTS frame 1510 transmitted by the source node 1502 and whether the RA field of the R-RTS frame 1512 matches the MAC address of the destination node 1506.

The same rule of CTS reception within the CTSTimeout interval for the source node (as described in connection with the second procedure below) applies to the implicit CTS (i.e., the R-RTS from the relay node 1504) as well.

In a second procedure (not shown in FIG. 15), the relay node 1504 that is addressed by the R-RTS frame 1510 transmits an explicit CTS frame to the source node 1502 after the SIFS interval 1514 if the NAV at the relay node 1504 indicates that the medium is idle. The RA field of the CTS frame is copied from the TA field of the R-RTS frame 1510. The duration field of the CTS field is the value obtained from the duration field of the R-RTS frame 1510, minus the time in microseconds required to transmit the CTS frame and the SIFS interval 1514.

If the source node 1502 does not receive such an explicit CTS frame from the relay node 1504 within a CTSTimeout interval, with a value of aSIFSTime+aSlotTime+aPHY-RX-START-Delay, starting at the PHY-TXEND.confirm primitive, then the source node 1502 concludes that the transmission of the R-RTS frame 1510 has failed and invokes its backoff procedure upon expiration of the CTSTimeout interval. If such an explicit CTS frame from the relay node 1504 is received during the CTSTimeout interval, the source node 1502 concludes that the transmission of the R-RTS frame 1510 succeeded, but holds its data transmission.

Then, the relay node 1504 sends the R-RTS frame 1512 with the one-bit indication set to "0" to the destination node 1506 after a SIFS interval after sending the CTS. The duration field of the R-RTS frame 1512 is the value obtained from the duration field of the CTS frame from the relay node 1504 to the source node 1502, minus the time in microseconds required to transmit the R-RTS frame 1510 and its SIFS interval 1514. The RA field is set as the MAC address of the destination node 1506, and the TA field is set as the MAC address of the relay node 1504.

Any of the other STAs 1508 that receive the R-RTS frame 1512 set their NAV based on the duration field value of the R-RTS frame 1512 (step 1552).

The destination node 1506 that is addressed by the R-RTS frame 1512 from the relay node 1504 transmits a CTS frame 1516 to the relay node 1504 after a SIFS interval 1518 if the NAV at the destination node 1506 indicates that the medium is idle. The field setting of the CTS frame 1516 in reference to the R-RTS frame 1512 and the rule of handling the CTSTimeout is the same as currently implemented.

Any of the other STAs 1508 that receive the CTS frame 1516 set their NAV based on the duration field value of the CTS frame 1516 (step 1554).

Upon receiving the CTS frame 1516 from the destination node 1506 within the CTSTimeout interval, the relay node 1504 transmits a CTS frame 1520 addressed to the source node 1502 to indicate whether the TXOP reservation for the two-hop relay succeeds. Different than conventional CTS transmission, at this step the relay node 1504 does need to check if the NAV at the relay node indicates that the medium is idle, because the previous steps have guaranteed that the medium is idle. The RA field of the CTS frame 1520 is set to the MAC address of the source node 1502. The duration field of the CTS frame 1520 is the value obtained from the duration field of the CTS frame 1516, minus the time in microseconds required to transmit the CTS frame 1516 and its SIFS interval 1522.

Any of the other STAs 1508 that receive the CTS frame 1520 set their NAV based on the duration field value of the CTS frame 1520 (step 1556).

Upon receiving the CTS frame 1520 from the relay node 1504, the source node 1502 knows that the TXOP reservation for the two-hop relay succeeds. The source node 1502 starts transmitting a data frame 1524 after a SIFS interval 1526 following the CTS frame 1520 received from the relay node 1504.

The relay node 1504 processes the received data frame 1524. If the received data frame 1524 is decoded correctly, the relay node 1504 forwards the data frame to the destination node 1506 by sending a Data+CF-ACK frame 1528 after a SIFS interval 1530, with a NAV setting in its MAC header whose duration is calculated using the length of the data frame and the data rate used for the transmission.

If the received data frame 1524 is not decoded correctly, the source node 1502 will not receive an ACK by the time aSIFS time+ACK_Time after sending the data frame 1524. The source node 1502 releases the TXOP by sending a CF-End frame 1532. If the source node 1502 releases the TXOP, then the relay node 1504 sends a CF-End frame (not shown in FIG. 15) and the destination node 1506 sends a CF-End frame (not shown in FIG. 15) upon receipt of the CF-End frame 1532.

The destination node 1506 processes the received data frame (from the received Data+CF-ACK frame 1528) from the relay node 1504. If the received data frame is decoded correctly, the destination node 1506 sends an ACK frame 1534 after a SIFS interval 1536. The destination node 1506 may use a method at this step to release the TXOP and reset the NAV for the other STAs 1508 near the destination node 1506. For example, the destination node 1506 may set the ACK indication bits to "10" in the outgoing frame.

Upon receiving the Data+CF-ACK frame 1528 from the relay node 1504 before the current TXOP expires, the source node 1502 sends the CF-End frame 1532 after a SIFS interval 1538 following the duration signaled in the NAV setting in the received Data+CF-ACK frame 1528.

Figure 16:
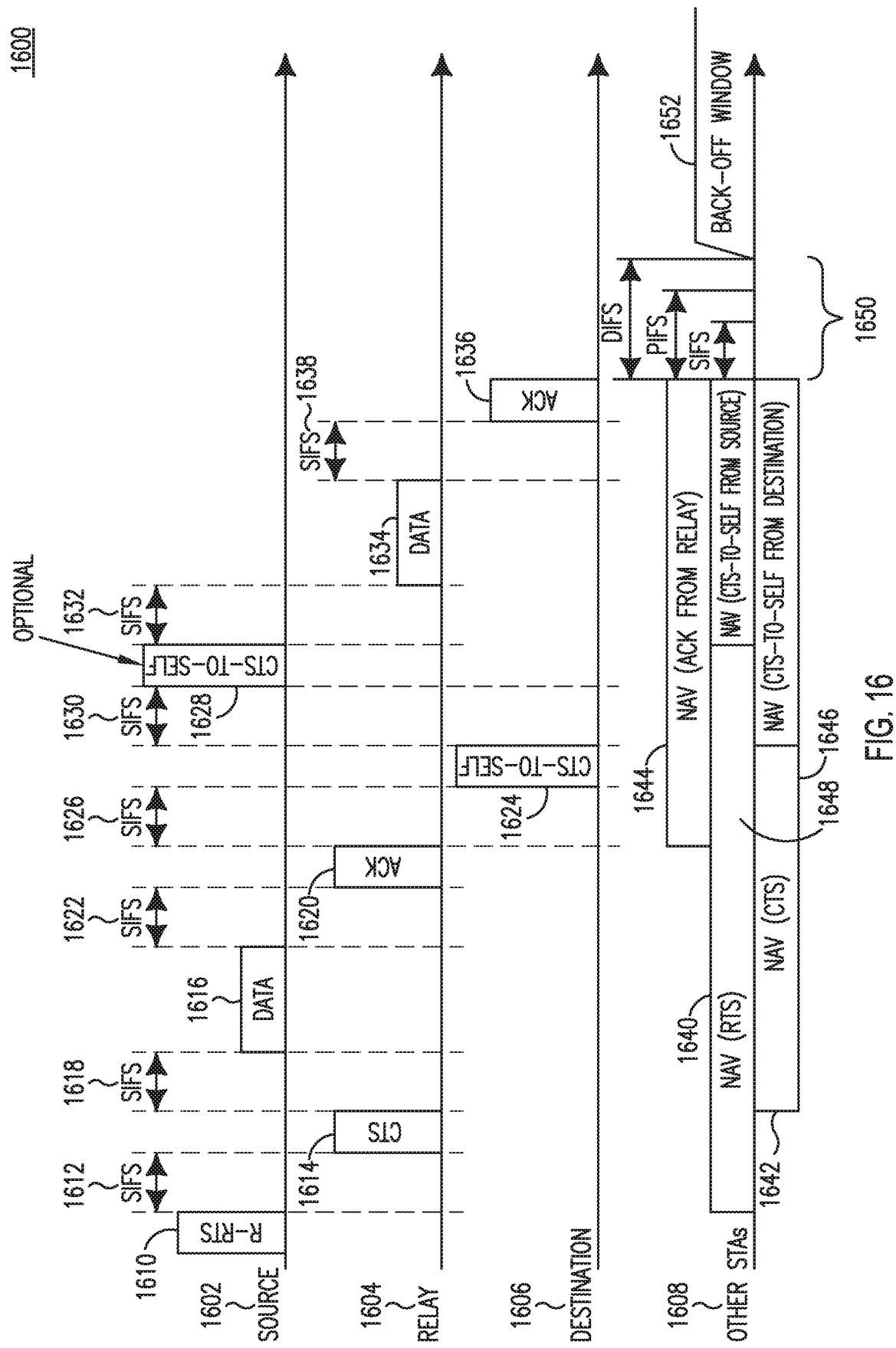
FIG. 16 is a signal diagram of a fourth NAV setting for relay in a case of a successful data transmission.

FIG. 16 is a signal diagram of a fourth NAV setting method 1600 for relay in a case of a successful data transmission. The method 1600 is performed between a source node 1602, a relay node 1604, a destination node 1606, and other STAs 1608.

The source node 1602 reserves the TXOP for the duration of the frame exchanges between the source node 1602 and the relay node 1604. The source node sends an RTS frame 1610 to the relay node 1604. The duration in the RTS frame 1610 includes:

$$3 \times \text{aSIFS time} + \text{CTS\_Time} + \text{ACK\_time} + \text{Data\_Time} \text{ (source node to relay node)} \quad \text{Equation (13)}$$

The Data_Time value (source node to relay node) in Equation (13) is calculated using the length of the data frame and the data rate used for the transmission. Any of the other STAs 1608 that receive the RTS frame 1610 set their NAV based on the duration field value of the RTS frame 1610 (step 1640).

After receiving the RTS frame 1610, the relay node 1604 waits for a SIFS interval 1612 and transmits a CTS frame 1614 to the source node 1602. Any of the other STAs 1608 that receive the CTS frame 1614 set their NAV based on the duration field value of the CTS frame 1614 (step 1642).

Upon receipt of the CTS frame 1614, the source node 1602 transmits a data frame 1616 after a SIFS interval 1618. The relay node 1604 processes the received data frame 1616. If the received data frame 1616 is decoded correctly, the relay node 1604 sends an ACK frame 1620 after a SIFS interval 1622, and sets the ACK indication bits to "11" in the next outgoing frame. The duration field in the ACK frame 1620 is set to the value of:

$$3 \times \text{aSIFSTime} + \text{CTS-to-self\_Time(at destination node)} + \text{ACK\_time} + \text{Data\_Time(relay node to destination node)} \quad \text{Equation (14)}$$

or $$4 \times \text{aSIFSTime} + \text{CTS-to-self\_Time(at source node)} + \text{CTS-to-self\_Time(at destination node)} + \text{ACK\_time} + \text{Data\_Time(relay node to destination node)} \quad \text{Equation (15)}$$

The choice between using Equation (14) or Equation (15) to determine the duration field depends on whether the optional CTS-to-self frame at the source node 1602 is implemented or not, as will be described below. If the source node implements the optional CTS-to-self frame, then Equation (15) is used to determine the duration field. The Data_Time value (relay node to destination node) in Equations (14) and (15) is calculated using the length of the data frame and the data rate used for the transmission from the relay node 1604 to the destination node 1606.

Any of the other STAs 1608 that receive the ACK frame 1620 set their NAV based on the duration field value of the ACK frame 1620 (step 1644).

If the received data frame 1616 is not decoded correctly, the source node 1602 will not receive an ACK by the time aSIFS time+ACK_Time after sending the data frame 1616. The TXOP then ends.

Upon receiving the ACK frame 1620 from the relay node 1604, the destination node 1606 sends a CTS-to-self frame 1624 after a SIFS interval 1626, with the end of the TXOP aligned with the end of the TXOP set above by the relay node, if the NAV at the destination node 1606 indicates that the medium is idle. Any of the other STAs 1608 that receive the CTS-to-self frame 1624 set their NAV based on the duration field value of the CTS-to-self frame 1624 (step 1646).

Optionally, the source node 1602 may send a CTS-to-self frame 1628 after a SIFS interval 1630, with the end of TXOP aligned with the end of the TXOP set above by the relay node. Any of the other STAs 1608 that receive the CTS-to-self frame 1628 set their NAV based on the duration field value of the CTS-to-self frame 1628 (step 1648).

After the SIFS interval 1630 following the CTS-to-self frame 1624 from the destination node 1606 or a SIFS interval 1632 if the optional CTS-to-self frame 1628 from the source node 1602, the relay node 1604 transmits the data frame as a data frame 1634 to the destination node 1606. The destination node 1606 processes the received data frame 1634. If the received data frame 1634 is decoded correctly, the destination node 1606 sends an ACK frame 1636 to the relay node 1604 after a SIFS interval 1638. The destination node 1606 may set the ACK indication bits to "10" in the outgoing frame.

After the ACK frame 1636 is sent, this indicates the end of the frame exchange sequence. The other STAs 1608 wait for an interframe space 1650, which may be a SIFS, a point coordination function interframe space (PIFS), or a distributed coordination function interframe space (DIFS) before entering a back-off window 1652.

The current UL frame delivery procedure allows the AP to assign a channel access slot to the STA to contend using a management frame when requested by the STA. When using relay functions, the R-AP does not have full knowledge of the usage of all channel access slots as the AP does when requested by an end-STA. Without appropriate coordination between the AP and the R-AP and consideration of the limited range of meters and sensors operating on lower power, either an overload or an under-utilization of some channel access slots may happen.

Currently, the TIM is carried on a beacon. The relay node may broadcast its beacon with the full TIM, the same as broadcast by the root AP. However, this is inefficient when using relay because only a small number of end-STAs are actually associated with the relay node. Therefore, methods to reduce the overhead for the TIM broadcast by the relay node are desirable.

The TIM indication and data retrieval procedures for end-STAs that are associated with R-APs are as follows. For a R-AP, when it becomes a relay node for a root STA, it may be assigned two AIDs. One AID is for the R-STA, which may represent the STA itself, in case the STA itself may also transmit and receive data traffic. A second AID is for the R-AP, which may represent the group of end-STAs that are associated with the R-AP. Alternatively, the group of end-STAs that are associated with the R-AP may also be identified by a group identifier.

Figure 17:
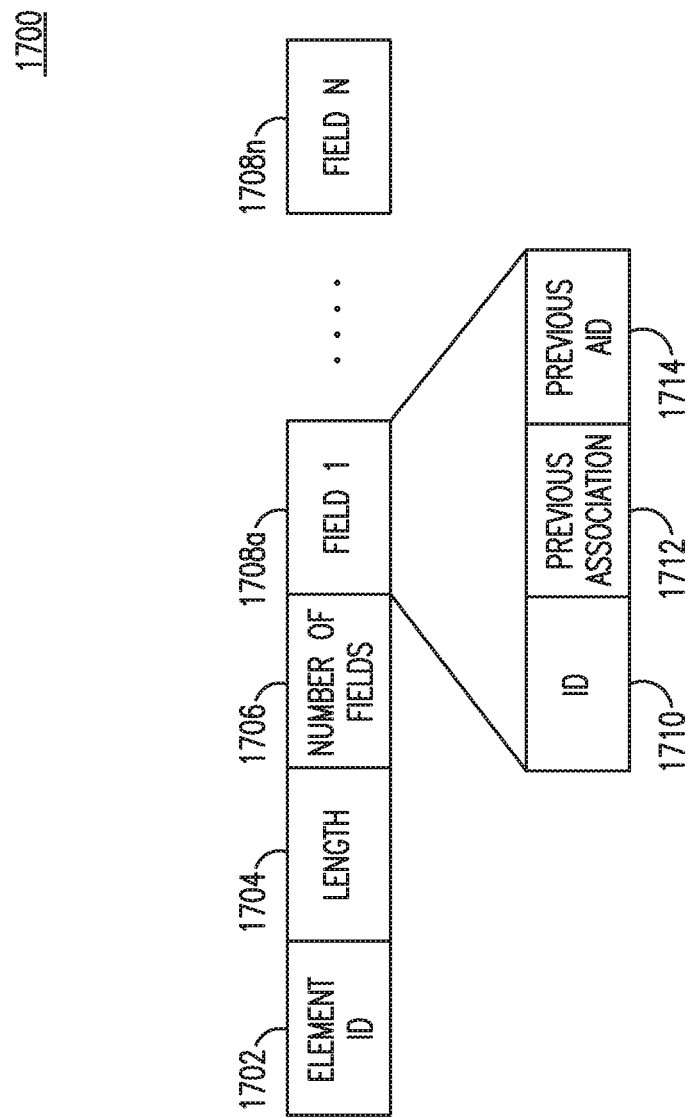
FIG. 17 is a diagram of an end-STA report information element (IE)

When one or more end-STAs choose to associate with a R-AP instead of the root AP, the R-AP may report the new association to the root AP using an end-STA Report Information Element (IE), for example, as shown in FIG. 17. The end-STA Report IE may be used in connection with any of the embodiments described herein.

The end-STA Report IE 1700 includes an element ID field 1702, a length field 1704, a number of fields indication 1706, and a plurality of information fields 1708*a*-1708*n*. The element ID field 1702 includes an identifier indicating that it is an end-STA Report IE. The length field 1704 indicates the length of the end-STA Report IE 1700. The number of fields indication 1706 includes the number of end-STAs reported in the IE 1700. Each information field 1708*a*-1708*n* contains the information of one end-STA, including an ID subfield 1710, a previous association subfield 1712, and a previous AID subfield 1714.

The ID subfield 1710 includes the ID of the end-STA, which may be implemented as a MAC address, an AID, or any other type of IDs that the STAs and the AP have agreed upon. The previous association subfield 1712 indicates the previous association of the end-STA and may be implemented as the MAC address of the previous AP, R-AP, or root AP that the end-STA was associated with. The previous AID subfield 1714 includes the AID of the root AP that the end-STA was previously associated with, if any.

The end-STA Report IE 1700 or any subset of the fields or subfields thereof may be implemented as a field, a subfield, or subsets of subfields of any existing or new IE; as a part of any control, management, or other type of frame; or in MAC/PLOP headers.

The R-AP may assign another AID value to the end-STA that is associated with the R-AP. The TIM indications for the end-STAs in beacons from the R-AP may follow this new AID assignment.

When the root AP receives the end-STA Report IE 1700, it associates the MAC address/ID of the end-STA with the AID or MAC address of the R-AP and acknowledges receipt of the end-STA Report IE 1700 using an ACK, a BA, or other type of frame.

The AP may assign two separate UL time slots of different length (following the same TIM beacon or TIM short beacon, or following two different TIM beacons or TIM short beacons) for the two different AIDs in the same or different RAW, one associated with the R-STA and one associated with the R-AP.

If frames arrive that are destined to the R-STA itself, the AP may indicate a positive TIM for the AID associated with the AID for the R-STA and assign a shorter UL time slot that is sufficient for the R-STA to send a PS-Poll frame to retrieve its own DL data.

If frames arrive that are destined for the group of end-STAs associated with the R-AP, the AP may indicate a positive TIM for the AID associated with the AID for the R-AP and assign a longer UL time slot that may be sufficient for the R-STA to retrieve all frames buffered for all end-STAs associated with it.

In a first alternative, the UL time slot may be sufficient for the R-STA to retrieve all frames buffered for all end-STAs associated with it and then send out a beacon for the relay BSS indicating a positive TIM for the end-STAs using the R-AP AIDs.

In a second alternative, the UL time slot may be sufficient for the R-STA to retrieve all frames buffered for all end-STAs associated with it and then send out a beacon for the relay BSS indicating a positive TIM for the end-STAs using the R-AP assigned AIDs, and for all the end-STAs to send PS-Poll frames to retrieve the frames buffered for them at the R-AP.

If there is only one frame buffered for a particular end-STA that is associated with a R-AP at the time of the TIM indication, when the R-STA transmits a PS-Poll frame to the AP to retrieve the DL data frame for its end-STAs, the AP may send the buffered frame using a four-address MAC frame with the immediate receiver being the R-STA. The R-AP may then forward the frame to the end-STA using the normal MAC frame format.

If there are multiple frames buffered for end-STAs that are associated with a R-AP at the time of the TIM indication, when the R-STA transmits a PS-Poll frame to the AP to retrieve the DL data frames for its end-STAs, the AP may send the buffered frames using a multi-user A-MPDU containing all frames that are destined for the R-AP's end-STAs. The R-AP may then forward the frames to the end-STA using an aggregate MAC service data unit (A-MSDU), an A-MPDU, or through the normal positive TIM and data retrieval process.

Several solutions to address the various problems/aspects of the ACK mechanism and/or procedures for range extension/relay are described.

The ACK mechanism for A-MSDU transmission depends on the direction (to the distribution system (DS) or from the DS) and relay node's transmission scheme of data frame to destination node.

In the scenario where the AP sends an A-MSDU containing data for several STAs to the relay node, one way to reduce the receiver power consumption in the destination node is for the relay node to break up the A-MSDU into individual data frames for each recipient and send them to each intended recipient/STA one by one. In this scenario, the relay node sets the partial AID (PAID) subfield in the SIG field of each data frame to the PAID of the destination node. When the source node detects a data frame with a PAID that matches one of PAIDs of the A-MSDU (according to the mapping between the AID and the MAC address of the destination node), it knows that the transmission from the source node to the relay node succeeded. Hence, the PAID serves as an implicit ACK to the source node/AP.

Figure 18:
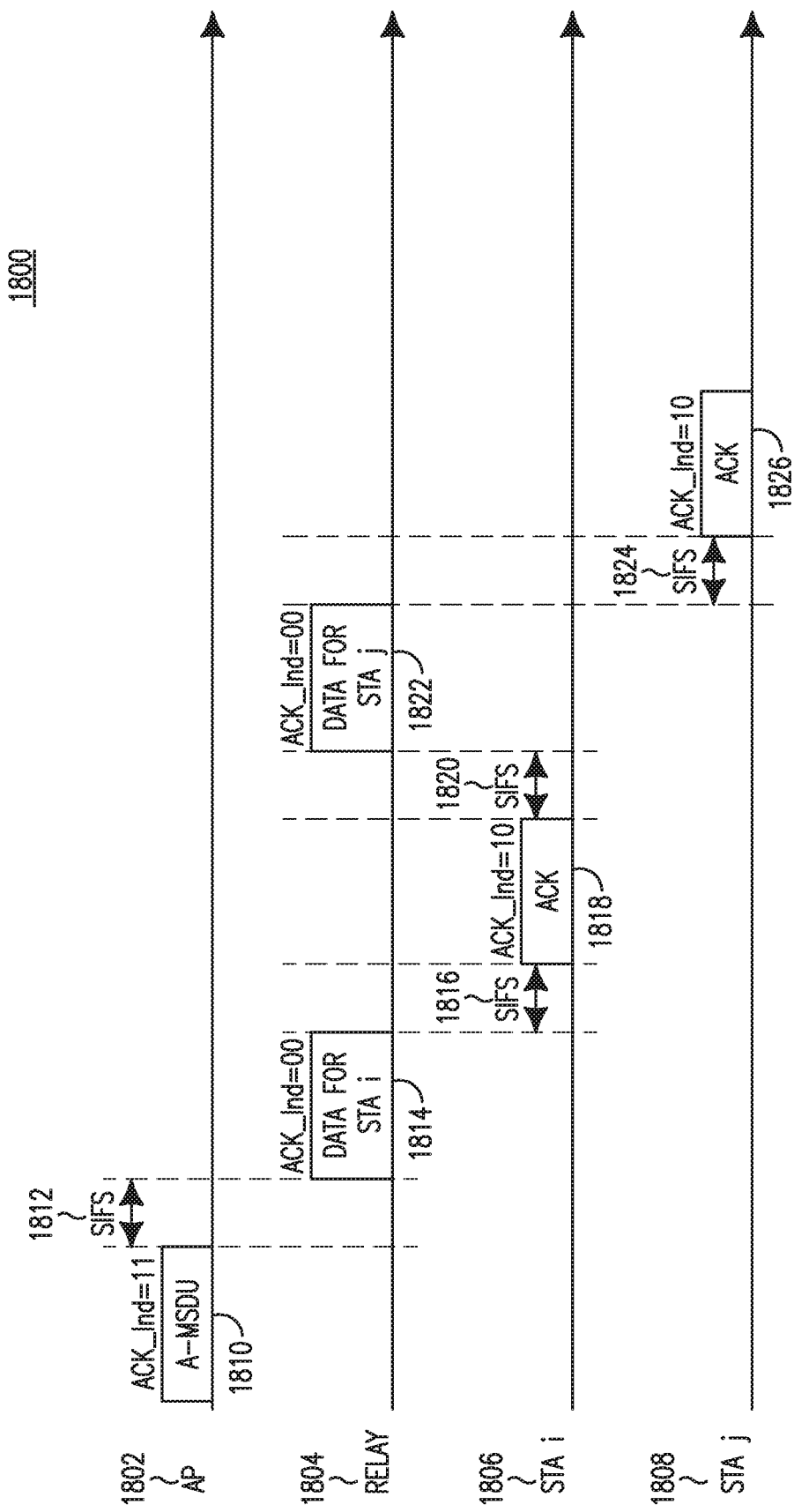
FIG. 18 is a signal diagram for an implicit ACK for an A-MSDU from the distribution system (DS)

FIG. 18 is a signal diagram for an implicit ACK method 1800 for an A-MSDU from the DS. The method 1800 is performed between an AP 1802, a relay node 1804, a STA i 1806 and a STA j 1808. The AP 1802 sends a DL A-MSDU frame 1810 with the ACK indication bits set to "11," so that other STAs can expect that another data frame will follow. After a SIFS interval 1812, the AP 1802 receives a PHY SIG field with the ACK indication bits set to "00" and checks the PAID subfield in the SIG field.

The relay node 1804 sends a data frame 1814 for the STA i 1806 with the ACK indication bits set to "00" and with a MCS no greater than the MCS used between the AP 1802 and the relay node 1804 and sets the address fields appropriately. If the STA i 1806 successfully receives the data frame 1814, then after a SIFS interval 1816, the STA i 1806 sends an ACK frame 1818 to the relay node 1804 with the ACK indication bits set to "10."

After a SIFS interval 1820, the relay node 1804 sends a data frame 1822 for the STA j 1808 with the ACK indication bits set to "00" and with a MCS no greater than the MCS used between the AP 1802 and the relay node 1804 and sets the address fields appropriately. If the STA j 1808 successfully receives the data frame 1822, then after a SIFS interval 1824, the STA j 1808 sends an ACK frame 1826 to the relay node 1804 with the ACK indication bits set to "10."

In another scenario, the AP sends an A-MSDU containing data for several STAs to the relay node. One way to reduce the signaling overhead and channel access contention is that the relay node forwards the A-MSDU to all the destination STAs. To facilitate the implicit ACK to the source node, a group ID may be used to indicate the group of STAs that are included in the A-MSDU. Usually, the group IDs are maintained and announced by the root AP. With the relay system, each relay node may also maintain and announce its own group ID. In this way, more groups may be formed within one BSS. The relay node sets the PAID subfield in the SIG field of an A-MSDU frame to the destination node to the corresponding group ID. When the source node detects a data frame whose PAID subfield in the SIG field matches the group of the A-MSDU frame that it transmitted to the relay node, it knows that the transmission from the source node to the relay node succeeded. Hence, the PAID serves as an implicit ACK to the source node/AP.

Figure 19:
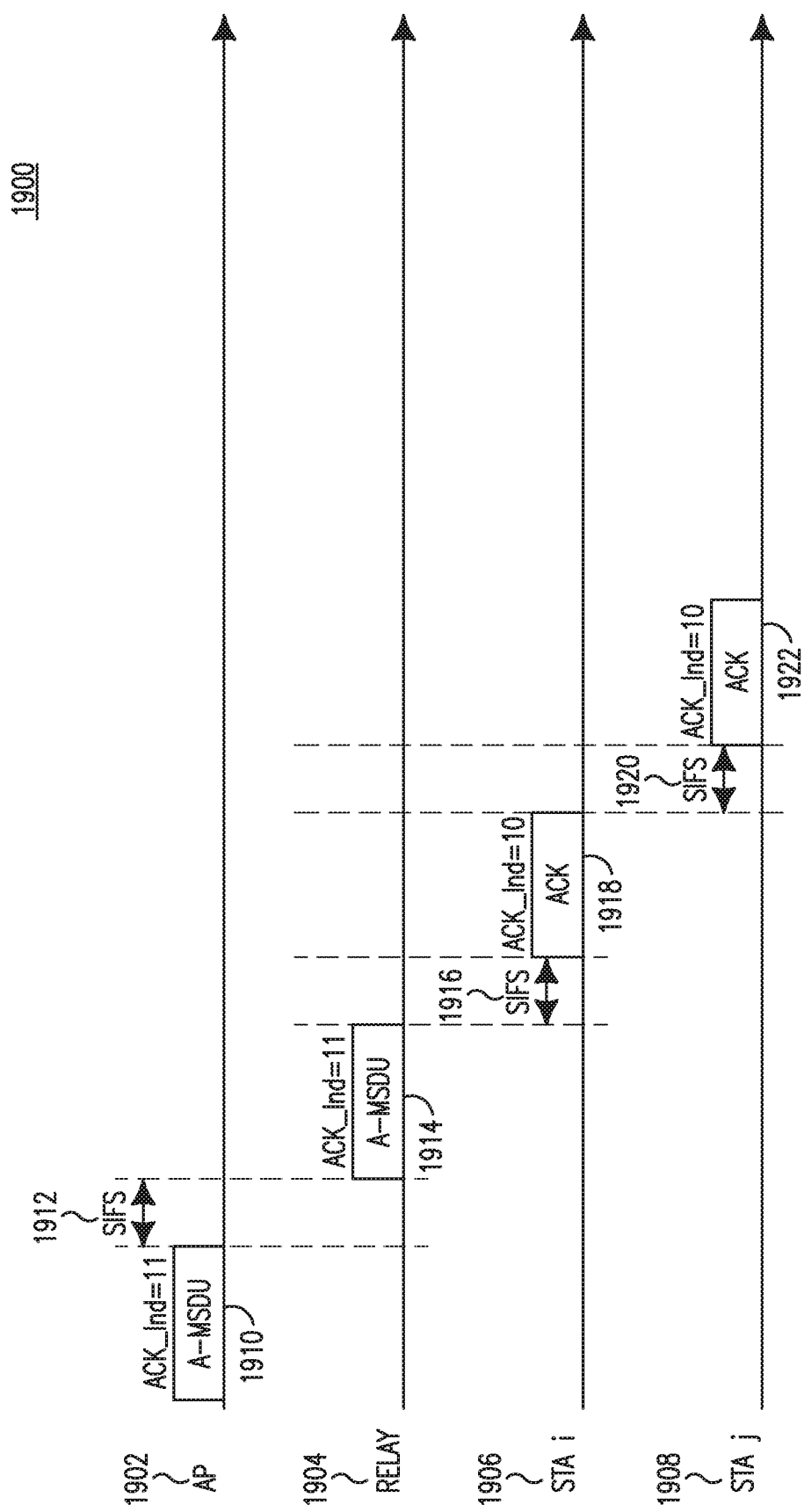
FIG. 19 is a signal diagram for an alternate implicit ACK for an A-MSDU from the DS.

FIG. 19 is a signal diagram for an alternate implicit ACK method 1900 for an A-MSDU from the DS. The method 1900 is performed between an AP 1902, a relay node 1904, a STA i 1906 and a STA j 1908. The AP 1902 sends a DL A-MSDU frame 1910 with the ACK indication bits set to "11," so that other STAs can expect that another data frame will follow. After a SIFS interval 1912, the AP 1902 receives a PHY SIG field with the ACK indication bits set to "00" and checks the PAID subfield in the SIG field.

The relay node 1904 sends an A-MSDU frame 1914 for the group of STAs (STA i 1906 and STA j 1908) with the ACK indication bits set to "00" and with a MCS no greater than the MCS used between the AP 1902 and the relay node 1904 and sets the PAID subfield in the SIG field to be corresponding group ID. If the STA i 1906 successfully receives the A-MSDU frame 1914, then after a SIFS interval 1916, the STA i 1906 sends an ACK frame 1918 to the relay node 1904 with the ACK indication bits set to "10." If the STA j 1908 successfully receives the A-MSDU frame 1914, then after a SIFS interval 1920, the STA j 1908 sends an ACK frame 1922 to the relay node 1904 with the ACK indication bits set to "10."

To save signaling overhead and latency for data transmission in a 1 MHz mode relay (where there is no PAID subfield in the SIG field), implicitly signaling the ACK from the relay node to the source node is proposed.

The source node has the knowledge of the destination node's MAC address and AID or BSSID at the time of association/re-association. The source node sends the DL data frame with the ACK indication bits set to 11, so that other STAs can expect that another data frame will follow.

The relay node sends the data frame to the destination node with a MCS no greater than the MCS used between the source node and the relay node. In other words, the MAC used between the relay node and the destination node is more robust than that used between the source node and the relay node. The relay node sets the RA field to the MAC address of the destination node in the MAC header of the data frame.

Within a SIFS time, the source node receives a PHY SIG field with the ACK indication bits set to 00, and checks the RA subfield in the MAC header. If the RA subfield in the MAC header matches the destination node's MAC address, it knows that the transmission from the source node to the relay node succeeded. Hence, the PAID serves as an implicit ACK to the source node/AP.

Figure 20:
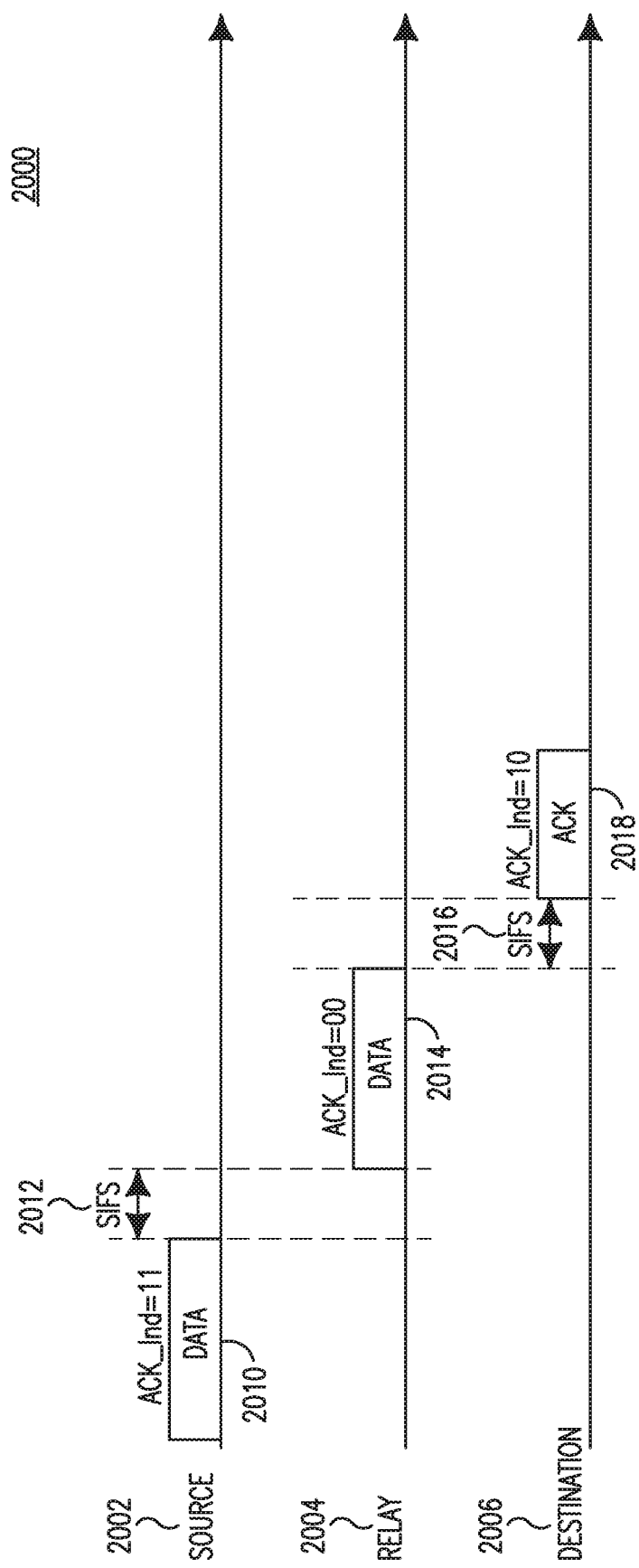
FIG. 20 is a signal diagram for an implicit ACK for a 1 MHz mode relay.

FIG. 20 is a signal diagram for an implicit ACK method 2000 for a 1 MHz mode relay. The method 2000 is performed between a source node 2002, a relay node 2004, and a destination node 2006. The source node 2002 sends a data frame 2010 to the relay node 2004, with the ACK indication bits set to "11," so that other STAs can expect that another data frame will follow. After a SIFS interval 2012, the source node 2002 receives a PHY SIG field with the ACK indication bits set to "00" and checks the RA subfield in the MAC header.

The relay node 2004 sends the data frame as a data frame 2014 for the destination node 2006 with the ACK indication bits set to "00" and with a MCS no greater than the MCS used between the source node 2002 and the relay node 2004 and sets the RA subfield in the MAC header to the MAC address of the destination node 2006. If the destination node 2006 successfully receives the data frame 2014, then after a SIFS interval 2016, the destination node 2006 sends an ACK frame 2018 to the relay node 2004 with the ACK indication bits set to "10."

Alternatively, a direction indication bit is added to the SIG field of the PLOP header, which may be used as the implicit ACK. The source node sends the DL data frame with the ACK indication bits set to 11, so that other STAs can expect that another data frame will follow. The relay node sends/forwards the data frame to the destination node using a direction indication bit set to the same direction (to the DS or from the DS) as the direction of the transmission from the source node to the relay node. Within a SIFS time, if the source node receives a PHY SIG field with the ACK indication bits set to 00 and the direction indication bit set to the same direction as the direction of the transmission from the source node to the relay node, it knows that the transmission from the source node to the relay node succeeded. Hence, the direction indication bit in the SIG field serves as an implicit ACK to the source node.

Figure 21:
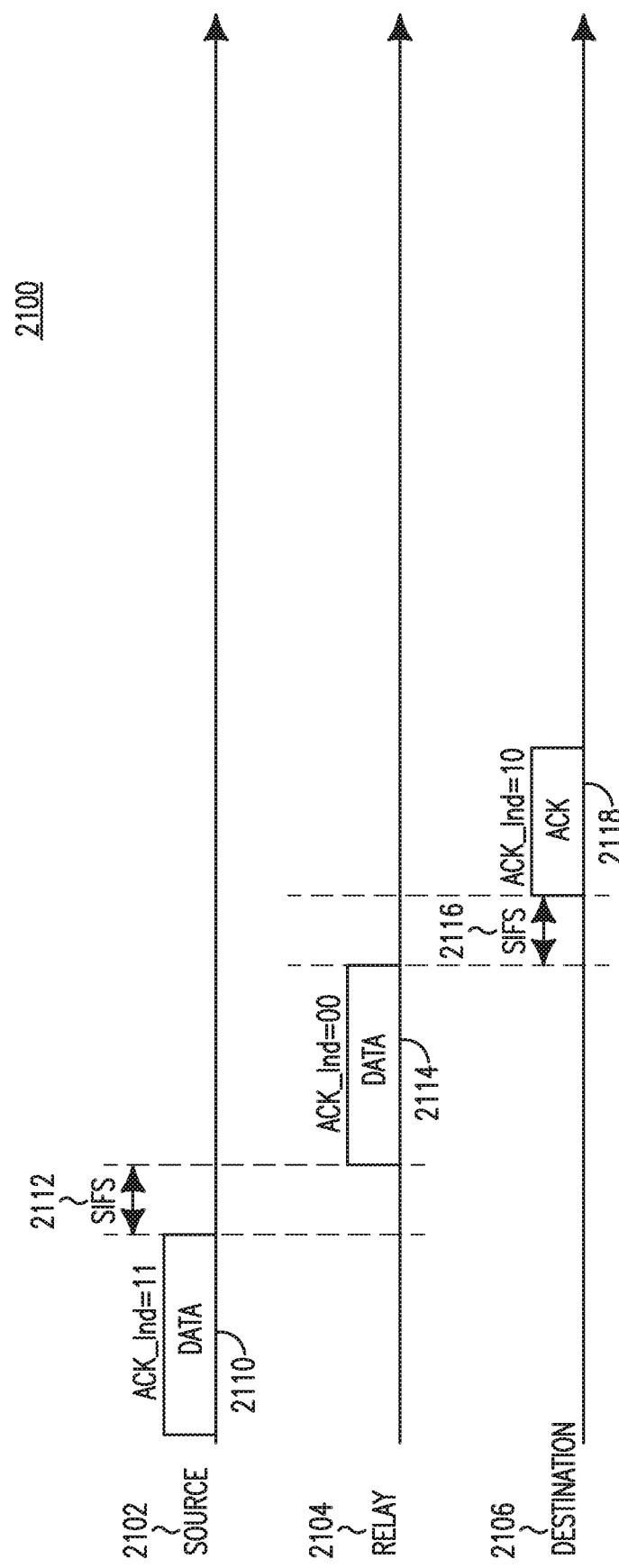
FIG. 21 is a signal diagram for an alternate implicit ACK for a 1 MHz mode relay.

FIG. 21 is a signal diagram for an alternate implicit ACK method 2100 for a 1 MHz mode relay. The method 2100 is performed between a source node 2102, a relay node 2104, and a destination node 2106. The source node 2102 sends a data frame 2110 to the relay node 2104, with the ACK indication bits set to "11," so that other STAs can expect that another data frame will follow. After a SIFS interval 2112, the source node 2102 receives a PHY SIG field with the ACK indication bits set to "00" and the direction indication bit set to the same direction as the direction of the transmission from the source node 2102 to the relay node 2104.

The relay node 2104 sends the data frame as a data frame 2114 for the destination node 2106 with the ACK indication bits set to "00" and the direction indication bit set to the same direction as the direction of the transmission from the source node 2102 to the relay node 2104. If the destination node 2106 successfully receives the data frame 2114, then after a SIFS interval 2116, the destination node 2106 sends an ACK frame 2118 to the relay node 2104 with the ACK indication bits set to "10."

Certain STA types or applications may require that the source node knows that the data frame is delivered to the destination node successfully before it can flush its transmitter data buffer and go back to sleep. For those STAs or applications, the relay nodes will not send an ACK frame to the source node until it receives an ACK frame from the destination node.

The source node sends the data frame with the ACK indication bits set to "11," so that other STAs can expect that another data frame will follow. If the relay node receives the data frame successfully, it sends the data frame to the destination node using an appropriate MCS. If the destination node receives the data frame successfully, it sends an ACK frame back to the relay node. Upon receiving the ACK frame from the destination node, the relay node sends an ACK frame back to the source node.

Figure 22:
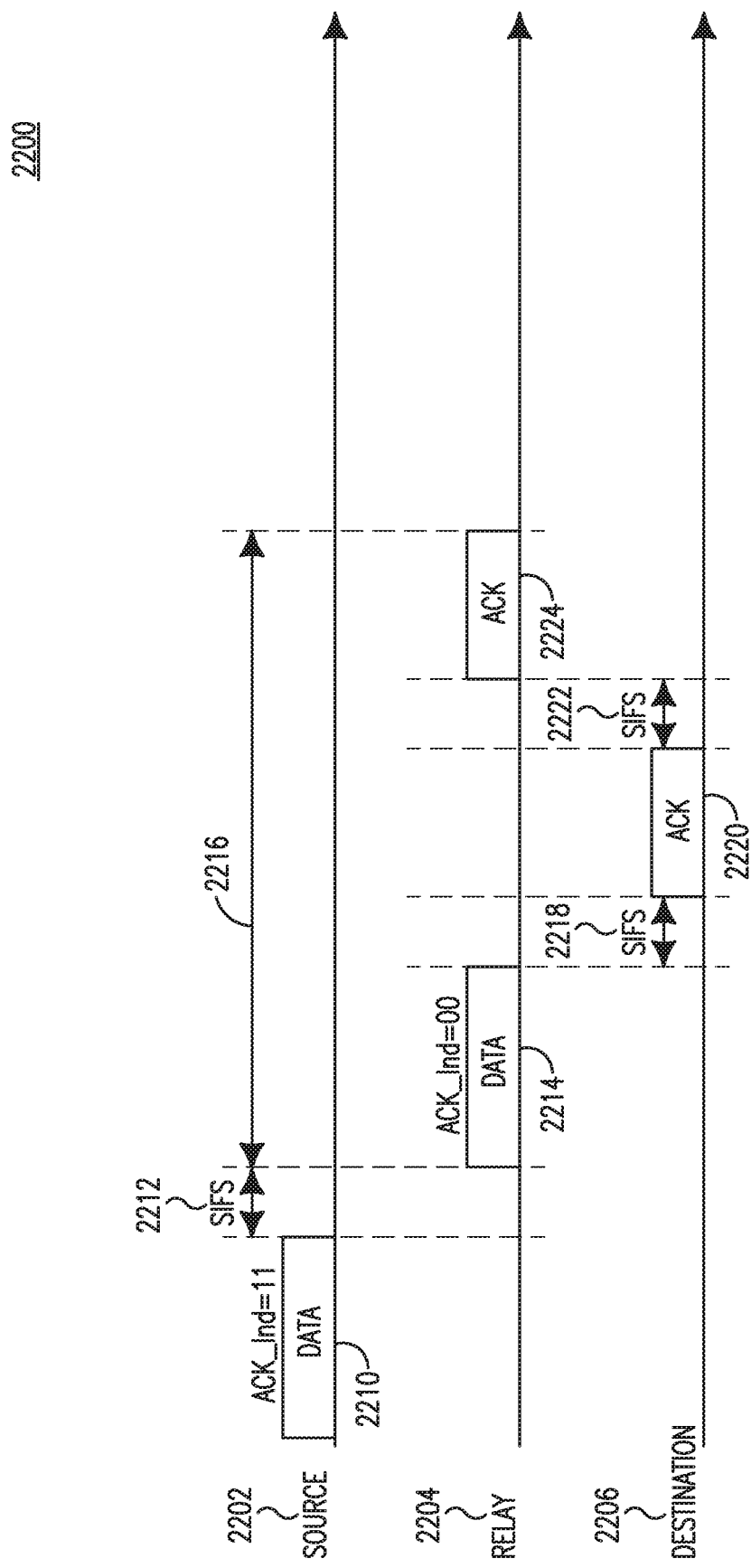
FIG. 22 is a signal diagram of an ACK forwarding scheme.

FIG. 22 is a signal diagram of an ACK forwarding method 2200. The method 2200 is performed between a source node 2202, a relay node 2204, and a destination node 2206. The source node 2202 sends a data frame 2210 to the relay node 2204, with the ACK indication bits set to "11," so that other STAs can expect that another data frame will follow. After a SIFS interval 2212, the relay node 2204 sends the data frame as a data frame 2214 for the destination node 2206 with the ACK indication bits set to "00." When the relay node 2204 sends the data frame 2214, the source node 2202 determines a new ACK timing 2216. There is no signaling for the source node 2202 to receive the new ACK timing 2216; the source node 2202 knows that if relay is used, the ACK timing 2216 will be different (or longer) than non-relay data transmission.

If the destination node 2206 successfully receives the data frame 2214, then after a SIFS interval 2218, the destination node 2206 sends an ACK frame 2220 to the relay node 2204. Upon receiving the ACK frame 2220 from the destination node 2206, after a SIFS interval 2222, the relay node 2204 sends an ACK frame 2224 to the source node 2202.

In one scenario, several STAs send data frames to a relay node. Those data frames may be transmitted to the relay node in sequential order in the time domain or in a frequency, code, or spatial orthogonal manner. When one of the STAs sends a control frame requesting a block ACK to the relay node, the relay node either sends back a block ACK frame before it forwards the data frames to the AP or the relay node assembles those data frames into an A-MSDU frame and sends the A-MSDU frame to the destination node (or AP). This block ACK may be a multiuser ACK. If the relay node sends the assembled data frames in an A-MSDU frame, a group ID may be used to indicate the group of STAs that are included in the A-MSDU frame. The relay node sets the PAID subfield in the SIG field of the A-MSDU frame to the destination node to the corresponding group ID. When the source node detects a data frame whose PAID subfield in the SIG field matches the group that it belongs to, it knows that the transmission from the source node to the relay node succeeded. Hence, the PAID serves as an implicit block ACK to the source nodes.

An end-to-end block ACK scheme for a STA using range extension or relay may be used. The source node first performs end-to-end add traffic stream (addTS)/add block ACK (addBA) operations with the destination node through the relay node.

The source node sends packets using a delayed BA mechanism, and sets the ACK indication in the PLOP header to "11" or "10." Upon successful receipt of data frames from the source node, the relay node does not send an ACK, but sends data frames to the destination node.

When the source node finishes the transmission, it may enter a sleep mode if it is a non-AP STA. When the source node awakes from sleep, it may send a four-address format block ACK request (BAR) frame to the relay node. The four-address BAR frame is a new frame format. The relay node forwards the BAR frame to the destination node. The destination node sends a four-address BA frame, which is also a new frame format.

Figure 23:
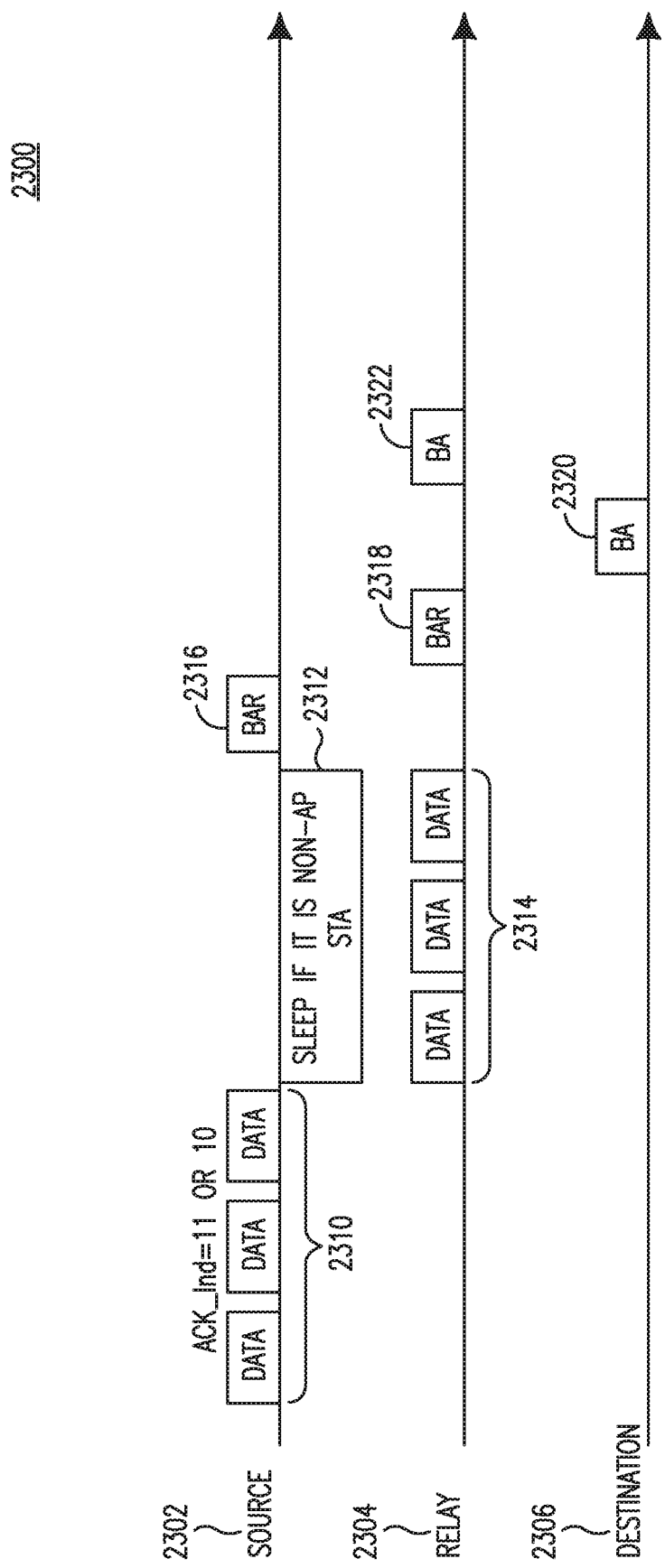
FIG. 23 is a signal diagram of an end-to-end block ACK scheme.

FIG. 23 is a signal diagram of an end-to-end block ACK method 2300. The method 2300 is performed between a source node 2302, a relay node 2304, and a destination node 2306. The source node 2302 sends several data frames 2310, with the ACK indication bits of each data frame set to "11," so that other STAs can expect that another data frame will follow or to "10," meaning that no ACK is required.

After sending the data frames 2310, the source node 2302 may enter a sleep mode is it is a non-AP STA (step 2312). Upon receiving the data frames 2310, the relay node 2304 sends the data frames as data frames 2314 for the destination node 2306. If the source node 2302 is a non-AP STA and exits the sleep mode, it sends a block ACK request (BAR) frame 2316 to the relay node 2304. If the source node 2302 is an AP, then the source node 2302 can estimate the timing for the relay node 2304 to finish the data block transmission and after this estimated time, sends the BAR frame 2316 to the relay node 2304. Upon receiving the BAR frame 2316, the source node 2302 sends a BAR frame 2318 to the destination node 2306. The destination node 2306 response with a BA frame 2320. The relay node 2304 then sends a BA frame 2322 to the source node 2302.

The following methods may be used to facilitate the Speed Frame Exchange for relay operation. In a first method, a relay frame field is used to control the Speed Frame Exchange procedures for relay. Upon receiving a data frame from the source node with a More Data field set to "1," the relay node may choose to continue the Speed Frame Exchange between the source node and the relay node, and forward the received data frame(s) to the destination node later. The relay node transmits an ACK frame (to acknowledge the received data frame) with the Relayed Frame field set to "0." A source node that receives the ACK frame that matches its MAC address with the Relayed Frame field set to "0" may continue its data frame transmission within the current TXOP if it has more data to transmit. Upon receiving the ACK frame that matches its address with the Relayed Frame field set to "0," the source node transmits a data frame a SIFS interval after the received ACK frame.

Two examples are described below. In a first example, the relay node sets the Relayed Frame field to "1" after receiving the second data frame from the source node with the More Data field equal to "0". The relay node forwards the received data frames to the destination node on a one-by-one basis.

Figure 24:
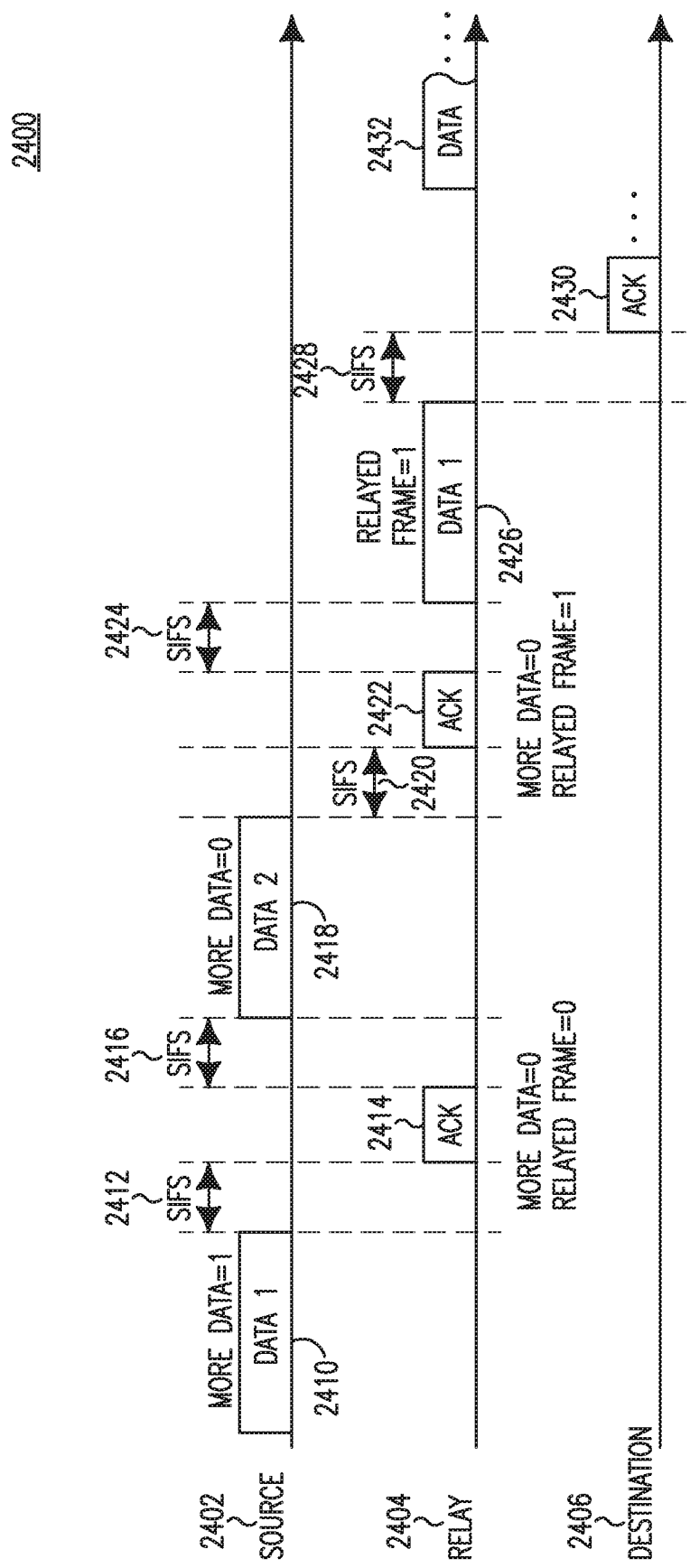
FIG. 24 is a signal diagram of a Speed Frame Exchange operation for relay.

FIG. 24 is a signal diagram of the first example of a speed frame exchange method 2400 for relay. The method 2400 is performed between a source node 2402, a relay node 2404, and a destination node 2406. The source node 2402 sends a first data frame 2410 to the relay node 2404, with the More Data field set to "1," to indicate to the relay node 2404 that the source node 2402 has more data frames to transmit. After a SIFS interval 2412, the relay node 2404 sends an ACK frame 2414 to the source node 2402, with the More Data field set to "0" and the Relayed Frame field set to "0." After a SIFS interval 2416, the source node 2402 sends a second data frame 2418 to the relay node 2404, with the More Data field set to "0," to indicate that the source node 2402 does not have any more data frames to transmit.

After a SIFS interval 2420, the relay node 2404 sends an ACK frame 2422 to the source node 2402, with the More Data field set to "0" and the Relayed Frame field set to "1." After a SIFS interval 2424, the relay node 2404 sends the first data frame as data frame 2426 to the destination node 2406, with the Relayed Frame field set to "1." After a SIFS interval 2428, the destination node sends an ACK frame 2430 to the relay node 2404. After receiving the ACK frame 2430, the relay node 2404 waits for a SIFS interval (not shown in FIG. 24) before sending the second data frame as data frame 2432.

Similarly, in a second example, the relay node sets the Relayed Frame field to "1" after receiving the second data frame from the source node with the More Data field equal to "0". The relay node aggregates the received data frames into one A-MSDU and forwards the A-MSDU to the destination node.

Figure 25:
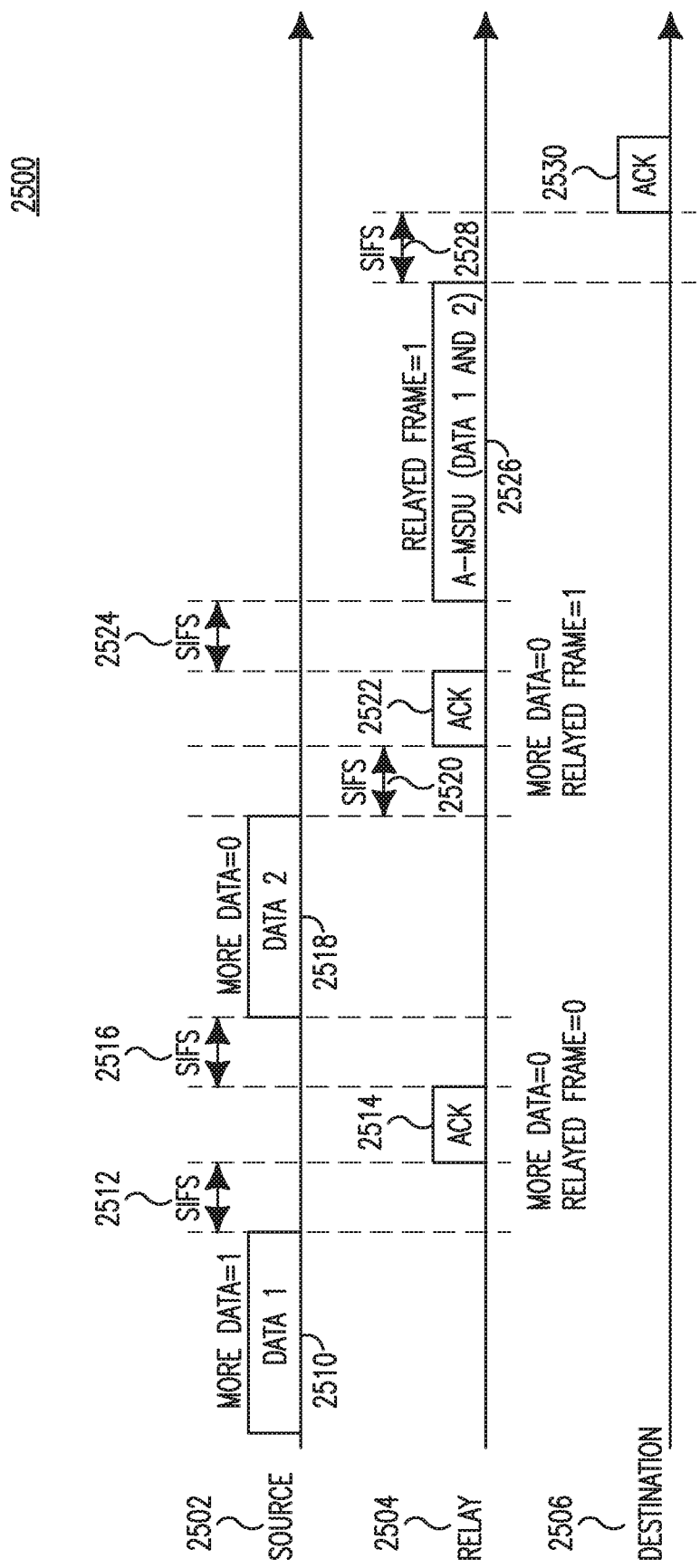
FIG. 25 is a signal diagram of an alternate Speed Frame Exchange operation for relay.

FIG. 25 is a signal diagram of the second example of a speed frame exchange method 2500 for relay. The method 2500 is performed between a source node 2502, a relay node 2504, and a destination node 2506. The source node 2502 sends a first data frame 2510 to the relay node 2504, with the More Data field set to "1," to indicate to the relay node 2504 that the source node 2502 has more data frames to transmit. After a SIFS interval 2512, the relay node 2504 sends an ACK frame 2514 to the source node 2502, with the More Data field set to "0" and the Relayed Frame field set to "0." After a SIFS interval 2516, the source node 2502 sends a second data frame 2518 to the relay node 2504, with the More Data field set to "0," to indicate that the source node 2502 does not have any more data frames to transmit.

After a SIFS interval 2520, the relay node 2504 sends an ACK frame 2522 to the source node 2502, with the More Data field set to "0" and the Relayed Frame field set to "1." After a SIFS interval 2524, the relay node 2504 sends the first data frame and the second data frame as an A-MSDU frame 2526 to the destination node 2506, with the Relayed Frame field set to "1." After a SIFS interval 2528, the destination node sends an ACK frame 2530 to the relay node 2504.

Alternately, upon receiving a data frame from the source node with a More Data field set to "1," the relay node may choose not to continue the Speed Frame Exchange between the source node and the relay node, and immediately forward the received data frame to the destination node. The relay node transmits an ACK frame (to acknowledge the received data frame) with the Relayed Frame field set to "1." A source node that receives the ACK frame that matches its address with the Relayed Frame field set to "1" does not initiate any further frame transmission within the current TXOP.

In a second method to facilitate the Speed Frame Exchange for relay operation, a new one-bit field called "Speed Frame Exchange Continue" (SFEC) may be defined in the ACK frame to control the Speed Frame Exchange procedures for relay. In this method, the source node and the relay node follow the procedures below.

Upon receiving a data frame from the source node with the More Data field set to "1," the relay node may choose to continue the Speed Frame Exchange between the source node and the relay node, and forward the received data frame(s) to the destination node later. The relay node transmits an ACK frame (to acknowledge the received data frame) with the SFEC field set to "1." A source node that receives the ACK frame that matches its MAC address with SFEC field set to "1" may continue its data frame transmission within the current TXOP if it has more data to transmit. Upon receiving the ACK frame that matches its address with SFEC field set to "1," the source node transmits a data frame a SIFS time after the received ACK frame.

Two examples are described below. In the first example, the relay node sets the SFEC field to "0" after receiving the second data frame from the source node with the More Data field set to "0." The relay node forwards the received data frames to the destination node on a one-by-one basis.

Figure 26:
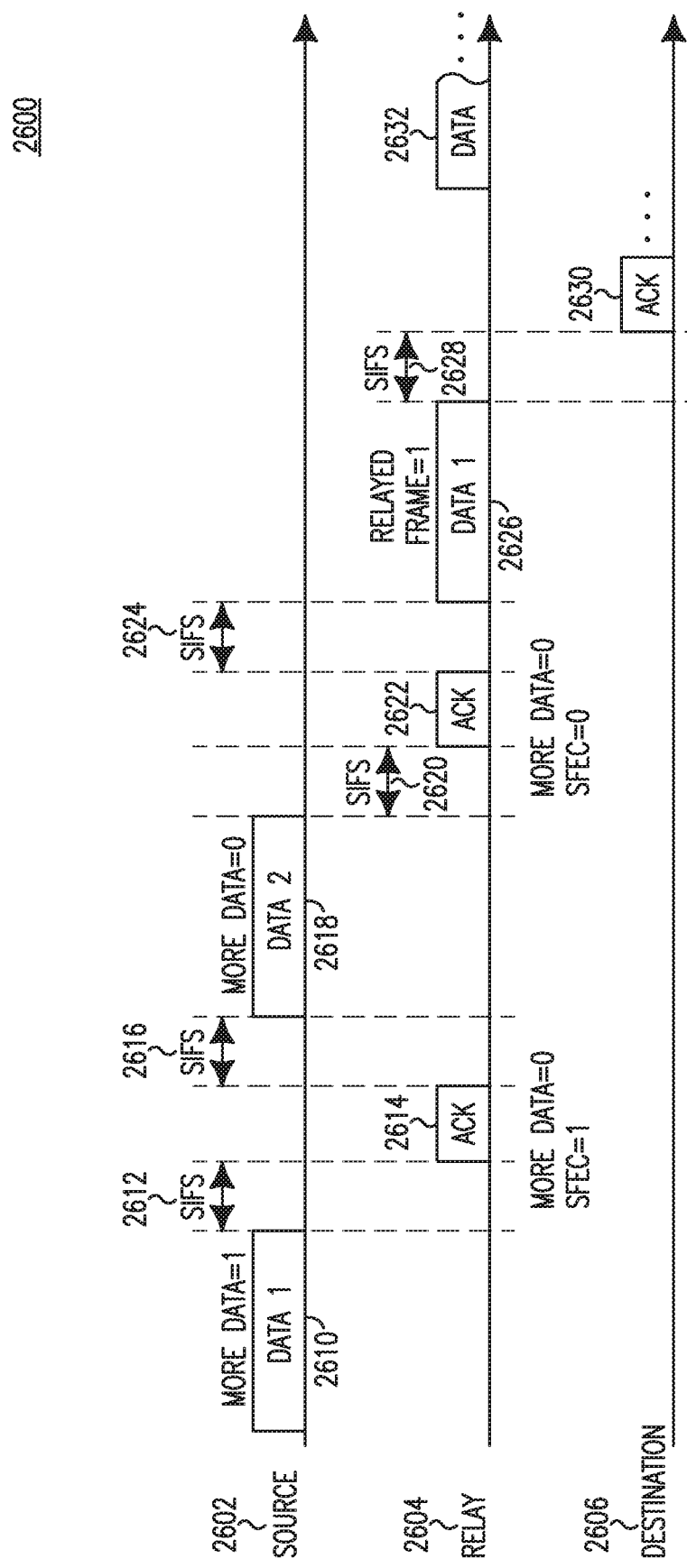
FIG. 26 is a signal diagram of a Speed Frame Exchange operation for relay using a Speed Frame Exchange Continue (SFEC) field.

FIG. 26 is a signal diagram of the first example of a speed frame exchange method 2600 for relay using the SFEC field. The method 2600 is performed between a source node 2602, a relay node 2604, and a destination node 2606. The source node 2602 sends a first data frame 2610 to the relay node 2604, with the More Data field set to "1," to indicate to the relay node 2604 that the source node 2602 has more data frames to transmit. After a SIFS interval 2612, the relay node 2604 sends an ACK frame 2614 to the source node 2602, with the More Data field set to "0" and the SFEC field set to "1." After a SIFS interval 2616, the source node 2602 sends a second data frame 2618 to the relay node 2604, with the More Data field set to "0," to indicate that the source node 2602 does not have any more data frames to transmit.

After a SIFS interval 2620, the relay node 2604 sends an ACK frame 2622 to the source node 2602, with the More Data field set to "0" and the SFEC field set to "0." After a SIFS interval 2624, the relay node 2604 sends the first data frame as data frame 2626 to the destination node 2606, with the Relayed Frame field set to "1." After a SIFS interval 2628, the destination node sends an ACK frame 2630 to the relay node 2604. After receiving the ACK frame 2630, the relay node 2604 waits for a SIFS interval (not shown in FIG. 26) before sending the second data frame as data frame 2632.

Similarly, in a second example, the relay node sets the SFEC field to "0" after receiving the second data frame from the source node with the More Data field set to "0." The relay node aggregates the received data frames into one A-MSDU and forwards the A-MSDU to the destination node.

Figure 27:
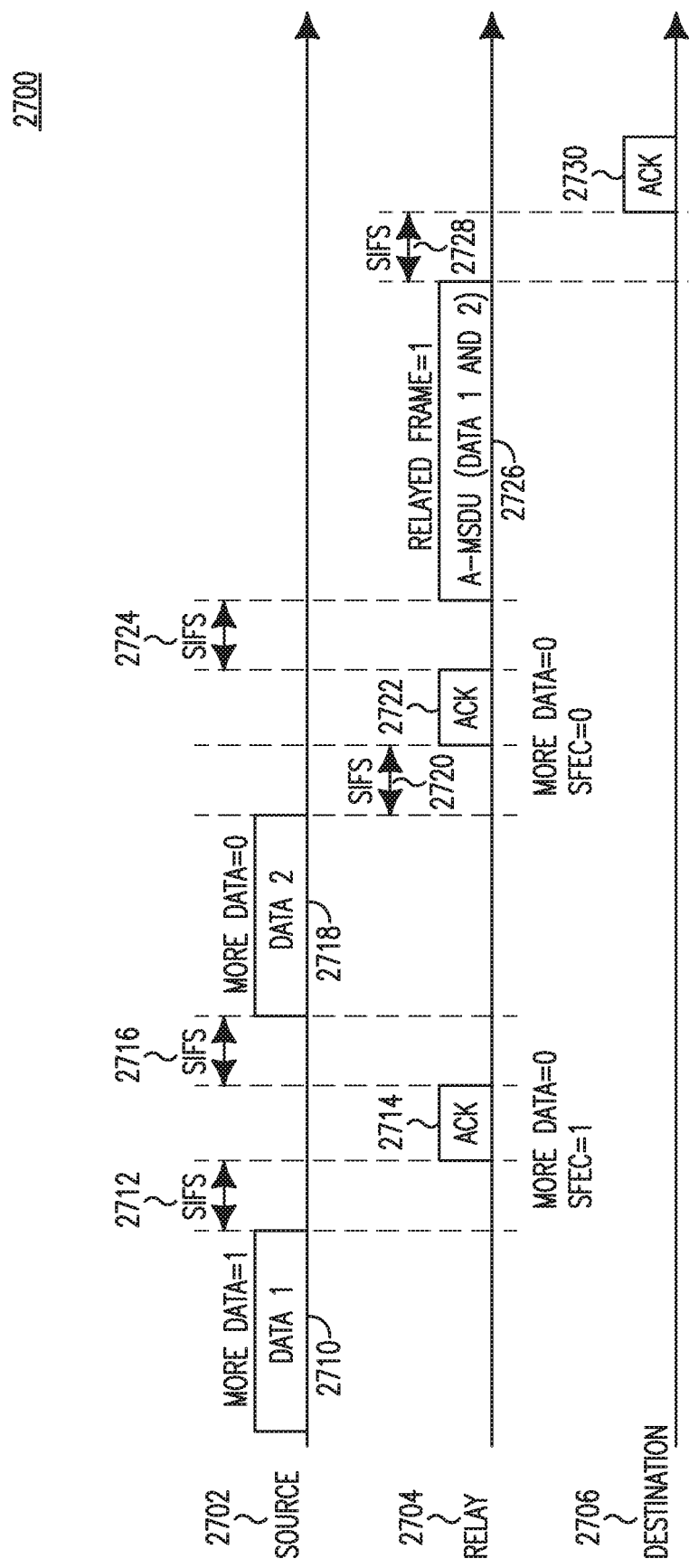
FIG. 27 is a signal diagram of an alternate Speed Frame Exchange operation for relay using a SFEC field.

FIG. 27 is a signal diagram of the second example of a speed frame exchange method 2700 for relay using the SFEC field. The method 2700 is performed between a source node 2702, a relay node 2704, and a destination node 2706. The source node 2702 sends a first data frame 2710 to the relay node 2704, with the More Data field set to "1," to indicate to the relay node 2704 that the source node 2702 has more data frames to transmit. After a SIFS interval 2712, the relay node 2704 sends an ACK frame 2714 to the source node 2702, with the More Data field set to "0" and the SFEC field set to "1." After a SIFS interval 2716, the source node 2702 sends a second data frame 2718 to the relay node 2704, with the More Data field set to "0," to indicate that the source node 2702 does not have any more data frames to transmit.

After a SIFS interval 2720, the relay node 2704 sends an ACK frame 2722 to the source node 2702, with the More Data field set to "0" and the SFEC field set to "0." After a SIFS interval 2724, the relay node 2704 sends the first data frame and the second data frame as an A-MSDU frame 2726 to the destination node 2706, with the Relayed Frame field set to "1." After a SIFS interval 2728, the destination node sends an ACK frame 2730 to the relay node 2704.

Alternately, upon receiving a data frame from the source node with the More Data field set to "1," the relay node may choose not to continue the Speed Frame Exchange between the source node and the relay node and forward the received data frame to the destination immediately. The relay node transmits an ACK frame with the SFEC field set to "0." A source node that receives the ACK frame that matches its MAC address with the SFEC field set to "0" does not initiate any further frame transmission within the current TXOP.

In the methods 2600 and 2700, the Relayed Frame field may be included in the ACK frame. The relay node may set the Relayed Frame field to "1," and the source node interprets this as an indication that the current TXOP is shared with the R-STA using an explicit ACK procedure. The source node relies on the SFEC field to determine whether to continue the Speed Frame Exchange procedures or not.

The methods 2400, 2500, 2600, and 2700 may be applicable to the Speed Frame Exchange between the relay node and the destination node as well.

In the methods 2400, 2500, 2600, and 2700, the source node may be a non-AP STA or an AP. The NDP ACK frame may be used in the methods 2400, 2500, 2600, and 2700 instead of the regular ACK. In the case where the NDP ACK is used, the transmitter/source node calculates the ACK ID using the same formula as the receiver/responder/relay node (i.e., using the partial FCS and the information from the scrambling seed in the SERVICE field of the frame being acknowledged), and check whether the ACK ID in the received NDP ACK frame matches the ACK ID calculated at the transmitter/source node. If it matches, the received NDP ACK frame is considered as a matched ACK (equivalent to the RA field of the regular ACK frame matching the transmitters address).

In the case where the NDP block ACK frame is used, the transmitter compares the block ACK ID in the received NDP block ACK frame with the N least significant bits (LSBs) of the PLCP data scrambler of the PSDU that carries the soliciting A-MPDU or the BAR. If they match, then the received NDP block ACK frame is considered to be a matched block ACK frame.

In the case where the NDP modified ACK frame is used to respond to a NDP PS-Poll frame, the transmitter of the NDP PS-Poll frame calculates the ACK ID using the same formula as the receiver/responder (using the RA, TA, and CRC fields of received NDP PS-Poll frame), and compares it with the ACK ID in the received NDP modified ACK frame. If they match, then the received NDP modified ACK frame is considered to be a matched NDP modified ACK frame.

The NDP ACK, NDP block ACK, and NDP modified ACK matching conditions and procedures are not limited to relay operation, and may be applicable to all STAs (AP and non-AP) that use NDP ACK, NDP block ACK, and NDP modified ACK frames.

Currently, a R-AP that is associated with a root AP may accept associations from end-STAs. However, a root AP has no means to control the association behavior of the R-APs that are associated with it, and the association behavior for the R-APs may have an impact on system performance. Therefore, methods to control the association behavior of the R-APs are desirable.

A root AP, or any other controlling entity such as a centralized control AP, may provide control and constraints for the association behavior of the R-APs that are associated with it, to provide better control of system performance. An end-STA may also provide requirements on the R-AP.

A root AP, or any other controlling entity, may use a Relay Control IE to control and constrain the behavior, such as the association behavior, of R-APs that are associated with it. An end-STA may also use a Relay Control IE to specify its requirements for a R-AP. A R-AP may also use the Relay Control IE to specify its own operation, constraints, etc. The Relay Control IE may be used in connection with any of the embodiments described herein.

FIG. 28 is a diagram of a Relay Control IE format 2800. The Relay Control IE 2800 includes an element ID field 2802, a length field 2804, a number of relays field 2806, a number of current relays field 2808, a relay capabilities field 2810, a number of end-STAs field 2812, an end-STA types field 2814, an end-STA capabilities field 2816, an end-STA traffic specification (spec) field 2818, and a relay gains field 2820.

The element ID field 2802 identifies the Relay Control IE 2800 as a Relay Control IE. The length field 2804 indicates the length of the Relay Control IE 2800. The number of relays field 2806 includes the total number of allowable R-APs that are allowed to associate with the current root AP or the transmitting STA.

The number of current relays field 2808 includes the number of R-APs that are currently associated with the root AP or the transmitting STA. In one implementation (not shown in FIG. 28), the number of relays field 2806 and the number of current relays field 2808 may be combined into one field called (for example) Allowed Additional Relays, which indicates the maximum additional number of R-APs that are allowed to associate with the root AP or the transmitting STAs.

The relay capabilities field 2810 specifies the capabilities that a R-AP may support or is required to support. The relay capabilities field 2810 may be implemented as a bitmap with a positive "1" indicating the support or the need to support a certain capability associated with the bit. Such capabilities may include: sectorized operation, Type 0 or Type 1 sectorization, transmit power control, coordination, synchronization for end-STA, RAW, Periodic RAW (PRAW), target wake time (TWT), Subchannel Selective Transmission (SST), etc.

The number of end-STAs field 2812 specifies the maximum number of end-STAs that a R-AP is allowed to provide association to. The end-STA types field 2814 specifies the type(s) of end-STAs that the R-AP is allowed to provide association to. The end-STA types specified may include: sensors, event-driven sensors, energy-limited STA, 1 MHz STAs, 2 MHz and above STAs, SST STAs, STAs using sectorized operations, HEW STAs, legacy STAs, or all types of STAs.

The end-STA capabilities field 2816 specifies the capabilities that an end-STA must support to be associated with the R-AP. The end-STA capabilities field 2816 may be implemented as a bitmap with a positive "1" indicating the support or the need to support a certain capability associated with the bit. Such capabilities may include: sectorized operation, Type 0 or Type 1 sectorization, transmit power control, coordination, synchronization for end-STA, RAW, PRAW, TWT, Subchannel Selective Transmission (SST), mandatory set of MCS, etc.

The end-STA traffic specification field 2818 specifies the type of traffic that an end-STA generates to be able to be allowed to associate with the R-AP. Such a traffic specification may include traffic access categories (ACs) and traffic load. The traffic ACs subfield may specify the type of ACs traffic that a STA generates to be associated with the R-AP. For example, the root AP may specify that only STAs generating event report traffic, such as a fire alarm or intruder detection, may be supported by one or more R-APs. In another example, a root AP may specify that only STAs generating AC_VI and AC_VO traffic may be supported by one or more R-APs. The traffic load subfield may specify the traffic load that an end-STA may generate to be associated with the R-AP. For example, the root AP may specify that an end-STA may not generate more than 500 kbps on average to be associated with one or more R-APs. In addition, the traffic load may be specified per AC or using another type of specification.

The relay gains field 2820 specifies the threshold for gains when having traffic forwarded through a relay node that a STA should obtain to be associated with the R-AP. This field may include a relay gain categories subfield and a relay gain threshold subfield. The relay gain categories subfield may include: energy, medium occupation time, aggregation gain, range, etc. The relay gains field 2820 may include multiple relay gain categories subfields. The relay gain threshold subfield specifies the minimal gain that an end-STA should obtain when sending packets through the R-AP instead of sending packets to the root AP directly. The exact implementation may depend on the relay gain categories. For energy, the relay gain threshold may be specified by integers that specify the energy saving when transmitting through the R-AP instead of directly transmitting to the root AP. Each integer may be associated with a certain unit of energy, such as mJ.

The energy usage may be estimated using a packet of a pre-defined size or may be the energy consumed to transmit some unit of data. In another example, the relay gain threshold may be specified by integers that specify the saving of medium occupation time when transmitting through the R-AP instead of directly transmitting to the root AP. Each integer may be associated with a certain unit of time, such as a nanosecond or a microsecond. The reduction of medium occupation time may be estimated using a packet of a pre-defined size or per some units of data.

Any subset of the subfields of the Relay Control IE 2800 may be implemented as a subfield or subsets of subfields of any existing or new IE, for example, the Relay Element, Relay Operation Element, the S1GNHT/HEWNHSE Operation Element, the S1G/VHT/HEWNHSE Capability Element, or as a part of any action frames, action without ACK frames, control, management, or extension frames, such as beacon, short beacon, probe request, probe response, association request, association response, reassociation request, reassociation response, S1G action frames, HEW action frames, or in MAC/PLCP headers. For example, the inclusion of some of the fields or subfields in the Relay Element may be indicated by a value in the Relay Control field in the Relay Element. A root AP, R-AP, or end-STA may include the Relay Control IE in its beacon, short beacon, probe request, probe response, association request, association response, reassociation request, reassociation response, or any other type of control, management, or extension frames at time of association, reassociation, or at other times.

A root AP may include a Relay Control IE to specify its requirements for the relay nodes that want to associate with it. For example, the root AP may specify the capabilities that a STA must satisfy to be associated as a R-AP, such as a minimal number of supported end-STAs or sectorized operations, SST, etc. The root AP may also indicate how many slots of R-AP that it has.

A root AP may include a Relay Control IE to control the behavior of the R-AP. For example, the root AP may specify the number of end-STAs that the R-AP is allowed to provide association with, and/or the type of the end-STAs, the end-STAs with certain capabilities, and/or the type and/or load of the traffic that an end-STA generates, so that the R-AP may provide association to the appropriate end-STAs. In addition to or alternatively, the root AP may specify the gain threshold that a STA must obtain when it transmits through the R-AP instead of transmitting directly to the AP to be able to associate with the R-AP.

A STA that is capable of relaying may include the Relay Control IE in its probe request, association request, reassociation request, or any other type of control, management, or extension frames to indicate to an AP, which may be a root AP, of its own relaying capabilities.

When a root AP receives a probe request including the Relay Control IE from a relaying STA, it may choose not to reply to the request because its own capabilities do not match those required by the relaying STA, the capabilities supported by the relaying STA do not match its own requirements for R-APs, or the root AP determined that there is not enough gain by associating with the relaying STA as a R-AP. When a root AP receives an association request or a reassociation request including the Relay Control IE from a relaying STA, it may choose to reject the request because its own capabilities do not match those required by the relaying STA as a root AP, the capabilities supported by the relaying STA do not match its own requirements for R-APs, or the root AP determined that there is not enough gain by associating with the relaying STA as a R-AP.

A R-AP that is associated with a root AP may include the Relay Control IE in its beacon, short beacon, probe response, association response, reassociation response, or any other type of control, management, or extension frames to indicate its relay capabilities and constraints or operations to STAs, including end-STAs.

An end-STA may include a Relay Control IE in its probe request, association request, reassociation request, or any other control, management, or extension frames to indicate its requirements for a R-AP. For example, the end-STA may specify that a R-AP must have sectorized operation capabilities, SST, etc. In another example, an end-STA may also specify that a R-AP should support Sensor Only.

When a R-AP receives a probe request including the Relay Control IE from an end-STA, it may choose not to reply to the request because its own capabilities do not match those required by the end-STA, the capabilities supported by the end-STA do not match its own requirements for end-STAs, or the end-STA would not achieve sufficient gain by transmitting through the R-AP. When a R-AP receives an association request or a reassociation request including the Relay Control IE from an end-STA, it may choose to reject the request because its own capabilities do not match those required by the end-STA, the capabilities supported by the end-STA do not match its own requirements for end-STAs, or the end-STA would not achieve sufficient gain by transmitting through the R-AP.

The exiting design of the Relay Element is not flexible. The root AP BSSID subfield is always included, causing extra overhead when there is no need to signal the root AP BSSID. Additionally, the design of the relay element does not allow the transmitter to identify itself as a non-AP R-STA. Therefore, it is desirable to develop an efficient design to allow the use of the relay element in various management frames for relay (such as beacon, association, and probe request/response frames) to sufficiently support the relay operation.

The Relay Element format may be modified as described below to allow efficient signaling of different cases where the Relay Element is transmitted and for efficient signaling of the RootAP BSSID subfield. The Reply Element format shown and described above in connection with FIG. 4 is modified in that the root AP BSSID field is made optional.

In addition to the two values of the Relay Control subfield already defined in Table 1 above (representing cases 0 and 1), additional values of the Relay Control field may be designed to represent one or several of the following cases/scenarios.

A Relay Control value of "2" may be used to indicate a root AP without a RootAP BSSID field in the Relay Element. For example, this may be used in the case where the Relay Element is included in the management frames (such as beacon, probe response, association response, or reassociation response frames) transmitted by the root AP. In those cases, there is no need to signal the RootAP BSSID.

A Relay Control value of "3" may be used to indicate a relayed SSID without the RootAP BSSID field in the Relay Element. For example, this may be used in the case where the Relay Element is included in the association response or reassociation response frames (transmitted by the non-root AP R-AP) where there is no need to signal the RootAP BSSID.

A Relay Control value of "4" may be used to indicate a non-AP STA capable of relay operation with the RootAP BSSID field in the Relay Element. For example, this may be used in the case where the Relay Element is included in the reassociation request frame where the current associated RootAP BSSID is available.

A Relay Control value of "5" may be used to indicate a non-AP STA capable of relay operation without the RootAP BSSID field in the Relay Element. For example, this may be used in an association request or a probe request frame.

An example of the values for the Relay Control field is shown in Table 2. The actual design of the method may use any order of the Relay Control field values to represent the cases/scenarios or a subset of cases/scenarios.

TABLE 2

| Relay Control | Meaning |
| --- | --- |
| 0 | Root AP |
| 1 | Relayed SSID |
| 2 | Root AP without RootAP BSSID subfield in Relay Element |
| 3 | Relayed SSID without RootAP BSSID subfield in Relay Element |
| 4 | Non-AP STA |
| 5 | Non-AP STA without RootAP BSSID subfield |
| 6-255 | Reserved |

The embodiments described above relate to procedures for support of a relay node, but a relay node may also be considered as a STA which performs the procedures described herein to support the functions or requirements of a relay node.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and non-transitory computer-readable storage media. Examples of non-transitory computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a station (STA), the method comprising:
   receiving, from an access point (AP), a beacon frame comprising a relay information element, wherein the relay information element includes a field that indicates when a root AP basic service set identification (BSSID) field is included in the relay information element and when the root AP BSSID field is absent from the relay information element;
   determining, based on a value in the field, that the root AP BSSID field is included in the relay information element; and
   determining that the AP is a relay AP of a root AP identified by the root AP BSSID field.

2. The method of claim 1, wherein the AP is a first AP, wherein the beacon frame is a first beacon frame, wherein the relay information element is a first relay information element, wherein the field is a first field, and wherein the root AP BSSID field is a first root AP BSSID field, the method further comprising:
   receiving, from a second AP, a second beacon frame comprising a second relay information element, wherein the second relay information element includes a second field that indicates when a second root AP BSSID field is included in the second relay information element and when the second root AP BSSID field is absent from the second relay information element;
   determining that the second root AP BSSID field is absent in the second information element; and determining that the second AP is a root AP.

3. The method of claim 2, wherein the first root AP BSSID field included in the first beacon frame identifies the second AP.

4. The method of claim 2, further comprising:
   transmitting data, to the second AP, via the first AP.

5. The method of claim 2, further comprising:
   receiving data, from the second AP, via the first AP.

6. The method of claim 1, wherein the determining that the AP is a relay AP is based at least in part on the field.

7. The method of claim 2, wherein the determining that the first AP is a relay AP is based at least in part on the first field, and wherein the determining that the second AP is a root AP is based at least in part on the second field.

8. A station (STA) comprising:
   a receiver configured to receive, from an access point (AP), a beacon frame comprising a relay information element, wherein the relay information element includes a field that indicates when a root AP basic service set identification (BSSID) field is included in the relay information element and when the root AP BSSID field is absent from the relay information element;
   a circuit configured to determine, based on a value in the field, that the root AP BSSID field is included in the first relay information element; and
   the circuit further configured to determine that the AP is a relay AP of a root AP identified by the root AP BSSID field.

9. The STA of claim 8, wherein the AP is a first AP, wherein the beacon frame is a first beacon frame, wherein the relay information element is a first relay information element, wherein the field is a first field, and wherein the root AP BSSID field is a first root AP BSSID field, the STA further comprising:

the receiver configured to receive, from a second AP, a second beacon frame comprising a second relay information element, wherein the second relay information element includes a second field that indicates when a second root AP BSSID field is included in the second relay information element and when the second root AP BSSID field is absent from the second relay information element;

a circuit configured to determine that the second root AP BSSID field is absent in the second information element; and the circuit further configured to determine that the second AP is a root AP.

10. The STA of claim 9, wherein the first root AP BSSID field included in the first beacon frame identifies the second AP.

11. The STA of claim 9, further comprising:
a transmitter configured to transmit data, to the second AP, via the first AP.

12. The STA of claim 9, further comprising:
the receiver configured to receive data, from the second AP, via the first AP.

13. The STA of claim 8, wherein the determination that the AP is a relay AP is based at least in part on the field.

14. The STA of claim 9, wherein the determination that the first AP is a relay AP is based at least in part on the first field, and wherein the determination that the second AP is a root AP is based at least in part on the second field.

15. A station (STA) comprising:
a receiver configured to receive, from a first wireless device, a first beacon frame comprising a first relay information element, wherein the first relay information element includes a first field that indicates whether a first root access point (AP) basic service set identification (BSSID) field is included in the first relay information element;

a circuit configured to determine that the first root AP BSSID field is included in the first relay information element and further determine that the first wireless device is a relay wireless device of a root AP identified by the first root AP BSSID field;

the receiver configured to receive, from a second wireless device, a second beacon frame comprising a second relay information element, wherein the second relay information element includes a second field that indicates whether a second root AP BSSID field is included in the second relay information element; and the circuit configured to determine that the second root AP BSSID field is not included in the second relay information element; and the circuit configured to determine that the second wireless device is a root AP.

16. The STA of claim 15, wherein the first root AP BSSID field included in the first beacon frame identifies the second wireless device.

17. The STA of claim 15, further comprising:
a transmitter configured to transmit data, to the second wireless device, via the first wireless device.

18. The STA of claim 15, further comprising:
the receiver configured to receive data, from the second wireless device, via the first wireless device.

19. The STA of claim 15, wherein the determination that the first wireless device is a relay wireless device is based at least in part on the first field.

20. The STA of claim 15, wherein the determination that the second wireless device is a root AP is based at least in part on the second field.

* * * * *

UNITED STATES PATENT AND TRADEMARK OFFICE
CERTIFICATE OF CORRECTION

| | | |
|---|---|---|
| PATENT NO. | : 11,575,428 B2 | Page 1 of 1 |
| APPLICATION NO. | : 16/934320 | |
| DATED | : February 7, 2023 | |
| INVENTOR(S) | : Guodong Zhang et al. | |

It is certified that error appears in the above-identified patent and that said Letters Patent is hereby corrected as shown below:

On the Title Page

Item (72) Under Inventors, delete "Hanging Lou" and insert --Hanqing Lou--.

Signed and Sealed this
Eighteenth Day of April, 2023

Katherine Kelly Vidal
*Director of the United States Patent and Trademark Office*